(12) United States Patent
Oh et al.

(10) Patent No.: US 11,528,509 B2
(45) Date of Patent: Dec. 13, 2022

(54) VIDEO TRANSMISSION METHOD, VIDEO TRANSMISSION DEVICE, VIDEO RECEIVING METHOD AND VIDEO RECEIVING DEVICE

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/270,768

(22) PCT Filed: Sep. 3, 2019

(86) PCT No.: PCT/KR2019/011294
§ 371 (c)(1),
(2) Date: Feb. 23, 2021

(87) PCT Pub. No.: WO2020/050577
PCT Pub. Date: Mar. 12, 2020

(65) Prior Publication Data
US 2021/0337243 A1    Oct. 28, 2021

(30) Foreign Application Priority Data
Sep. 7, 2018 (KR) .................. 10-2018-0106781

(51) Int. Cl.
*H04N 19/89* (2014.01)
*H04N 13/117* (2018.01)
(Continued)

(52) U.S. Cl.
CPC ........... *H04N 19/89* (2014.11); *H04N 13/117* (2018.05); *H04N 13/161* (2018.05); *H04N 13/178* (2018.05); *H04N 19/597* (2014.11)

(58) Field of Classification Search
None
See application file for complete search history.

(56) References Cited

U.S. PATENT DOCUMENTS

2013/0287093 A1    10/2013   Hannuksela et al.
2014/0168362 A1*    6/2014   Hannuksela ......... H04N 13/161
                                                              348/43
(Continued)

FOREIGN PATENT DOCUMENTS

KR    1020160045121    4/2016
KR    1020170056595    5/2017

OTHER PUBLICATIONS

PCT International Search Report and Written Opinion in International Appln. No. PCT/KR2019/011294, dated Dec. 26, 2019, 20 pages (with English translation).

*Primary Examiner* — Christopher Braniff
(74) *Attorney, Agent, or Firm* — Fish & Richardson P.C.

(57) ABSTRACT

A video transmission method that includes predicting, from a texture picture or a depth picture of an anchor viewing position, a picture for a target viewing position on the basis of target viewing position information and processing a prediction error with respect to the predicted picture on the basis of a source picture of the target viewing position. An error-prone region map is generated on the basis of the predicted picture and the source picture. The video transmission method also includes patch packing the prediction error-processed picture on the basis of the error-prone region map and encoding the packed patch on the basis of the texture picture or the depth picture of the anchor viewing position.

17 Claims, 36 Drawing Sheets

(51) Int. Cl.
*H04N 13/161* (2018.01)
*H04N 13/178* (2018.01)
*H04N 19/597* (2014.01)

(56) References Cited

U.S. PATENT DOCUMENTS

2015/0245061 A1 8/2015 Chen et al.
2016/0134874 A1 5/2016 Konieczny et al.
2020/0374559 A1* 11/2020 Fleureau .................. G06T 9/00

* cited by examiner

FIG. 8

```
 .....
        <Default metadata>
unsigned    int(8)      vr_geometry;
unsigned    int(8)      projection_scheme;
        <Stereoscopic related metadata>
unsigned    int(1)      is_stereoscopic;
unsigned    int(3)      stereo_mode;
        <Initial View related metadata>
signed      int(8)      initial_view_yaw_degree;
signed      int(8)      initial_view_pitch_degree;
signed      int(8)      initial_view_roll_degree;
        <ROI related metadata>
unsigned int(1)         2d_roi_range_flag;
unsigned int(1)         3d_roi_range_flag;
if(2d_roi_region_flag == 1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if(3d_roi_region_flag == 1) {
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}
        <Field Of View related metadata>
unsigned int(1)         content_fov_flag;
if(content_fov_flag == 1) {
  unsigned int(16)      content_fov;
}
        <Cropped Region related metadata>
unsigned int(1)         is_cropped_region;
if(is_cropped_region == 1) {
  unsigned int(16)      cr_region_left_top_x;
  unsigned int(16)      cr_region_left_top_y;
  unsigned int(16)      cr_region_width;
  unsigned int(16)      cr_region_height;
}
 .....
```

FIG. 30

| | Descriptor |
|---|---|
| texture_depth_regeneration_info ( payloadSize ) { | |
| texture_depth_regeneration_info_id | u(11) |
| texture_depth_regeneration_info_cancel_flag | u(1) |
| if( !texture_depth_restoration_info_cancel_flag ) { | |
| texture_depth_regeneration_info_persistence_flag | u(1) |
| num_texture_depth_regeneration_minus1 | u(8) |
| for( i = 0; i <= num_view_restoration_minus1; i++ ) { | |
| regenerated_view_id[ i ]  // target_view_id | u(8) |
| view_location_x[ i ] | u(32) |
| view_location_y[ i ] | u(32) |
| view_location_z[ i ] | u(32) |
| view_rotation_yaw[ i ] | u(32) |
| view_rotation_pitch[ i ] | u(32) |
| view_rotation_roll[ i ] | u(32) |
| num_components[ i ] | u(8) |
| for( j=0; j< num_components[ i ]; j++ ) { | |
| regenerated_component_id[ i ][ j ] // target_component_id | u(8) |
| picture_width[ i ][ j ] | u(8) |
| picture_height[ i ][ j ] | u(8) |
| projection_type[ i ][ j ] | u(8) |
| component_type[ i ][ j ] // texture, depth, patch, alpha, indicator (used/not used) | |
| if( component_type[ i ][ j ] == 2 ) { | |
| depth_near[ i ][ j ] | u(32) |
| depth_far[ i ][ j ] | u(32) |
| } | |
| texture_depth_regeneration_info_flag[ i ] | u(1) |
| reserved_zero_7bits[ i ] | u(6) |
| if( texture_depth_regeneration_info_flag[ i ] ) { | |
| merging_flag[ i ] | u(1) |
| hole_filing_flag[ i ] | u(1) |
| crack_removal_flag[ i ] | u(1) |
| occlusion_enh_flag[ i ] | u(1) |

| | Descriptor |
|---|---|
| reserved_4bits | u(3) |
| num_ref_views_minus1[ i ] | u(8) |
| for( j = 0; j <= num_ref_views_minus1[ i ]; j++ ) { | |
| ref_view_id[ i ][ j ] | u(8) |
| ref_component_id[ i ][ j ] | u(8) |
| hor_min_fov[ i ][ j ] | u(32) |
| hor_max_fov[ i ][ j ] | u(32) |
| ver_min_fov[ i ][ j ] | u(32) |
| ver_max_fov[ i ][ j ] | u(8) |
| global_offset_x_axis[ i ][ j ] | u(32) |
| global_offset_y_axis[ i ][ j ] | u(32) |
| global_offset_z_axis[ i ][ j ] | u(32) |
| if( merging_flag ) { | |
| num_depth_levels_minus1[ i ][ j ] | u(8) |
| for( k = 0; k <= num_depth_levels_minus1[ i ][ j ]; k++ ) { | |
| num_angular_levels_minus1[ i ][ j ][ k ] | u(8) |
| for( l = 0; l <= num_angular_levels_minus1[ i ][ j ][ k ]; l++ ) | |
| weight_depth_level[ i ][ j ][ k ][ l ] | u(8) |
| } | |
| } | |
| if( hole_filing_flag[ i ] ) { | |
| hole_filing_process_type[ i ] | u(8) |
| num_coeffs_minus1[ i ] | u(8) |
| for( j = 0; j <= num_coeff_minus1[ i ]; j++ ) | |
| hole_filing_coeff[ i ][ j ] | u(8) |
| } | |
| if( crack_removal_flag[ i ] ) { | |
| crack_removal_process_type[ i ] | u(8) |
| num_coeffs_minus1[ i ] | u(8) |
| for( j = 0; j <= num_coeff_minus1[ i ]; j++ ) | |
| crack_removal_coeff[ i ][ j ] | u(8) |

| | Descriptor |
|---|---|
| } | |
| if( occlusion_enh_flag[ i ] ) { | |
| num_patch_blocks[ i ] | u(8) |
| for( j = 0; j < num_patch_blocks[ i ]; j++ ) { | |
| regenerated_picture_top_left_index_x[ i ][ j ] | u(16) |
| regenerated_picture_top_left_index_y[ i ][ j ] | u(16) |
| regenerated_picture_bottom_right_index_x[ i ][ j ] | u(16) |
| regenerated_picture_bottom_right_index_y[ i ][ j ] | u(16) |
| patch_view_id[ i ][ j ] | u(8) |
| patch_component_id[ i ][ j ] | u(8) |
| patch_top_left_index_x[ i ][ j ] | u(16) |
| patch_top_left_index_y[ i ][ j ] | u(16) |
| patch_bottom_right_index_x[ i ][ j ] | u(16) |
| patch_bottom_right_index_y[ i ][ j ] | u(16) |

FIG. 31

| | Descriptor |
|---|---|
| multiview_regionwise_packing( payloadSize ) { | |
| multiview_regionwise_packing_id | u(12) |
| multiview_regionwise_packing_cancel_flag | u(1) |
| if( !multiview_regionwise_packing_cancel_flag ) { | |
| multiview_regionwise_packing_persistence_flag | u(1) |
| constituent_picture_matching_flag | u(1) |
| packing_format_matching_between_views_flag | u(1) |
| num_view_minus1 | u(8) |
| for( i = 0; i <= num_view_minus1; i++ ) { | |
| mrwp_view_id[ i ] | u(1) |
| mrwp_anchor_view_flag[ i ] // or constraint on the case j equal to 0 | u(1) |
| mrwp_view_independent_rotation_flag[ i ] | u(1) |
| mrwp_component_independent_rotation_flag | u(1) |
| mrwp_all_components_packed_in_one_region_flag[ i ] | u(1) |
| mrwp_reserved_zero_4bits[ i ] | u(4) |
| if( mrwp_anchor_view_flag[ i ] ) { | |
| mrwp_location_anchor_view_x[ i ] | u(32) |
| mrwp_location_anchor_view_y[ i ] | u(32) |
| mrwp_location_anchor_view_z[ i ] | u(32) |
| mrwp_rotation_anchor_view_yaw[ i ] | u(32) |
| mrwp_rotation_anchor_view_pitch[ i ] | u(32) |
| mrwp_rotation_anchor_view_roll[ i ] | u(32) |
| } | |
| else { | |
| mrwp_location_diff_x[ i ] | u(32) |
| mrwp_location_diff_y[ i ] | u(32) |
| mrwp_location_diff_z[ i ] | u(32) |
| if( mrwp_view_independent_rotation_flag[ i ] ) { | |
| mrwp_rotation_diff_yaw[ i ] | u(32) |
| mrwp_rotation_diff_pitch[ i ] | u(32) |
| mrwp_rotation_diff_roll[ i ] | u(32) |
| } | |
| num_component_minus1[ i ] | u(8) |
| for( j = 0; j <= num_component_minus1[ i ]; j++ ) { | |
| mrwp_component_id[ i ][ j ] | u(8) |
| mrwp_component_type[ i ][ j ] // texture(L,R), depth, residual, alpha | u(4) |
| mrwp_projection_type[ i ][ j ] // erp, cmp, ... | u(4) |
| mrwp_proj_picture_width[ i ][ j ] | u(32) |
| mrwp_proj_picture_height[ i ][ j ] | u(32) |
| mrwp_coverage_horizontal[ i ][ j ] | u(32) |
| mrwp_coverage_vertical[ i ][ j ] | u(32) |
| if( mrwp_component_type[ i ][ j ] == 2 ) { | |
| depth_near[ i ][ j ] | u(32) |
| depth_far[ i ][ j ] | u(32) |
| } | |
| if( mrwp_component_dependent_rotation_flag[ i ][ j ] ) | |
| mrwp_rotation_component_diff_yaw[ i ][ j ] | u(32) |
| mrwp_rotation_component_diff_pitch[ i ][ j ] | u(32) |
| mrwp_rotation_component_diff_roll[ i ][ j ] | u(32) |
| } | |
| if( mrwp_all_components_packed_in_one_region_flag[ i ] ) { | |
| mrwp_packed_region_width[ i ][ j ] | u(16) |
| mrwp_packed_region_height[ i ][ j ] | u(16) |
| mrwp_packed_region_top[ i ][ j ] | u(16) |
| mrwp_packed_region_left[ i ][ j ] | u(16) |
| } | |
| num_packed_regions | u(8) |
| packed_picture_width | u(16) |
| packed_picture_height | u(16) |
| for( i = 0; i < num_packed_regions; i++ ) { | |
| num_view_id_minus1[ i ] // regions sharing among diff views | u(8) |
| for( j = 0; j < num_view_id_minus1[ i ]; j++ ) { | |
| view_idx[ i ][ j ] // mrwp_view_id[ i ] | u(8) |
| num_component_id_minus1[ i ][ j ] // region sharing between LR | u(8) |
| for( k = 0; k <= num_component_id_minus1[ i ][ j ]; k++ ) { | |
| component_idx[ i ][ j ][ k ] // mrwp_component_id[ i ][ j ] | u(8) |
| proj_region_width[ i ][ j ][ k ] | u(32) |
| proj_region_height[ i ][ j ][ k ] | u(32) |
| proj_region_top[ i ][ j ][ k ] | u(32) |
| proj_region_left[ i ][ j ][ k ] | u(32) |
| } | |
| rwp_reserved_zero_4bits[ i ] | u(4) |
| rwp_transform_type[ i ] | u(3) |
| rwp_guard_band_flag[ i ] | u(1) |
| packed_region_width[ i ] | u(16) |
| packed_region_height[ i ] | u(16) |
| packed_region_top[ i ] | u(16) |
| packed_region_left[ i ] | u(16) |
| if( rwp_guard_band_flag[ i ] ) { | |

FIG. 32

| | |
|---|---|
| if( rwp_guard_band_flag[ i ] ) { | |
| rwp_left_guard_band_width[ i ] | u(8) |
| rwp_right_guard_band_width[ i ] | u(8) |
| rwp_top_guard_band_height[ i ] | u(8) |
| rwp_bottom_guard_band_height[ i ] | u(8) |
| rwp_guard_band_not_used_for_pred_flag[ i ] | u(1) |
| for( j = 0; j < 4; j++ ) | |
| rwp_guard_band_type[ i ][ j ] | |
| rwp_guard_band_reserved_zero_3bits[ i ] | u(3) |
| } | u(3) |
| } | |
| } | |
| } | |

FIG. 33

| | Descriptor |
|---|---|
| viewing_position_info ( payloadSize ) { | |
|   viewing_position_info_id | u(13) |
|   viewing_position_info_cancel_flag | u(1) |
|   if( ! viewing_position_info_cancel_flag ) { | |
|     anchor_viewing_position_flag | u(1) |
|     viewing_position_x | u(1) |
|     viewing_position_y | u(32) |
|     viewing_position_z | u(32) |
|     viewing_orientation_yaw | u(32) |
|     viewing_orientation_pitch | u(32) |
|     viewing_orientation_roll | u(32) |
|     coverage_horizontal | u(32) |
|     coverage_vertical | u(32) |
|     if ( ! anchor_viewing_position_flag ) { | |
|       anchor_viewing_position_x | u(32) |
|       anchor_viewing_position_y | u(32) |
|       anchor_viewing_position_z | u(32) |
|       anchor_viewing_orientation_yaw | u(32) |
|       anchor_viewing_orientation_pitch | u(32) |
|       anchor_viewing_orientation_roll | u(32) |
|       anchor_coverage_horizontal | u(32) |
|       anchor_coverage_vertical | u(32) |
|     } | |
|     num_viewing_positions | u(8) |
|     for( i = 0; i <= num_viewing_positions; i++ ) { | |
|       set_viewing_position_x[ i ] | u(32) |
|       set_viewing_position_y[ i ] | u(32) |
|       set_viewing_position_z[ i ] | u(32) |
|       set_viewing_orientation_yaw[ i ] | u(32) |
|       set_viewing_orientation_pitch[ i ] | u(32) |
|       set_viewing_orientation_roll[ i ] | u(32) |
|       set_coverage_horizontal[ i ] | u(32) |
|       set_coverage_vertical[ i ] | u(32) |
|     } | |
|   } | |
| } | |

FIG. 34

| | Descriptor |
|---|---|
| head_motion_information( payloadSize ) { | |
|   head_motion_info_id | u(15) |
|   head_motion_info_cancel_flag | u(1) |
|   if( !head_motion_info_cancel_flag ) { | |
|     head_motion_info_persistence_flag | u(1) |
|     head_motion_boundary_radius_min | u(32) |
|     head_motion_boundary_radius_max | u(32) |
|     num_nested_boundaries_minus1 | u(8) |
|     for( i = 0; i < num_nested_boundaries_minus1; i++ ) { | |
|       head_motion_boundary_center_present_flag[ i ] | u(1) |
|       head_motion_boundary_rotation_flag[ i ] | u(1) |
|       head_motion_boundary_asymmetric_flag[ i ] | u(1) |
|       head_motion_boundary_type[ i ] | u(4) |
|       if( head_motion_boundary_center_present_flag[ i ] ) { | |
|         head_motion_boundary_center_x[ i ] | u(32) |
|         head_motion_boundary_center_y[ i ] | u(32) |
|         head_motion_boundary_center_z[ i ] | u(32) |
|       } | |
|       if( head_motion_boundary_rotation_flag[ i ] ) { | |
|         head_motion_boundary_rotation_yaw[ i ] | u(32) |
|         head_motion_boundary_rotation_pitch[ i ] | u(32) |
|         head_motion_boundary_rotation_roll[ i ] | u(32) |
|       } | |
|       if( head_motion_boundary_type[ i ] == 1 ) | |
|         head_motion_boundary_radius[ i ] | u(32) |
|       else if( head_motion_boundary_type[ i ] == 2 ) { | |
|         head_motion_boundary_param_a[ i ] | u(32) |
|         head_motion_boundary_param_b[ i ] | u(32) |
|         head_motion_boundary_z_max[ i ] | u(32) |
|       } | |
|       else if( head_motion_boundary_type[ i ] == 3 || head_motion_boundary_type[ i ] == 4 ) { | |
|         head_motion_boundary_positive_x_axis[ i ] | u(32) |
|         head_motion_boundary_positive_y_axis[ i ] | u(32) |
|         head_motion_boundary_positive_z_axis[ i ] | u(32) |
|         if( head_motion_boundary_type[ i ] == 4 && head_motion_boundary_asymmetric_flag[ i ] == 1 ) { | |
|           head_motion_boundary_negative_x_axis[ i ] | u(32) |
|           head_motion_boundary_negative_y_axis[ i ] | u(32) |
|           head_motion_boundary_negative_z_axis[ i ] | u(32) |
|         } | |
|       } | |
|       else if( head_motion_boundary_type[ i ] == 5 ) { | |
|         head_motion_boundary_param_a[ i ] | u(32) |
|         head_motion_boundary_param_b[ i ] | u(32) |
|         head_motion_boundary_symmetry_axis[ i ] | u(8) |
|       } | |
|       else if( head_motion_boundary_type[ i ] == 6 ) { | |
|         head_motion_boundary_param_a[ i ] | u(32) |
|         head_motion_boundary_param_b[ i ] | u(32) |
|         head_motion_boundary_param_c[ i ] | u(32) |
|       } | |
|       else if( head_motion_boundary_type[ i ] == 15 ) { | |
|         num_boundary_vertex_minus4[ i ] | u(8) |
|         for( j=0; j< num_boundary_vertex_minus4[ i ]-4; j++ ) { | |
|           boundary_vertex_x[ i ][ j ] | u(32) |
|           boundary_vertex_y[ i ][ j ] | u(32) |
|           boundary_vertex_z[ i ][ j ] | u(32) |
|         } | |
|       } | |
|     } | |
|   } | |
| } | |

VIDEO TRANSMISSION METHOD, VIDEO TRANSMISSION DEVICE, VIDEO RECEIVING METHOD AND VIDEO RECEIVING DEVICE

CROSS-REFERENCE TO RELATED APPLICATIONS

This application is a National Stage application under 35 U.S.C. § 371 of International Application No. PCT/KR2019/011294, filed on Sep. 3, 2019, which claims the benefit of Korean Application No. 10-2018-0106781, filed on Sep. 7, 2018. The disclosures of the prior applications are incorporated by reference in their entirety.

TECHNICAL FIELD

The present disclosure relates to a video transmission method, a video transmission apparatus, a video reception method, and a video reception apparatus.

BACKGROUND

A virtual reality (VR) system provides a user with a sense of being in an electronically projected environment. The system for providing VR may be further improved to provide higher quality images and stereophonic sound. A VR system may allow a user to interactively consume VR content.

SUMMARY

The VR system needs to be improved in order to more efficiently provide a VR environment to users. To this end, data transmission efficiency for transmitting a large amount of data such as VR content, robustness between transmission and reception networks, network flexibility in consideration of mobile reception apparatuses, and methods for efficient playback and signaling need to be proposed.

In addition, since general TTML (Timed Text Markup Language)-based subtitles or bitmap-based subtitles are not produced in consideration of 360 video, subtitle-related features and subtitle-related signaling information need to be further extended to be suitable for a use case of VR service in order to provide subtitles suitable for 360 video.

In accordance with the object of the present disclosure, provided herein are a video transmission method, a video transmission apparatus, a video reception method, and a video reception apparatus.

A video transmission apparatus according to embodiments of the present disclosure includes a target view prediction controller configured to predict a picture for a target viewing position from a texture picture or a depth picture of an anchor viewing position based on target viewing position information (Target view prediction controller); a prediction error controller configured to process a prediction error for the predicted picture based on a source picture of the target viewing position and generate an error-front region map based on the predicted picture and the source picture; a patch packing controller configured to pack the prediction error-processed picture into a patch based on the error-prone region map; and an encoder configured to encode the packed patch based on the texture picture or the depth picture of the anchor viewing position.

A video transmission method according to embodiments of the present disclosure includes predicting a picture for a target viewing position from a texture picture or a depth picture of an anchor viewing position based on target viewing position information (Target view prediction); processing a prediction error for the predicted picture based on a source picture of the target viewing position and generating an error-front region map based on the predicted picture and the source picture; packing the prediction error-processed picture into a patch based on the error-prone region map (Patch packing); and encoding the packed patch based on the texture picture or the depth picture of the anchor viewing position (Encoding).

In the process of transmitting and receiving 3DoF+ video, a video transmission apparatus and a video reception apparatus according to embodiments of the present disclosure may pack only valid information except information overlapping between images and efficiently deliver the same.

The video transmission apparatus and the video reception apparatus according to the embodiments of the present disclosure may efficiently transmit video by reducing the number of images.

The video transmission apparatus and the video reception apparatus according to the embodiments of the present disclosure may provide an image estimation method with high accuracy.

The video transmission apparatus and the video reception apparatus according to the embodiments of the present disclosure may find information that may cause an error and provide an image estimation method having high error robustness.

The video transmission apparatus and the video reception apparatus according to the embodiments of the present disclosure may estimate image information and detect a portion with low accuracy and an error.

The video transmission apparatus and the video reception apparatus according to the embodiments of the present disclosure may configure a patch with low complexity.

The video transmission apparatus and the video reception apparatus according to the embodiments of the present disclosure may provide encoding and decoding methods which are less burdened.

The video transmission apparatus and the video reception apparatus according to the embodiments of the present disclosure may efficiently deliver information on a region that cannot be estimated.

The video transmission apparatus and the video reception apparatus according to the embodiments of the present disclosure may reduce the number of images to be delivered, thereby reducing the amount of data.

The video transmission apparatus and the video reception apparatus according to the embodiments of the present disclosure may provide signaling information for the above-described effects.

The video transmission apparatus and the video reception apparatus according to the embodiments of the present disclosure may provide a video transmission/reception system reflecting real-time motion.

The video transmission apparatus and the video reception apparatus according to the embodiments of the present disclosure may reduce the burden on a receiver and eliminate latency.

BRIEF DESCRIPTION OF THE DRAWINGS

FIG. 8 illustrates 360-degree video related metadata according to an embodiment of the present disclosure.

FIG. 30 shows metadata related to prediction error processing and target view prediction processing according to embodiments of the present disclosure.

FIGS. 31 and 32 show metadata related to patch packing according to embodiments of the present disclosure.

FIG. 33 shows metadata for an entire image according to embodiments of the present disclosure.

FIG. 34 shows metadata for an entire image according to embodiments of the present disclosure.

DETAILED DESCRIPTION

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
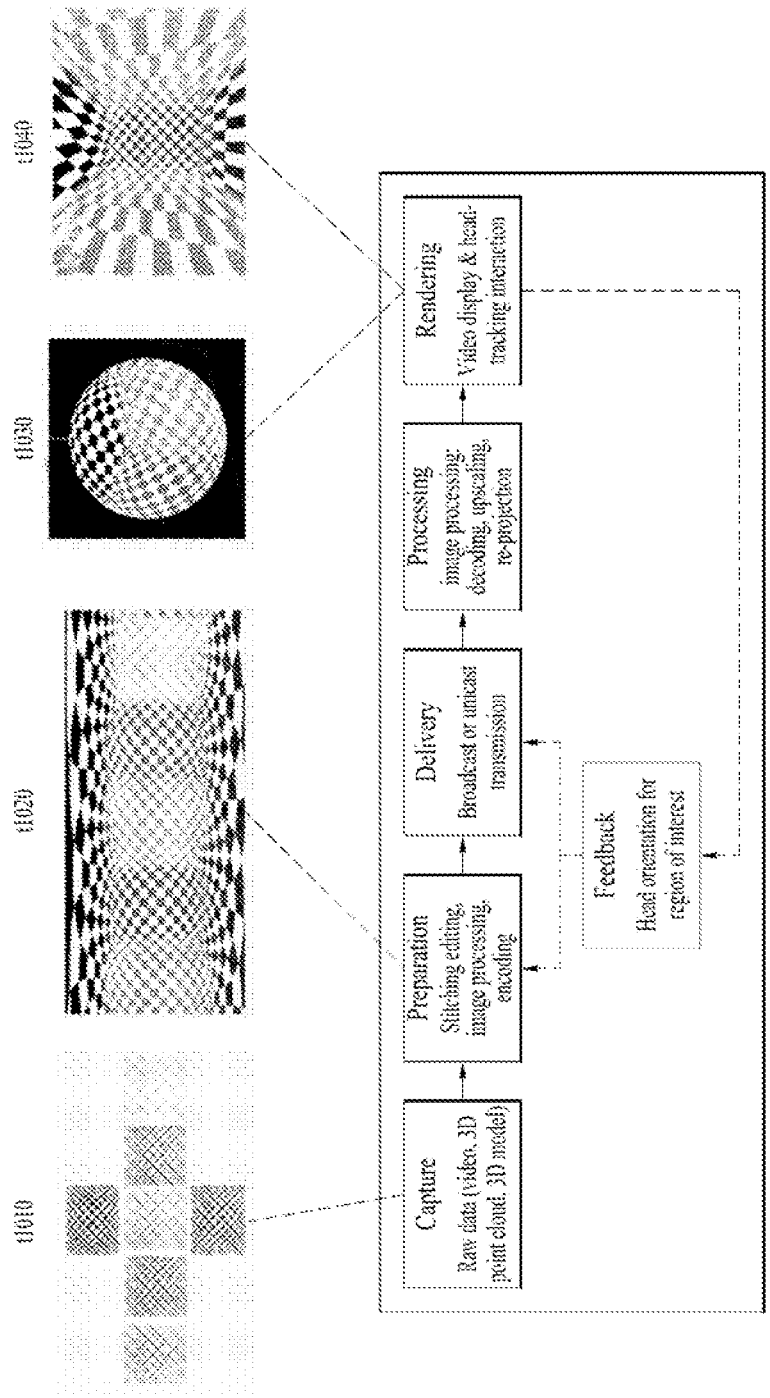
FIG. 1 illustrates an architecture for providing 360 video according to the present disclosure.

FIG. 1 illustrates an architecture for providing 360-degree video according to the present disclosure.

The present disclosure provides a method for providing 360-degree content to provide virtual reality (VR) to users. VR refers to a technique or an environment for replicating an actual or virtual environment. VR artificially provides sensuous experiences to users, and users may experience electronically projected environments.

360-degree content refers to convent for realizing and providing VR and may include 360-degree video and/or 360-degree audio. 360-degree video may refer to video or image content which is necessary to provide VR and is captured or reproduced in all directions (360 degrees). 360-degree video may refer to video or image represented on 3D spaces in various forms according to 3D models. For example, 360-degree video may be represented on a spherical plane. 360-degree audio is audio content for providing VR and may refer to spatial audio content which may be recognized as content having an audio generation source located in a specific space. 360-degree content may be generated, processed and transmitted to users, and users may consume VR experiences using the 360-degree content. 360-degree content/video/image/audio may be referred to as 360 content/video/image/audio, omitting the term "degree" representing a unit, or as VR content/video/image/audio.

The present disclosure proposes a method for effectively providing 360 video. To provide 360 video, first, 360 video may be captured using one or more cameras. The captured 360 video is transmitted through a series of processes, and a reception side may process received data into the original 360 video and render the 360 video. Thus, the 360 video may be provided to a user.

Specifically, a procedure for providing 360 video may include a capture process, a preparation process, a transmission process, a processing process, a rendering process and/or a feedback process.

The capture process may refer to a process of capturing images or videos for a plurality of views through one or more cameras. The shown image/video data t1010 may be generated through the capture process. Each plane of the shown image/video data t1010 may refer to an image/video for each view. The captured images/videos may be called raw data. In the capture process, metadata related to capture may be generated.

For the capture process, a special camera for VR may be used. When 360 video with respect to a virtual space generated using a computer is provided in an embodiment, capture using a camera may not be performed. In this case, the capture process may be replaced by a process of simply generating related data.

The preparation process may be a process of processing the captured images/videos and metadata generated in the capture process. The captured images/videos may be subjected to stitching, projection, region-wise packing and/or encoding in the preparation process.

First, each image/video may pass through a stitching process. The stitching process may be a process of connecting captured images/videos to create a single panorama image/video or a spherical image/video.

Then, the stitched images/videos may pass through a projection process. In the projection process, the stitched images/videos may be projected on a 2D image. This 2D image may be called a 2D image frame. Projection on a 2D image may be represented as mapping to the 2D image. The projected image/video data may have a form of a 2D image t1020 as shown in the figure.

The video data projected on the 2D image may pass through a region-wise packing process in order to increase video coding efficiency. Region-wise packing may refer to a process of dividing video data projected on a 2D image into regions and processing the regions. Here, regions may refer to regions obtained by dividing a 2D image on which 360 video data is projected. Such regions may be obtained by dividing the 2D image equally or arbitrarily according to an embodiment. Regions may be divided according to a projection scheme according to an embodiment. The region-wise packing process is an optional process and thus may be omitted from the preparation process.

According to an embodiment, this process may include a process of rotating the regions or rearranging the regions on the 2D image in order to increase video coding efficiency. For example, the regions may be rotated such that specific sides of regions are positioned in proximity to each other to increase coding efficiency.

According to an embodiment, the this process may include a process of increasing or decreasing the resolution of a specific region in order to differentiate the resolution for regions of the 360 video. For example, the resolution of regions corresponding to a relatively important part of the 360 video may be increased to higher than other regions. The video data projected on the 2D image or the region-wise packed video data may pass through an encoding process using a video codec.

According to an embodiment, the preparation process may additionally include an editing process. In this editing process, the image/video data before or after projection may be edited. In the preparation process, metadata with respect to stitching/projection/encoding/editing may be generated. In addition, metadata with respect to the initial view or region of interest (ROI) of the video data projected on the 2D image may be generated.

The transmission process may be a process of processing and transmitting the image/video data and metadata which have pass through the preparation process. For transmission, processing according to any transmission protocol may be performed. The data that has been processed for transmission may be delivered over a broadcast network and/or broadband. The data may be delivered to the reception side in an on-demand manner. The reception side may receive the data through various paths.

The processing process may refer to a process of decoding the received data and re-projecting the projected image/video data on a 3D model. In this process, the image/video data projected on the 2D image may be re-projected on a 3D space. This process may be called mapping projection. Here, the 3D space on which the data is mapped may have a form depending on a 3D model. For example, 3D models may include a sphere, a cube, a cylinder and a pyramid.

According to an embodiment, the processing process may further include an editing process, an up-scaling process, etc. In the editing process, the image/video data before or after re-projection may be edited. When the image/video data has been reduced, the size of the image/video data may be increased through up-scaling of samples in the up-scaling process. As necessary, the size may be decreased through down-scaling.

The rendering process may refer to a process of rendering and displaying the image/video data re-projected on the 3D space. Re-projection and rendering may be collectively represented as rendering on a 3D mode. The image/video re-projected (or rendered) on the 3D model may have a form t1030 as shown in the figure. The form t1030 corresponds to a case in which the image/video data is re-projected on a spherical 3D model. A user may view a region of the rendered image/video through a VR display or the like. Here, the region viewed by the user may take a form t1040 shown in the figure.

The feedback process may refer to a process of delivering various types of feedback information which may be acquired in the display process to a transmission side. Through the feedback process, interactivity in 360 video consumption may be provided. According to an embodiment, head orientation information, viewport information indicating a region currently viewed by a user, and the like may be delivered to the transmission side in the feedback process. According to an embodiment, a user may interact with content realized in a VR environment. In this case, information related to the interaction may be delivered to the transmission side or a service provider during the feedback process. According to an embodiment, the feedback process may not be performed.

The head orientation information may refer to information about the location, angle and motion of a user's head. On the basis of this information, information about a region of 360 video currently viewed by the user, that is, viewport information may be calculated.

The viewport information may be information about a region of 360 video currently viewed by a user. Gaze analysis may be performed using the viewport information to check a manner in which the user consumes 360 video, a region of the 360 video at which the user gazes, and how long the user gazes at the region. Gaze analysis may be performed by the reception side and the analysis result may be delivered to the transmission side through a feedback channel. a device such as a VR display may extract a viewport region on the basis of the location/direction of a user's head, vertical or horizontal FOV supported by the device.

According to an embodiment, the aforementioned feedback information may be consumed at the reception side as well as being delivered to the transmission side. That is, decoding, re-projection and rendering processes of the reception side may be performed using the aforementioned feedback information. For example, only 360 video for the region currently viewed by the user may be preferentially decoded and rendered using the head orientation information and/or the viewport information.

Here, a viewport or a viewport region may refer to a region of 360 video currently viewed by a user. A viewpoint is a point in 360 video which is viewed by the user and may refer to a center point of a viewport region. That is, a viewport is a region based on a view, and the size and form of the region may be determined by the field of view (FOV), which will be described below.

In the above-described architecture for providing 360 video, image/video data which is subjected to a series of capture/projection/encoding/transmission/decoding/re-projection/rendering processes may be called 360 video data. The term "360 video data" may be used as the concept including metadata or signaling information related to such image/video data.

Figure 2:
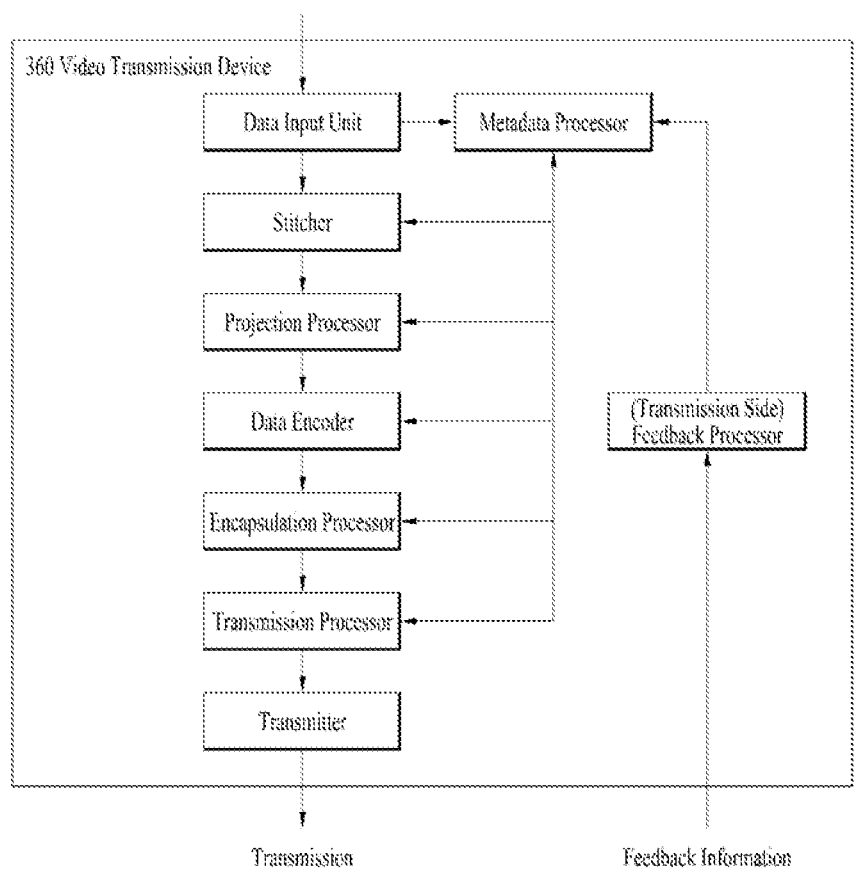
FIG. 2 illustrates a 360-degree video transmission apparatus according to one aspect of the present disclosure.

FIG. 2 illustrates a 360-degree video transmission apparatus according to one aspect of the present disclosure.

According to one aspect, the present disclosure may relate to a 360 video transmission apparatus. The 360 video transmission apparatus according to the present disclosure may perform operations related to the above-described preparation process to the transmission process. The 360 video transmission apparatus according to the present disclosure may include a data input unit, a stitcher, a projection processor, a region-wise packing processor (not shown), a metadata processor, a transmitter feedback processor, a data encoder, an encapsulation processor, a transmission processor and/or a transmitter as internal/external elements.

The data input unit may receive captured images/videos for respective views. The images/videos for the views may be images/videos captured by one or more cameras. In addition, the data input unit may receive metadata generated in a capture process. The data input unit may deliver the received images/videos for the views to the stitcher and deliver the metadata generated in the capture process to a signaling processor.

The stitcher may stitch the captured images/videos for the views. The stitcher may deliver the stitched 360 video data to the projection processor. The stitcher may receive necessary metadata from the metadata processor and use the metadata for stitching operation. The stitcher may deliver the metadata generated in the stitching process to the metadata processor. The metadata in the stitching process may include information indicating whether stitching has been performed, a stitching type, etc.

The projection processor may project the stitched 360 video data on a 2D image. The projection processor may perform projection according to various schemes which will be described below. The projection processor may perform mapping in consideration of the depth of 360 video data for each view. The projection processor may receive metadata necessary for projection from the metadata processor and use the metadata for the projection operation as necessary. The projection processor may deliver metadata generated in a projection process to the metadata processor. The metadata of the projection process may include a projection scheme type.

The region-wise packing processor (not shown) may perform the aforementioned region-wise packing process. That is, the region-wise packing processor may perform a process of dividing the projected 360 video data into regions, rotating or rearranging the regions or changing the resolution of each region. As described above, the region-wise packing process is an optional process, and when region-wise packing is not performed, the region-wise packing processor may be omitted. The region-wise packing processor may receive metadata necessary for region-wise packing from the metadata processor and use the metadata for the region-wise packing operation as necessary. The metadata of the region-wise packing processor may include a degree to which each region is rotated, the size of each region, etc.

The aforementioned stitcher, the projection processor and/or the region-wise packing processor may be realized by one hardware component according to an embodiment.

The metadata processor may process metadata which may be generated in the capture process, the stitching process, the projection process, the region-wise packing process, the encoding process, the encapsulation process and/or the processing process for transmission. The metadata processor may generate 360 video related metadata using such metadata. According to an embodiment, the metadata processor may generate the 360 video related metadata in the form of a signaling table. The 360 video related metadata may be called metadata or 360 video related signaling information according to signaling context. Furthermore, the metadata processor may deliver acquired or generated metadata to internal elements of the 360 video transmission apparatus as necessary. The metadata processor may deliver the 360 video related metadata to the data encoder, the encapsulation processor and/or the transmission processor such that the metadata may be transmitted to the reception side.

The data encoder may encode the 360 video data projected on the 2D image and/or the region-wise packed 360 video data. The 360 video data may be encoded in various formats.

The encapsulation processor may encapsulate the encoded 360 video data and/or 360 video related metadata into a file. Here, the 360 video related metadata may be delivered from the metadata processor. The encapsulation processor may encapsulate the data in a file format such as ISOBMFF, CFF or the like or process the data into a DASH segment. The encapsulation processor may include the 360 video related metadata in a file format according to an embodiment. For example, the 360 video related metadata may be included in boxes of various levels in an ISOBMFF file format or included as data in an additional track in a file. The encapsulation processor may encapsulate the 360 video related metadata into a file according to an embodiment. The transmission processor may perform processing for transmission on the 360 video data encapsulated in a file format. The transmission processor may process the 360 video data according to an arbitrary transmission protocol. The processing for transmission may include processing for delivery through a broadcast network and processing for delivery over a broadband. According to an embodiment, the transmission processor may receive 360 video related metadata from the metadata processor in addition to the 360 video data and perform processing for transmission on the 360 video related metadata.

The transmitter may transmit the processed 360 video data and/or the 360 video related metadata over a broadcast network and/or broadband. The transmitter may include an element for transmission over a broadcast network and an element for transmission over a broadband.

According to an embodiment of the 360 video transmission apparatus according to the present disclosure, the 360 video transmission apparatus may further include a data storage unit (not shown) as an internal/external element. The data storage unit may store the encoded 360 video data and/or 360 video related metadata before delivery thereof. Such data may be stored in a file format such as ISOBMFF. When 360 video is transmitted in real time, the data storage unit may not be used. However, 360 video is delivered on demand, in non-real time or over a broadband, encapsulated 360 data may be stored in the data storage unit for a predetermined period and then transmitted.

According to another embodiment of the 360 video transmission apparatus according to the present disclosure, the 360 video transmission apparatus may further include a transmitter feedback processor and/or a network interface (not shown) as internal/external elements. The network interface may receive feedback information from a 360 video reception apparatus according to the present disclosure and deliver the feedback information to the transmitter feedback processor. The transmitter feedback processor may deliver the feedback information to the stitcher, the projection processor, the region-wise packing processor, the data encoder, the encapsulation processor, the metadata processor and/or the transmission processor. The feedback information may be delivered to the metadata processor and then delivered to each internal element according to an embodiment. Upon reception of the feedback information, internal elements may reflect the feedback information in processing of 360 video data.

According to another embodiment of the 360 video transmission apparatus according to the present disclosure, the region-wise packing processor may rotate regions and map the regions on a 2D image. Here, the regions may be rotated in different directions at different angles and mapped on the 2D image. The regions may be rotated in consideration of neighboring parts and stitched parts of the 360 video data on the spherical plane before projection. Information about rotation of the regions, that is, rotation directions and angles may be signaled using 360 video related metadata. According to another embodiment of the 360 video transmission apparatus according to the present disclosure, the data encoder may perform encoding differently on respective regions. The data encoder may encode a specific region with high quality and encode other regions with low quality. The feedback processor at the transmission side may deliver the feedback information received from a 360 video reception apparatus to the data encoder such that the data encoder may use encoding methods differentiated for regions. For example, the transmitter feedback processor may deliver viewport information received from a reception side to the data encoder. The data encoder may encode regions including a region indicated by the viewport information with higher quality (UHD) than other regions.

According to another embodiment of the 360 video transmission apparatus according to the present disclosure, the transmission processor may perform processing for transmission differently on respective regions. The transmission processor may apply different transmission parameters (modulation orders, code rates, etc.) to regions such that data delivered to the regions have different robustnesses.

Here, the transmitter feedback processor may deliver the feedback information received from the 360 video reception apparatus to the transmission processor such that the transmission processor may perform transmission processing differentiated for respective regions. For example, the transmitter feedback processor may deliver viewport information received from the reception side to the transmission processor. The transmission processor may perform transmission processing on regions including a region indicated by the viewport information such that the regions have higher robustness than other regions.

The internal/external elements of the 360 video transmission apparatus according to the present disclosure may be hardware elements realized by hardware. According to an embodiment, the internal/external elements may be modified, omitted, replaced by other elements or integrated with other elements. According to an embodiment, additional elements may be added to the 360 video transmission apparatus.

Figure 3:
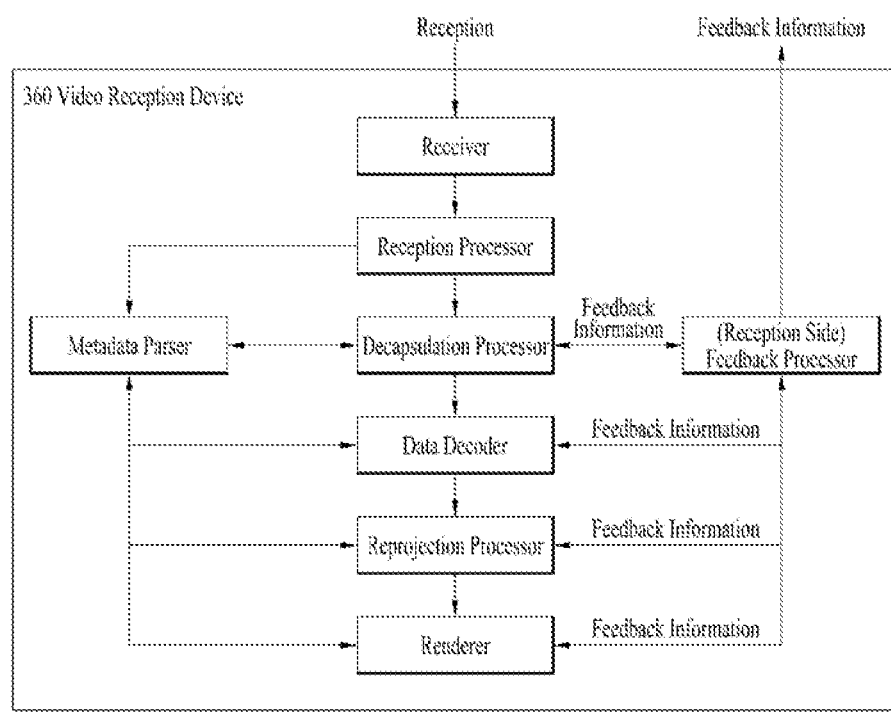
FIG. 3 illustrates a 360-degree video reception apparatus according to another aspect of the present disclosure.

FIG. 3 illustrates a 360-degree video reception apparatus according to another aspect of the present disclosure.

According to another aspect, the present disclosure may relate to a 360 video reception apparatus. The 360 video reception apparatus according to the present disclosure may perform operations related to the above-described processing process and/or the rendering process. The 360 video reception apparatus according to the present disclosure may include a reception unit, a reception processor, a decapsulation processor, a data decoder, a metadata parser, a receiver feedback processor, a re-projection processor and/or a renderer as internal/external elements.

The reception unit may receive 360 video data transmitted from the 360 video transmission apparatus according to the present disclosure. The reception unit may receive the 360 video data through a broadcast network or a broadband according to a transmission channel.

The reception processor may perform processing according to a transmission protocol on the received 360 video data. The reception processor may perform a reverse of the process of the transmission processor. The reception processor may deliver the acquired 360 video data to the decapsulation processor and deliver acquired 360 video related metadata to the metadata parser. The 360 video related metadata acquired by the reception processor may have a form of a signaling table.

The decapsulation processor may decapsulate the 360 video data in a file format received from the reception processor. The decapsulation processor may decapsulate files in ISOBMFF to acquire 360 video data and 360 video related metadata. The acquired 360 video data may be delivered to the data decoder and the acquired 360 video related metadata may be delivered to the metadata parser. The 360 video related metadata acquired by the decapsulation processor may have a form of box or track in a file format. The decapsulation processor may receive metadata necessary for decapsulation from the metadata parser as necessary.

The data decoder may decode the 360 video data. The data decoder may receive metadata necessary for decoding from the metadata parser. The 360 video related metadata acquired in the data decoding process may be delivered to the metadata parser.

The metadata parser may parse/decode the 360 video related metadata. The metadata parser may deliver the acquired metadata to the data decapsulation processor, the data decoder, the re-projection processor and/or the renderer.

The re-projection processor may re-project the decoded 360 video data. The re-projection processor may re-project the 360 video data on a 3D space. The 3D space may have different forms according to used 3D modes. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific region on the 3D space on the 3D space using the metadata necessary for re-projection.

The renderer may render the re-projected 360 video data. This may be represented as rendering of the 360 video data on a 3D space as described above. When two processes are simultaneously performed in this manner, the re-projection processor and the renderer may be integrated to perform both the processes in the renderer. According to an embodiment, the renderer may render only a region viewed by a user according to view information of the user.

A user may view part of the rendered 360 video through a VR display. The VR display is a device for reproducing 360 video and may be included in the 360 video reception apparatus (tethered) or connected to the 360 video reception apparatus as a separate device (un-tethered).

According to an embodiment of the 360 video reception apparatus according to the present disclosure, the 360 video reception apparatus may further include a (receiver) feedback processor and/or a network interface (not shown) as internal/external elements. The receiver feedback processor may acquire feedback information from the renderer, the re-projection processor, the data decoder, the decapsulation processor and/or the VR display and process the feedback information. The feedback information may include viewport information, head orientation information, gaze information, etc. The network interface may receive the feedback information from the receiver feedback processor and transmit the same to the 360 video transmission apparatus.

As described above, the feedback information may be used by the reception side in addition to being delivered to the transmission side. The receiver feedback processor may deliver the acquired feedback information to internal elements of the 360 video reception apparatus such that the feedback information is reflected in a rendering process. The receiver feedback processor may deliver the feedback information to the renderer, the re-projection processor, the data decoder and/or the decapsulation processor. For example, the renderer may preferentially render a region viewed by a user using the feedback information. In addition, the decapsulation processor and the data decoder may preferentially decapsulate and decode a region viewed by the user or a region to be viewed by the user.

The internal/external elements of the 360 video reception apparatus according to the present disclosure may be hardware elements realized by hardware. According to an embodiment, the internal/external elements may be modified, omitted, replaced by other elements or integrated with other elements. According to an embodiment, additional elements may be added to the 360 video reception apparatus.

Another aspect of the present disclosure may relate to a method of transmitting 360 video and a method of receiving 360 video. The methods of transmitting/receiving 360 video according to the present disclosure may be performed by the above-described 360 video transmission/reception apparatuses or embodiments thereof.

The aforementioned embodiments of the 360 video transmission/reception apparatuses and embodiments of the internal/external elements thereof may be combined. For example, embodiments of the projection processor and embodiments of the data encoder may be combined to create as many embodiments of the 360 video transmission apparatus as the number of the embodiments. The combined embodiments are also included in the scope of the present disclosure.

Figure 4:
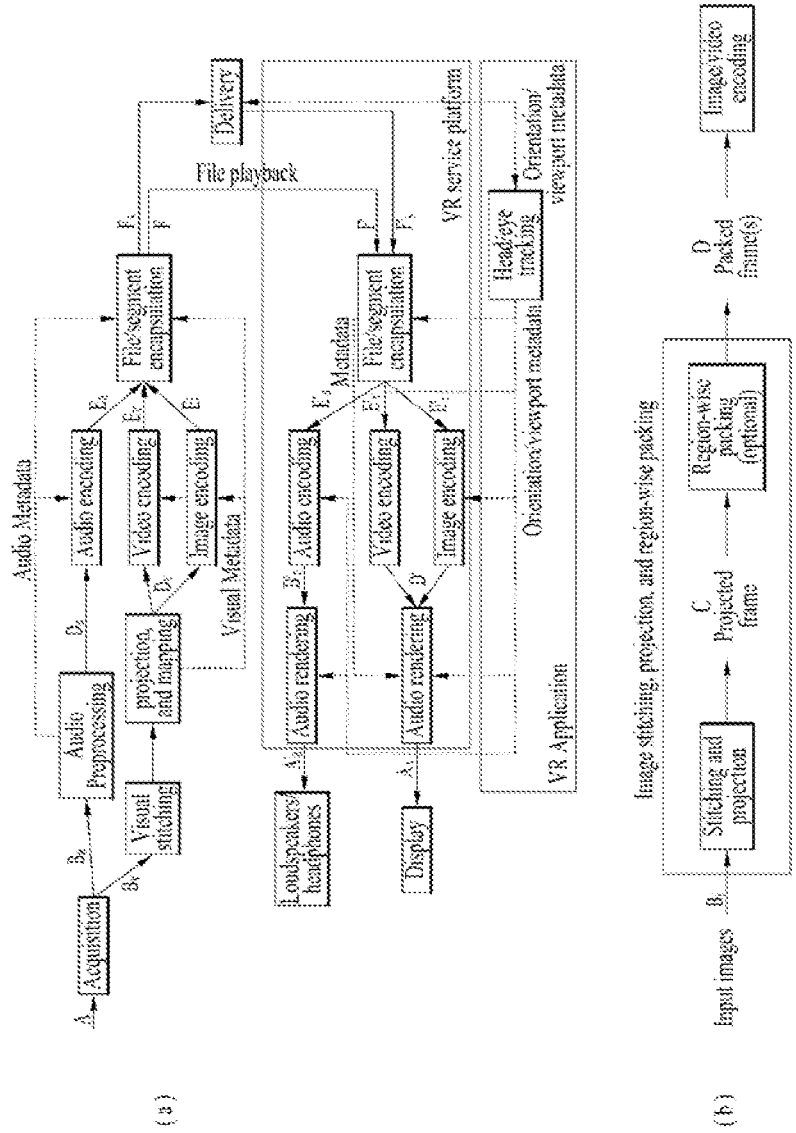
FIG. 4 illustrates a 360-degree video transmission apparatus/360-degree video reception apparatus according to another embodiment of the present disclosure.

FIG. 4 illustrates a 360-degree video transmission apparatus/360-degree video reception apparatus according to another embodiment of the present disclosure.

As described above, 360 content may be provided according to the architecture shown in (a). The 360 content may be provided in the form of a file or in the form of a segment based download or streaming service such as DASH. Here, the 360 content may be called VR content.

As described above, 360 video data and/or 360 audio data may be acquired.

The 360 audio data may be subjected to audio preprocessing and audio encoding. In these processes, audio related metadata may be generated, and the encoded audio and audio related metadata may be subjected to processing for transmission (file/segment encapsulation).

The 360 video data may pass through the aforementioned processes. The stitcher of the 360 video transmission apparatus may stitch the 360 video data (visual stitching). This process may be omitted and performed at the reception side according to an embodiment. The projection processor of the 360 video transmission apparatus may project the 360 video data on a 2D image (projection and mapping (packing)).

The stitching and projection processes are shown in (b) in detail. In (b), when the 360 video data (input images) is delivered, stitching and projection may be performed thereon. The projection process may be regarded as projecting the stitched 360 video data on a 3D space and arranging the projected 360 video data on a 2D image. In the specification, this process may be represented as projecting the 360 video data on a 2D image. Here, the 3D space may be a sphere or a cube. The 3D space may be identical to the 3D space used for re-projection at the reception side.

The 2D image may also be called a projected frame (C). Region-wise packing may be optionally performed on the 2D image. When region-wise packing is performed, the locations, forms and sizes of regions may be indicated such that the regions on the 2D image may be mapped on a packed frame (D). When region-wise packing is not performed, the projected frame may be identical to the packed frame. Regions will be described below. The projection process and the region-wise packing process may be represented as projecting regions of the 360 video data on a 2D image. The 360 video data may be directly converted into the packed frame without an intermediate process according to design.

In (a), the projected 360 video data may be image-encoded or video-encoded. Since the same content may be present for different viewpoints, the same content may be encoded into different bit streams. The encoded 360 video data may be processed into a file format such as ISOBMFF according to the aforementioned encapsulation processor. Alternatively, the encapsulation processor may process the encoded 360 video data into segments. The segments may be included in an individual track for DASH based transmission.

Along with processing of the 360 video data, 360 video related metadata may be generated as described above. This metadata may be included in a video stream or a file format and delivered. The metadata may be used for encoding, file format encapsulation, processing for transmission, etc.

The 360 audio/video data may pass through processing for transmission according to the transmission protocol and then may be transmitted. The aforementioned 360 video reception apparatus may receive the 360 audio/video data over a broadcast network or broadband.

In (a), a VR service platform may correspond to an embodiment of the aforementioned 360 video reception apparatus. In (a), loudspeakers/headphones, display and head/eye tracking components are performed by an external device or a VR application of the 360 video reception apparatus. According to an embodiment, the 360 video reception apparatus may include all of these components. According to an embodiment, the head/eye tracking component may correspond to the aforementioned receiver feedback processor.

The 360 video reception apparatus may perform processing for reception (file/segment decapsulation) on the 360 audio/video data. The 360 audio data may be subjected to audio decoding and audio rendering and provided to a user through a speaker/headphone.

The 360 video data may be subjected to image decoding or video decoding and visual rendering and provided to the user through a display. Here, the display may be a display supporting VR or a normal display.

As described above, the rendering process may be regarded as a process of re-projecting 360 video data on a 3D space and rendering the re-projected 360 video data. This may be represented as rendering of the 360 video data on the 3D space.

The head/eye tracking component may acquire and process head orientation information, gaze information and viewport information of a user. This has been described above.

A VR application which communicates with the aforementioned processes of the reception side may be present at the reception side.

Figure 5:
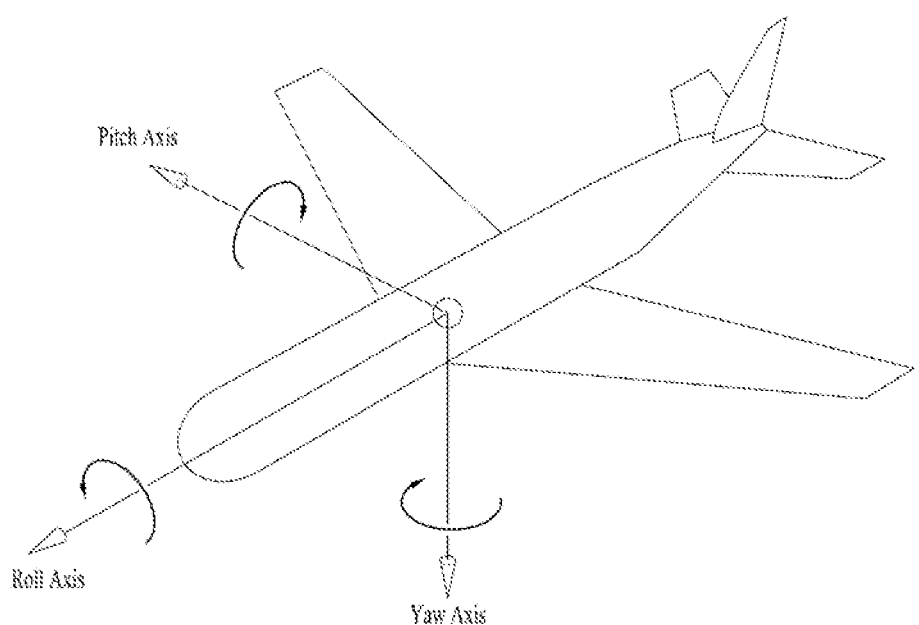
FIG. 5 illustrates the concept of aircraft principal axes for describing a 3D space of the present disclosure.

FIG. 5 illustrates the concept of aircraft principal axes for describing a 3D space of the present disclosure.

In the present disclosure, the concept of aircraft principal axes may be used to represent a specific point, location, direction, spacing and region in a 3D space.

That is, in the present disclosure, the concept of aircraft principal axes may be used to describe a 3D space before projection or after re-projection and to signal the same. According to an embodiment, a method using X, Y and Z axes or a spherical coordinate system may be used.

An aircraft may feely rotate in the three dimension. Axes which form the three dimension are called pitch, yaw and roll axes. In the specification, these may be represented as pitch, yaw and roll or a pitch direction, a yaw direction and a roll direction.

The pitch axis may refer to a reference axis of a direction in which the front end of the aircraft rotates up and down. In the shown concept of aircraft principal axes, the pitch axis may refer to an axis connected between wings of the aircraft.

The yaw axis may refer to a reference axis of a direction in which the front end of the aircraft rotates to the left/right. In the shown concept of aircraft principal axes, the yaw axis may refer to an axis connected from the top to the bottom of the aircraft.

The roll axis may refer to an axis connected from the front end to the tail of the aircraft in the shown concept of aircraft principal axes, and rotation in the roll direction may refer to rotation based on the roll axis.

As described above, a 3D space in the present disclosure may be described using the concept of pitch, yaw and roll.

Figure 6:
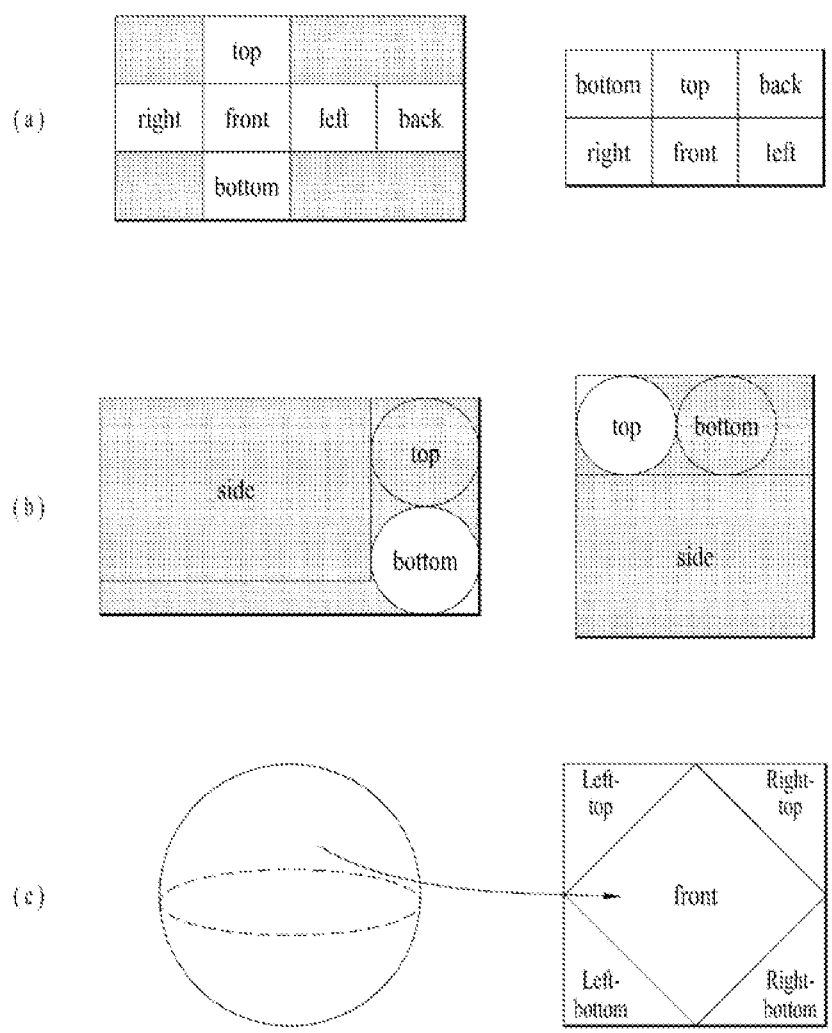
FIG. 6 illustrates projection schemes according to an embodiment of the present disclosure.

FIG. 6 illustrates projection schemes according to an embodiment of the present disclosure.

As described above, the projection processor of the 360 video transmission apparatus according to the present disclosure may project stitched 360 video data on a 2D image. In this process, various projection schemes may be used.

According to another embodiment of the 360 video transmission apparatus according to the present disclosure, the projection processor may perform projection using a cubic projection scheme. For example, stitched video data may be represented on a spherical plane. The projection processor may segment the 360 video data into a cube and project the same on the 2D image. The 360 video data on the spherical plane may correspond to planes of the cube and be projected on the 2D image as shown in (a).

According to another embodiment of the 360 video transmission apparatus according to the present disclosure, the projection processor may perform projection using a cylindrical projection scheme. Similarly, if stitched video data may be represented on a spherical plane, the projection processor may segment the 360 video data into a cylinder and project the same on the 2D image. The 360 video data on the spherical plane may correspond to the side, top and bottom of the cylinder and be projected on the 2D image as shown in (b).

According to another embodiment of the 360 video transmission apparatus according to the present disclosure, the projection processor may perform projection using a pyramid projection scheme. Similarly, if stitched video data may be represented on a spherical plane, the projection processor may regard the 360 video data as a pyramid form and project the same on the 2D image. The 360 video data on the spherical plane may correspond to the front, left top, left bottom, right top and right bottom of the pyramid and be projected on the 2D image as shown in (c).

According to an embodiment, the projection processor may perform projection using an equirectangular projection scheme and a panoramic projection scheme in addition to the aforementioned schemes.

As described above, regions may refer to regions obtained by dividing a 2D image on which 360 video data is projected. Such regions need not correspond to respective sides of the 2D image projected according to a projection scheme. However, regions may be divided such that the sides of the projected 2D image correspond to the regions and region-wise packing may be performed according to an embodiment. Regions may be divided such that a plurality of sides may correspond to one region or one side may correspond to a plurality of regions according to an embodiment. In this case, the regions may depend on projection schemes. For example, the top, bottom, front, left, right and back sides of the cube may be respective regions in (a). The side, top and bottom of the cylinder may be respective regions in (b). The front, left top, left bottom, right top and right bottom sides of the pyramid may be respective regions in (c).

Figure 7:
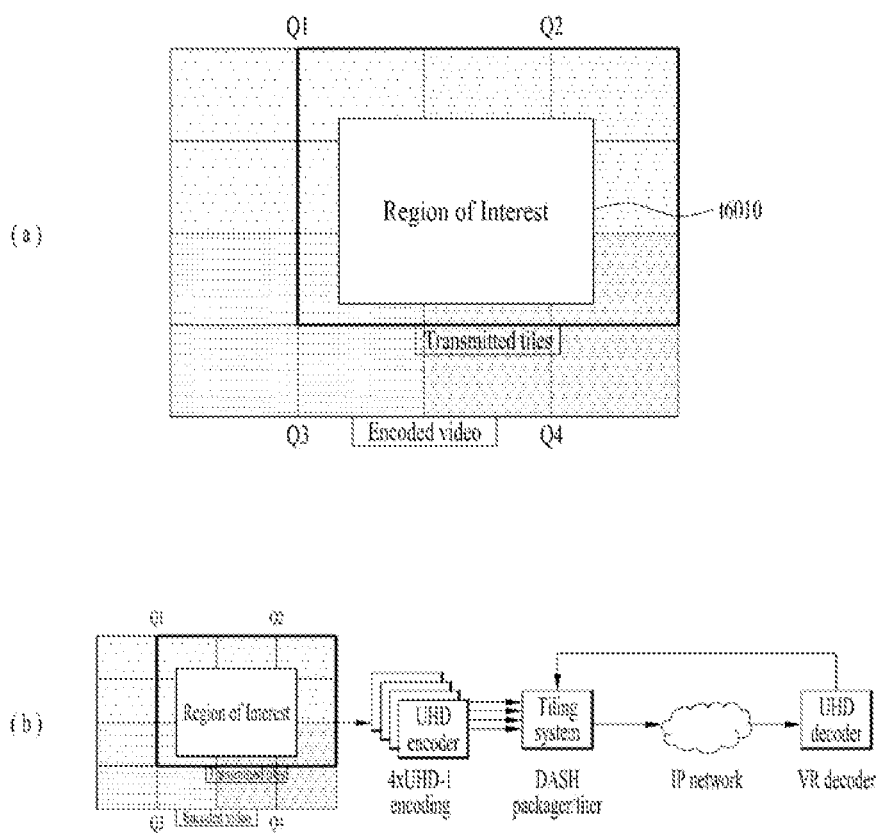
FIG. 7 illustrates tiles according to an embodiment of the present disclosure.

FIG. 7 illustrates tiles according to an embodiment of the present disclosure.

360 video data projected on a 2D image or region-wise packed 360 video data may be divided into one or more tiles. (a) shows that one 2D image is divided into 16 tiles. Here, the 2D image may be the aforementioned projected frame or packed frame. According to another embodiment of the 360 video transmission apparatus according to the present disclosure, the data encoder may independently encode the tiles.

The aforementioned region-wise packing may be discriminated from tiling. The aforementioned region-wise packing may refer to a process of dividing 360 video data projected on a 2D image into regions and processing the regions in order to increase coding efficiency or adjusting resolution. Tiling may refer to a process through which the data encoder divides a projected frame or a packed frame into tiles and independently encode the tiles. When 360 video is provided, a user does not simultaneously use all parts of the 360 video. Tiling enables only tiles corresponding to important part or specific part, such as a viewport currently viewed by the user, to be transmitted or consumed to or by a reception side on a limited bandwidth. Through tiling, a limited bandwidth may be used more efficiently and the reception side may reduce computational load compared to a case in which the entire 360 video data is processed simultaneously.

A region and a tile are discriminated from each other and thus they need not be identical. However, a region and a tile may refer to the same area according to an embodiment.

Region-wise packing may be performed to tiles and thus regions may correspond to tiles according to an embodiment. Furthermore, when sides according to a projection scheme correspond to regions, each side, region and tile according to the projection scheme may refer to the same area according to an embodiment. A region may be called a VR region and a tile may be called a tile region according to context.

Region of Interest (ROI) may refer to a region of interest of users, which is provided by a 360 content provider. When 360 video is produced, the 360 content provider may produce the 360 video in consideration of a specific region which is expected to be a region of interest of users. According to an embodiment, ROI may correspond to a region in which important content of the 360 video is reproduced.

According to another embodiment of the 360 video transmission/reception apparatuses according to the present disclosure, the receiver feedback processor may extract and collect viewport information and deliver the same to the transmitter feedback processor. In this process, the viewport information may be delivered using network interfaces of both sides. In the 2D image shown in (a), a viewport t6010 is displayed. Here, the viewport may be displayed over nine tiles of the 2D images.

In this case, the 360 video transmission apparatus may further include a tiling system. According to an embodiment, the tiling system may be located following the data encoder (b), may be included in the aforementioned data encoder or transmission processor, or may be included in the 360 video transmission apparatus as a separate internal/external element.

The tiling system may receive viewport information from the transmitter feedback processor. The tiling system may select only tiles included in a viewport region and transmit the same. In the 2D image shown in (a), only nine tiles including the viewport region t6010 among 16 tiles may be transmitted. Here, the tiling system may transmit tiles in a unicast manner over a broadband because the viewport region is different for users.

In this case, the transmitter feedback processor may deliver the viewport information to the data encoder. The data encoder may encode the tiles including the viewport region with higher quality than other tiles.

Furthermore, the transmitter feedback processor may deliver the viewport information to the metadata processor. The metadata processor may deliver metadata related to the viewport region to each internal element of the 360 video transmission apparatus or include the metadata in 360 video related metadata.

By using this tiling method, transmission bandwidths may be saved and processes differentiated for tiles may be performed to achieve efficient data processing/transmission.

The above-described embodiments related to the viewport region may be applied to specific regions other than the viewport region in a similar manner. For example, the aforementioned processes performed on the viewport region may be performed on a region determined to be a region in which users are interested through the aforementioned gaze analysis, ROI, and a region (initial view, initial viewpoint) initially reproduced when a user views 360 video through a VR display.

According to another embodiment of the 360 video transmission apparatus according to the present disclosure, the transmission processor may perform processing for transmission differently on tiles. The transmission processor may apply different transmission parameters (modulation orders, code rates, etc.) to tiles such that data delivered for the tiles has different robustnesses.

Here, the transmitter feedback processor may deliver feedback information received from the 360 video reception apparatus to the transmission processor such that the transmission processor may perform transmission processing differentiated for tiles. For example, the transmitter feedback processor may deliver the viewport information received from the reception side to the transmission processor. The transmission processor may perform transmission processing such that tiles including the corresponding viewport region have higher robustness than other tiles.

FIG. 8 illustrates 360-degree video related metadata according to an embodiment of the present disclosure.

The aforementioned 360 video related metadata may include various types of metadata related to 360 video. The 360 video related metadata may be called 360 video related signaling information according to context. The 360 video related metadata may be included in an additional signaling table and transmitted, included in a DASH MPD and transmitted, or included in a file format such as ISOBMFF in the form of box and delivered. When the 360 video related metadata is included in the form of box, the 360 video related metadata may be included in various levels such as a file, fragment, track, sample entry, sample, etc. and may include metadata about data of the corresponding level.

According to an embodiment, part of the metadata, which will be described below, may be configured in the form of a signaling table and delivered, and the remaining part may be included in a file format in the form of a box or a track.

According to an embodiment of the 360 video related metadata, the 360 video related metadata may include basic metadata related to a projection scheme, stereoscopic related metadata, initial view/initial viewpoint related metadata, ROI related metadata, FOV (Field of View) related metadata and/or cropped region related metadata. According to an embodiment, the 360 video related metadata may include additional metadata in addition to the aforementioned metadata.

Embodiments of the 360 video related metadata according to the present disclosure may include at least one of the aforementioned basic metadata, stereoscopic related metadata, initial view/initial viewpoint related metadata, ROI related metadata, FOV related metadata, cropped region related metadata and/or additional metadata. Embodiments of the 360 video related metadata according to the present disclosure may be configured in various manners depending on the number of cases of metadata included therein. According to an embodiment, the 360 video related metadata may further include additional metadata in addition to the aforementioned metadata.

The basic metadata may include 3D model related information, projection scheme related information and the like. The basic metadata may include a vr_geometry field, a projection scheme field, etc. According to an embodiment, the basic metadata may further include additional information.

The vr_geometry field may indicates the type of a 3D model supported by the corresponding 360 video data. When the 360 video data is re-projected on a 3D space as described above, the 3D space may have a form according to a 3D model indicated by the vr_geometry field. According to an embodiment, a 3D model used for rendering may differ from the 3D model used for re-projection, indicated by the vr_geometry field. In this case, the basic metadata may further include a field which indicates the 3D model used for rendering. When the field has values of 0, 1, 2 and 3, the 3D space may conform to 3D models of a sphere, a cube, a cylinder and a pyramid. When the field has the remaining values, the field may be reserved for future use. According to an embodiment, the 360 video related metadata may further include detailed information about the 3D model indicated by the field. Here, the detailed information about the 3D model may refer to the radius of a sphere, the height of a cylinder, etc. for example. This field may be omitted.

The projection_scheme field may indicates a projection scheme used when the 360 video data is projected on a 2D image. When the field has values of 0, 1, 2, 3, 4, and 5, the field indicates that the equirectangular projection scheme, cubic projection scheme, cylindrical projection scheme, tile-based projection scheme, pyramid projection scheme and panoramic projection scheme are used. When the field has a value of 6, the field indicates that the 360 video data is directly projected on the 2D image without stitching. When the field has the remaining values, the field may be reserved for future use. According to an embodiment, the 360 video related metadata may further include detailed information about regions generated according to a projection scheme specified by the field. Here, the detailed information about regions may refer to information indicating whether regions have been rotated, the radius of the top region of a cylinder, etc. for example.

The stereoscopic related metadata may include information about 3D related properties of the 360 video data. The stereoscopic related metadata may include an is_stereoscopic field and/or a stereo_mode field. According to an embodiment, the stereoscopic related metadata may further include additional information.

The is_stereoscopic field may indicate whether the 360 video data supports 3D. When the field is 1, the 360 video data supports 3D. When the field is 0, the 360 video data does not support 3D. This field may be omitted.

The stereo_mode field may indicate 3D layout supported by the corresponding 360 video. Whether the 360 video supports 3D may be indicated only using this field. In this case, the is_stereoscopic field may be omitted. When the field is 0, the 360 video may be a mono mode. That is, the projected 2D image may include only one mono view. In this case, the 360 video may not support 3D.

When this field is 1 and 2, the 360 video may conform to left-right layout and top-bottom layout. The left-right layout and top-bottom layout may be called a side-by-side format and a top-bottom format. In the case of the left-right layout, 2D images on which left image/right image are projected may be located at the left/right on an image frame. In the case of the top-bottom layout, 2D images on which left image/right image are projected may be located at the top/bottom on an image frame. When the field has the remaining values, the field may be reserved for future use.

The initial view/initial viewpoint related metadata may include information about a view (initial view) which is viewed by a user when initially reproducing 360 video. The initial view/initial viewpoint related metadata may include an initial_view_yaw_degree field, an initial_view_pitch_degree field and/or an initial_view_roll_degree field. According to an embodiment, the initial view/initial viewpoint related metadata may further include additional information.

The initial_view_yaw_degree field, initial_view_pitch_degree field and initial_view_roll_degree field may indicates that an initial view when the 360 video is reproduced. That is, the center point of a viewport which is initially viewed when the 360 video is reproduced may be indicated by these three fields. The fields may indicates the center point using a direction (sign) and a degree (angle) of rotation on the basis of yaw, pitch and roll axes. Here, the viewport which is initially viewed when the 360 video is reproduced according to FOV. The width and height of the initial viewport based on the indicated initial view may be determined through FOV. That is, the 360 video reception apparatus may provide a specific region of the 360 video as an initial viewport to a user using the three fields and FOV information.

According to an embodiment, the initial view indicated by the initial view/initial viewpoint related metadata may be changed per scene. That is, scenes of the 360 video change as 360 content proceeds with time. The initial view or initial viewport which is initially viewed by a user may change for each scene of the 360 video. In this case, the initial view/initial viewpoint related metadata may indicate the initial view per scene. To this end, the initial view/initial viewpoint related metadata may further include a scene identifier for identifying a scene to which the initial view is applied. In addition, since FOV may change per scene of the 360 video, the initial view/initial viewpoint related metadata may further include FOV information per scene which indicates FOV corresponding to the relative scene.

The ROI related metadata may include information related to the aforementioned ROI. The ROI related metadata may include a 2_d_roi_range_flag field and/or a 3_d_roi_range_flag field. These two fields may indicates whether the ROI related metadata includes fields which represent ROI on the basis of a 2D image or fields which represent ROI on the basis of a 3D space. According to an embodiment, the ROI related metadata may further include additional information such as differentiate encoding information depending on ROI and differentiate transmission processing information depending on ROI.

When the ROI related metadata includes fields which represent ROI on the basis of a 2D image, the ROI related metadata may include a min_top_left_x field, a max_top_left_x field, a min_top_left_y field, a max_top_left_y field, a min_width field, a max_width field, a min_height field, a max_height field, a min_x field, a max_x field, a min_y field and/or a max_y field.

The min_top_left_x field, max_top_left_x field, min_top_left_y field, max_top_left_y field may represent minimum/maximum values of the coordinates of the left top end of the ROI. These fields may sequentially indicates a minimum x coordinate, a maximum x coordinate, a minimum y coordinate and a maximum y coordinate of the left top end.

The min_width field, max_width field, min_height field and max_height field may indicate the minimum/maximum values of the width and height of the ROI. These fields may sequentially indicate the minimum value and a maximum value of the width and a minimum value and a maximum value of the height.

The min_x field, max_x field, min_y field and max_y field may indicate the minimum and maximum values of coordinates in the ROI. These fields may sequentially indicate a minimum x coordinate, a maximum x coordinate, a minimum y coordinate and a maximum y coordinate of coordinates in the ROI. These fields may be omitted.

When ROI related metadata includes fields which indicates ROI on the basis of coordinates on a 3D rendering space, the ROI related metadata may include a min_yaw field, a max_yaw field, a min_pitch field, a max_pitch field, a min_roll field, a max_roll field, a min_field_of_view field and/or a max_field_of_view field.

The min_yaw field, max_yaw field, min_pitch field, max_pitch field, min_roll field and max_roll field may indicate a region occupied by ROI on a 3D space using minimum/maximum values of yaw, pitch and roll. These fields may sequentially indicate a minimum value of yaw-axis based reference rotation amount, a maximum value of yaw-axis based reference rotation amount, a minimum value of pitch-axis based reference rotation amount, a maximum value of pitch-axis based reference rotation amount, a minimum value of roll-axis based reference rotation amount, and a maximum value of roll-axis based reference rotation amount.

The min_field_of_view field and max_field_of_view field may indicate minimum/maximum values of FOV of the corresponding 360 video data. FOV may refer to the range of view displayed at once when 360 video is reproduced. The min_field_of_view field and max_field_of_view field may indicate minimum and maximum values of FOV. These fields may be omitted. These fields may be included in FOV related metadata which will be described below.

The FOV related metadata may include the aforementioned FOV related information. The FOV related metadata may include a content_fov_flag field and/or a content_fov field. According to an embodiment, the FOV related metadata may further include additional information such as the aforementioned minimum/maximum value related information of FOV.

The content_fov_flag field may indicate whether corresponding 360 video includes information about FOV intended when the 360 video is produced. When this field value is 1, a content_fov field may be present.

The content_fov field may indicate information about FOV intended when the 360 video is produced. According to an embodiment, a region displayed to a user at once in the 360 video may be determined according to vertical or horizontal FOV of the 360 video reception apparatus. Alternatively, a region displayed to a user at once in the 360 video may be determined by reflecting FOV information of this field according to an embodiment.

Cropped region related metadata may include information about a region including 360 video data in an image frame. The image frame may include a 360 video data projected active video area and other areas. Here, the active video area may be called a cropped region or a default display region. The active video area is viewed as 360 video on an actual VR display and the 360 video reception apparatus or the VR display may process/display only the active video area. For example, when the aspect ratio of the image frame is 4:3, only an area of the image frame other than an upper part and a lower part of the image frame may include 360 video data. This area may be called the active video area.

The cropped region related metadata may include an is_cropped_region field, a cr_region_left_top_x field, a cr_region_left_top_y field, a cr_region_width field and/or a cr_region_height field. According to an embodiment, the cropped region related metadata may further include additional information.

The is_cropped_region field may be a flag which indicates whether the entire area of an image frame is used by the 360 video reception apparatus or the VR display. That is, this field may indicate whether the entire image frame indicates an active video area. When only part of the image frame is an active video area, the following four fields may be added.

A cr_region_left_top_x field, a cr_region_left_top_y field, a cr_region_width field and a cr_region_height field may indicate an active video area in an image frame. These fields may indicate the x coordinate of the left top, the y coordinate of the left top, the width and the height of the active video area. The width and the height may be represented in units of pixel.

As described above, the 360-degree video-related signaling information or metadata may be included in an arbitrarily defined signaling table, may be included in the form of a box in a file format such as ISOBMFF or Common File Format, or may be included and transmitted in a DASH MPD. In addition, 360-degree media data may be included and transmitted in such a file format or a DASH segment.

Hereinafter, ISOBMFF and DASH MPD will be described one by one.

Figure 9:
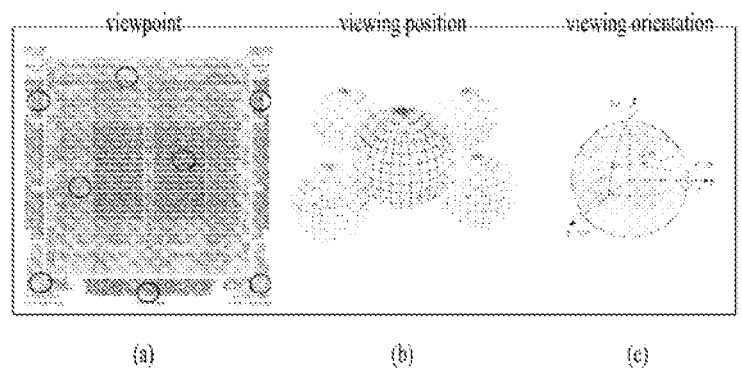
FIG. 9 illustrates a viewpoint and a viewing position that are additionally defined in the 3DoF+ VR system.

FIG. 9 illustrates a viewpoint and viewing location additionally defined in a 3DoF+ VR system.

The 360 video based VR system according to embodiments may provide visual/auditory experiences for different viewing orientations with respect to a location of a user for 360 video based on the 360 video processing process described above. This method may be referred to as three degree of freedom (3DoF) plus. Specifically, the VR system that provides visual/auditory experiences for different orientations in a fixed location of a user may be referred to as a 3DoF based VR system.

The VR system that may provide extended visual/auditory experiences for different orientations in different viewpoints and different viewing locations in the same time zone may be referred to as a 3DoF+ or 3DoF plus based VR system.

1) Assuming a space such as (a) (an example of art center), different locations (an example of art center marked with a red circle) may be considered as the respective viewpoints. Here, video/audio provided by the respective viewpoints existing in the same space as in the example may have the same time flow.

2) In this case, different visual/auditory experiences may be provided according to a viewpoint change (head motion) of a user in a specific location. That is, spheres of various viewing locations may be assumed as shown in (b) for a specific viewpoint, and video/audio/text information in which a relative location of each viewpoint is reflected may be provided.

3) Visual/auditory information of various orientations such as the existing 3DoF may be delivered at a specific viewpoint of a specific location as shown in (c). In this case, additional various sources as well as main sources (video/audio/text) may be provided in combination, and this may be associated with a viewing orientation of a user or information may be delivered independently.

Figure 10:
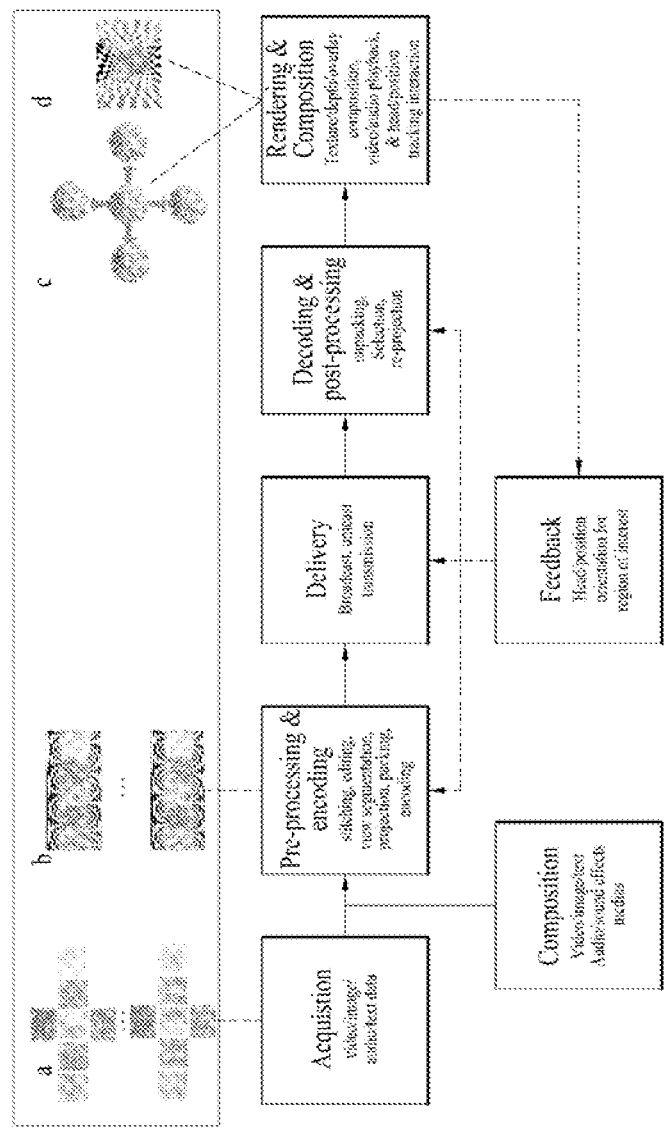
FIG. 10 illustrates a method of implementing 360-degree video signal processing and a related transmission/reception apparatus based on a 3DoF+ system.

FIG. 10 is a view showing a method for implementing 360-degree video signal processing and a related transmission apparatus/reception apparatus based on 3DoF+ system.

FIG. 10 is an example of 3DoF+ end-to-end system flow chart including video acquisition, preprocessing, transmission, (post)processing, rendering and feedback processes of 3DoF+.

1) Acquisition: may mean a process of acquiring 360-degree video through capture, composition or generation of 360-degree video. Various kinds of video/audio information according to head motion may be acquired for a plurality of locations through this process. In this case, video information may include depth information as well as visual information (texture). At this time, a plurality of kinds of information of different viewing locations according to different viewpoints may be acquired as in the example of video information of a.

2) Composition: may define a method for composition to include video (video/image, etc.) through external media, voice (audio/effect sound, etc.) and text (caption, etc.) as well as information acquired through the video/audio input module in user experiences.

3) Preprocessing: is a preparation (preprocessing) process for transmission/delivery of the acquired 360-degree video, and may include stitching, projection, region wise packing and/or encoding process. That is, this process may include preprocessing and encoding processes for modifying/complementing data such as video/audio/text information according to a producer's intention. For example, the preprocessing process of the video may include mapping (stitching) of the acquired visual information onto 360 sphere, editing such as removing a region boundary, reducing difference in color/brightness or providing visual effect of video, view segmentation according to viewpoint, a projection for mapping video on 360 sphere into 2D image, region-wise packing for rearranging video according to a region, and encoding for compressing video information. A plurality of projection videos of different viewing locations according to different viewpoints may be generated like example in view of video of B.

4) Delivery: may mean a process of processing and transmitting video/audio data and metadata subjected to the preparation process (preprocessing). As a method for delivering a plurality of video/audio data and related metadata of different viewing locations according to different viewpoints, a broadcast network or a communication network may be used, or unidirectional delivery method may be used.

5) Post-processing & composition: may mean a post-processing process for decoding and finally reproducing received/stored video/audio/text data. For example, the post-processing process may include unpacking for unpacking a packed video and re-projection for restoring 2D projected image to 3D sphere image as described above.

6) Rendering: may mean a process of rendering and displaying re-projected image/video data on a 3D space. In this process, the process may be reconfigured to finally output video/audio signals. A viewing orientation, viewing location/head location and viewpoint, in which a user's region of interest exists, may be subjected to tracking, and necessary video/audio/text information may selectively be used according to this information. At this time, in case of video signal, different viewing locations may be selected according to the user's region of interest as shown in c, and video in a specific orientation of a specific viewpoint at a specific location may finally be output as shown in d.

7) Feedback: may mean a process of delivering various kinds of feedback information, which may be acquired during a display process, to a transmission side. In this embodiment, a viewing orientation, a viewing location, and a viewpoint, which corresponds to a user's region of interest, may be estimated, and feedback may be delivered to reproduce video/audio based on the estimated result.

Figure 11A:
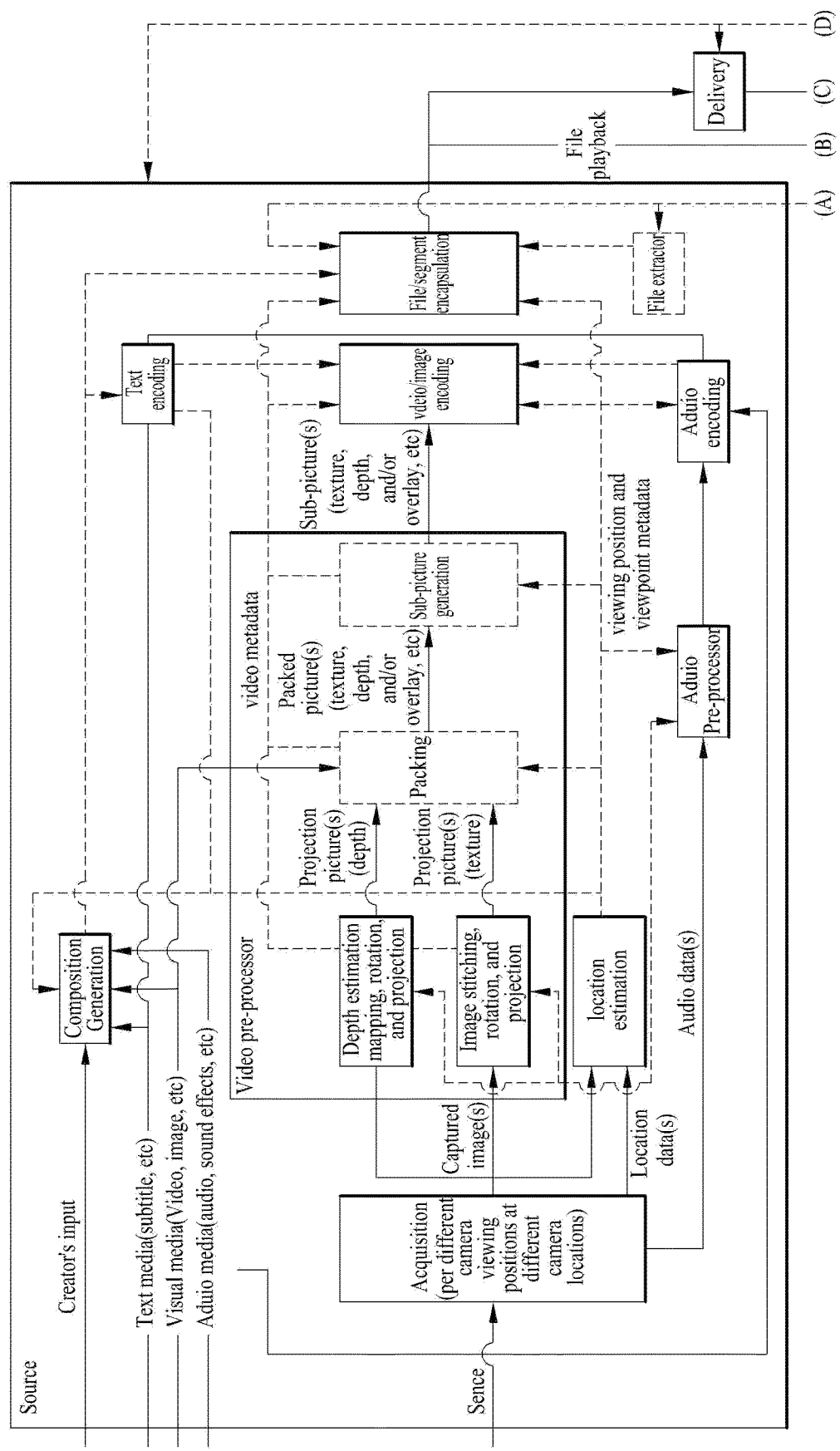
FIGS. 11A and 11B shows the structure of a 3DoF+ end-to-end system.
Figure 11B:
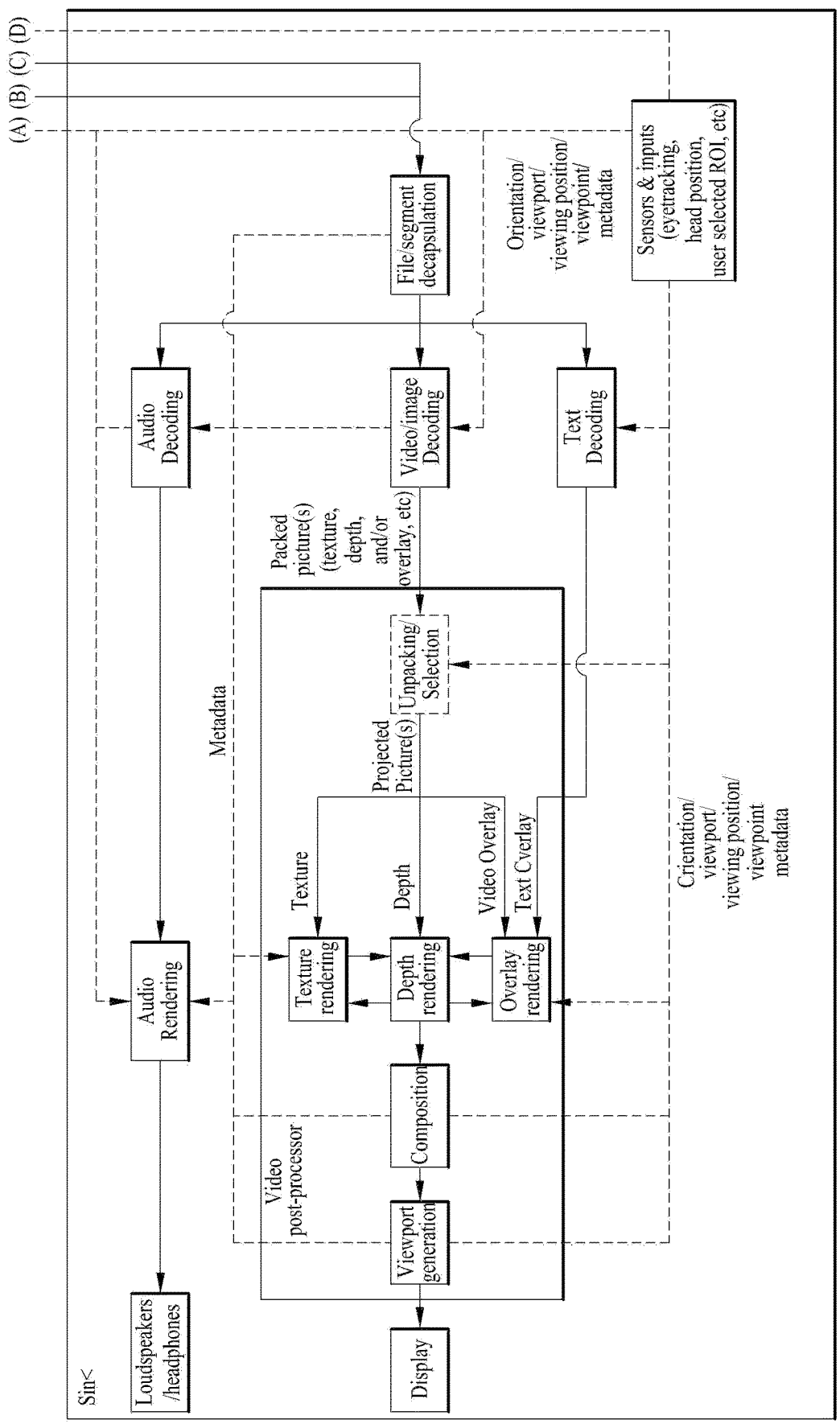

FIGS. 11A and 11B illustrate an architecture of a 3DoF+ end-to-end system.

FIGS. 11A and 11B illustrate an architecture of a 3DoF+ end-to-end system. As described in the architecture of FIGS. 11A and 11B, 3DoF+ 360 contents may be provided.

The 360-degree video transmission apparatus may include an acquisition unit for acquiring 360-degree video (image)/audio data, a video/audio pre-processor for processing the acquired data, a composition generation unit for composing additional information an encoding unit for encoding text, audio and projected 360-degree video, and an encapsulation unit for encapsulating the encoded data. As described above, the encapsulated data may be output in the form of bitstreams. The encoded data may be encapsulated in a file format such as ISOBMFF and CFF, or may be processed in the form of other DASH segment. The encoded data may be delivered to the 360-degree video reception apparatus through a digital storage medium. Although not shown explicitly, the encoded data may be subjected to processing for transmission through the transmission-processor and then transmitted through a broadcast network or a broadband, as described above.

The data acquisition unit may simultaneously or continuously acquire different kinds of information according to sensor orientation (viewing orientation in view of video), information acquisition timing of a sensor (sensor location, or viewing location in view of video), and information acquisition location of a sensor (viewpoint in case of video). At this time, video, image, audio and location information may be acquired.

In case of video data, texture and depth information may respectively be acquired, and video preprocessing may be performed according to characteristic of each component. For example, in case of the text information, 360-degree omnidirectional video may be configured using videos of different orientations of the same viewing location, which are acquired at the same viewpoint using image sensor location information. To this end, video stitching may be performed. Also, projection and/or region wise packing for modifying the video to a format for encoding may be performed. In case of depth image, the image may generally be acquired through a depth camera. In this case, the depth image may be made in the same format such as texture. Alternatively, depth data may be generated based on data measured separately. After image per component is generated, additional conversion (packing) to a video format for efficient compression may be performed, or a sub-picture generation for reconfiguring the images by segmentation into sub-pictures which are actually necessary may be performed. Information on image configuration used in a video preprocessing end is delivered as video metadata.

If additionally given video/audio/text information is served together with the acquired data (or data for main service), it is required to provide information for composing these kinds of information during final reproduction. The composition generation unit generates information for composing externally generated media data (video/image in case of video, audio/effect sound in case of audio, and caption in case of text) at a final reproduction end based on a producer's intention, and this information is delivered as composition data.

The video/audio/text information subjected to each processing is compressed using each encoder, and encapsulated on a file or segment basis according to application. At this time, only necessary information may be extracted (file extractor) according to a method for configuring video, file or segment.

Also, information for reconfiguring each data in the receiver is delivered at a codec or file format/system level, and in this case, the information includes information (video/audio metadata) for video/audio reconfiguration, composition information (composition metadata) for overlay, viewpoint capable of reproducing video/audio and viewing location information according to each viewpoint (viewing location and viewpoint metadata), etc. This information may be processed through a separate metadata processor.

The 360-degree video reception apparatus may include a file/segment decapsulation unit for decapsulating a received file and segment, a decoding unit for generating video/audio/text information from bitstreams, a post-processor for reconfiguring the video/audio/text in the form of reproduction, a tracking unit for tracking a user's region of interest, and a display which is a reproduction unit.

The bitstreams generated through decapsulation may be segmented into video/audio/text according to types of data and separately decoded to be reproduced.

The tracking unit generates viewpoint of a user's region of interest, viewing location at the corresponding viewpoint, and viewing orientation information at the corresponding viewing location based on a sensor and the user's input information. This information may be used for selection or extraction of a region of interest in each module of the 360-degree video reception apparatus, or may be used for a post-processing process for emphasizing information of the region of interest. Also, if this information is delivered to the 360-degree video transmission apparatus, this information may be used for file selection (file extractor) or subpicture selection for efficient bandwidth use, and may be used for various video reconfiguration methods based on a region of interest (viewport/viewing location/viewpoint dependent processing).

The decoded video signal may be processed according to various processing methods of the video configuration method. If image packing is performed in the 360-degree video transmission apparatus, a process of reconfiguring video is required based on the information delivered through metadata. In this case, video metadata generated by the 360-degree video transmission apparatus may be used. Also, if videos of a plurality of viewpoints or a plurality of viewing locations or various orientations are included in the decoded video, information matched with viewpoint, viewing location, and orientation information of the user's region of interest, which are generated through tracking, may be selected and processed. At this time, viewing location and viewpoint metadata generated at the transmission side may be used. Also, if a plurality of components are delivered for a specific location, viewpoint and orientation or video information for overlay is separately delivered, a rendering process for each of the data and information may be included. The video data (texture, depth and overlay) subjected to a separate rendering process may be subjected to a composition process. At this time, composition metadata generated by the transmission side may be used. Finally, information for reproduction in viewport may be generated according to the user's ROI.

The decoded audio signal may be generated as an audio signal capable of being reproduced, through an audio renderer and/or the post-processing process. At this time, information suitable for the user's request may be generated based on the information on the user's ROI and the metadata delivered to the 360-degree video reception apparatus.

The decoded text signal may be delivered to an overlay renderer and processed as overlay information based on text such as subtitle. A separate text post-processing process may be included, if necessary.

Figure 12:
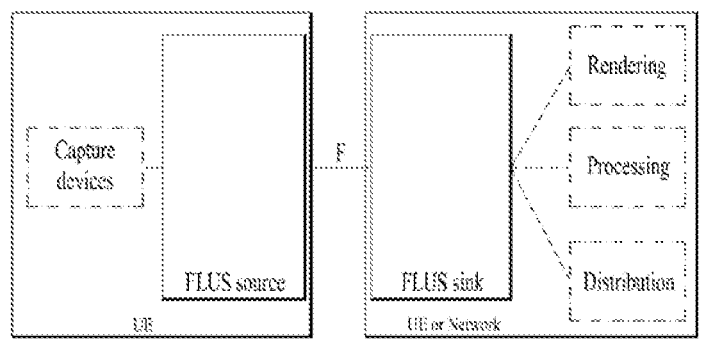
FIG. 12 shows the structure of Framework for Live Uplink Streaming (FLUS).

FIG. 12 illustrates an architecture of a Frame for Live Uplink Streaming (FLUS).

The detailed blocks of the transmission side and the reception side may be categorized into functions of a source and a sink in FLUS (Framework for Live Uplink Streaming). In this case, the information acquisition unit may implement the function of the source, implement the function of the sink on a network, or implement source/sink within a network node, as follows. The network node may include a user equipment (UE). The UE may include the aforementioned 360-degree video transmission apparatus or the aforementioned 360-degree reception apparatus.

A transmission and reception processing process based on the aforementioned architecture may be described as follows. The following transmission and reception processing process is described based on the video signal processing process. If the other signals such as audio or text are processed, a portion marked with italic may be omitted or may be processed by being modified to be suitable for audio or text processing process.

Figure 13:
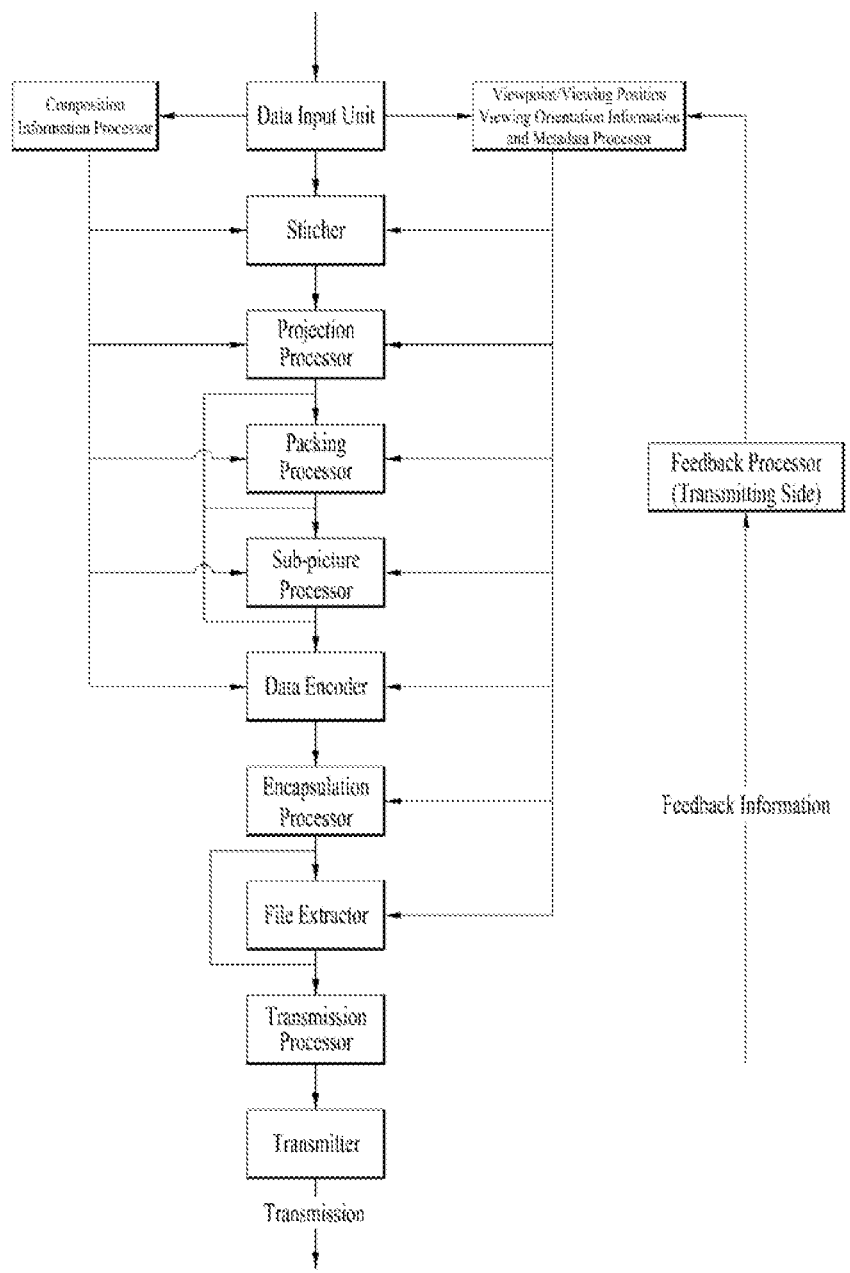
FIG. 13 illustrates the configuration of a 3DoF+ transmission terminal.

FIG. 13 is a view showing a configuration of 3DoF+ transmission side.

The transmission side (the 360 video transmission apparatus) may perform stitching for a spherical image configuration per viewpoint/viewing position/component if input data are images output through a camera. If sphere images per viewpoint/viewing position/component are configured, the transmission side may perform projection for coding in 2D image. The transmission side may generate a plurality of images as subpictures of a packing or segmented region for making an integrated image according to application. As described above, the region wise packing process is an optional process, and may not be performed. In this case, the packing process may be omitted. If the input data are video/audio/text additional information, a method for displaying additional information by adding the additional information to a center image may be notified, and the additional data may be transmitted together. The encoding process for compressing the generated images and the added data to generate bitstreams may be performed and then the encapsulation process for converting the bitstreams to a file format for transmission or storage may be performed. At this time, a process of extracting a file requested by the reception side may be processed according to application or request of the system. The generated bitstreams may be transformed into the transport format through the transmission-processor and then transmitted. At this time, the feedback processor of the transmission side may process viewpoint/viewing position/orientation information and necessary metadata based on the information delivered from the reception side and deliver the information to the related transmission side so that the transmission side may process the corresponding data.

Figure 14:
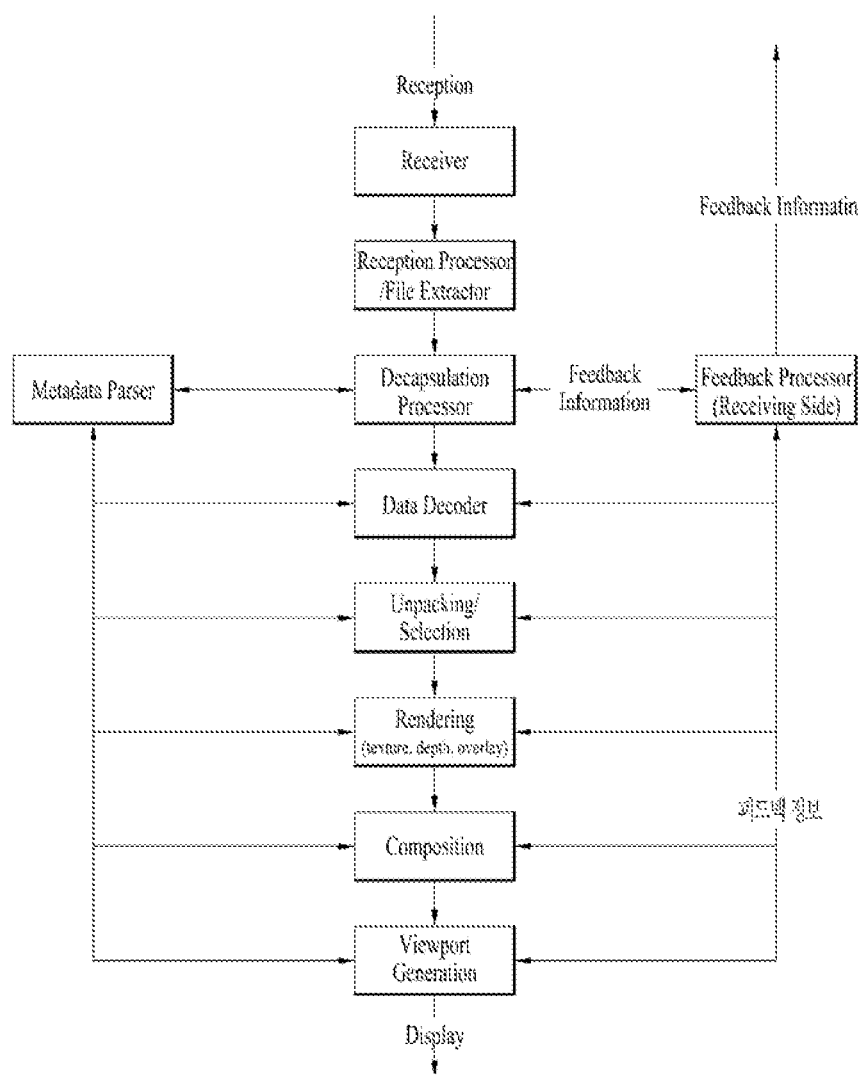
FIG. 14 illustrates the configuration of a 3DoF+ reception terminal.

FIG. 14 illustrates a configuration of 3DoF+ reception terminal.

The reception terminal (the 360 video reception apparatus) may extract a necessary file after receiving the bitstreams delivered from the transmission side. The reception terminal may select bitstreams in the generated file format by using the viewpoint/viewing position/orientation information delivered from the feedback processor and reconfigure the selected bitstreams as image information through the decoder. The reception terminal may perform unpacking for the packed image based on packing information delivered through the metadata. If the packing process is omitted in the transmission side, unpacking of the reception terminal may also be omitted. Also, the reception terminal may perform a process of selecting images suitable for the viewpoint/viewing position/orientation information delivered from the feedback processor and necessary components if necessary. The reception terminal may perform a rendering process of reconfiguring texture, depth and overlay information of images as a format suitable for reproduction. The reception terminal may perform a composition process for composing information of different layers before generating a final image, and may generate and reproduce an image suitable for a display viewport.

Figure 15:
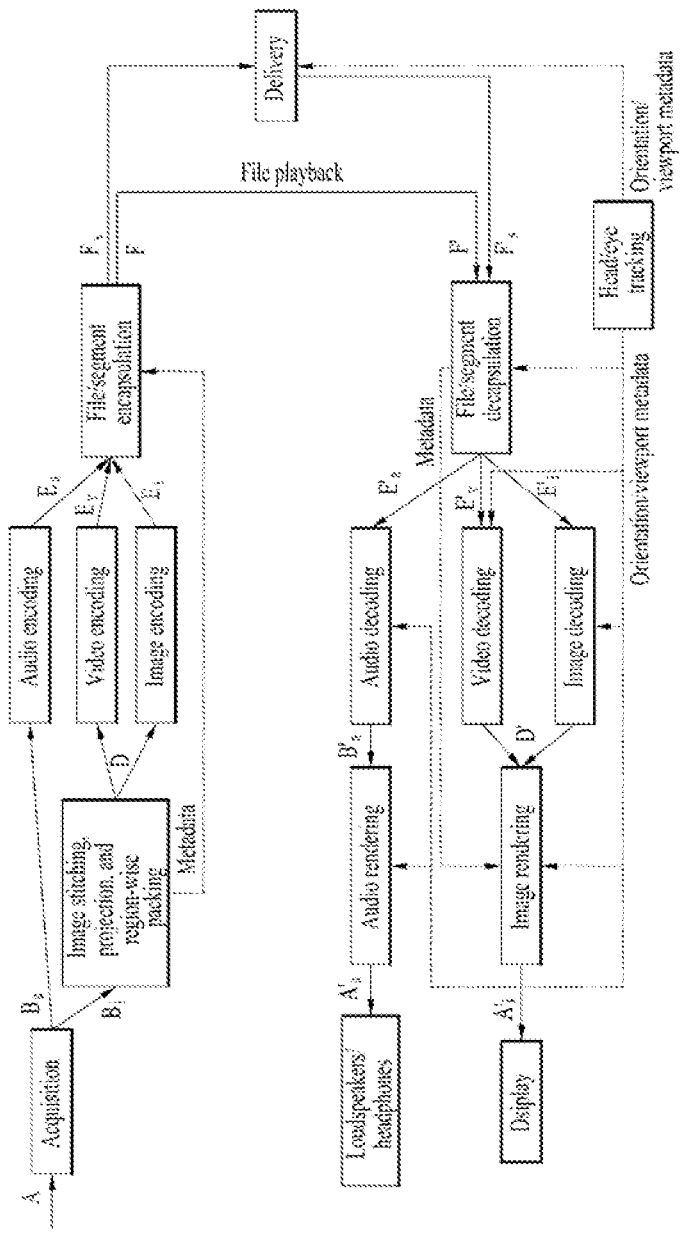
FIG. 15 shows an OMAF structure.

FIG. 15 shows an OMAF structure.

The 360 video based VR system may provide visual/auditory experiences for different viewing orientations based on a position of a user for 360-degree video based on the 360-degree video processing process. A service for providing visual/auditory experiences for different orientations in a fixed position of a user with respect to 360-degree video may be referred to as a 3DoF based service. Meanwhile, a service for providing extended visual/auditory experiences for different orientations in a random viewpoint and viewing position at the same time zone may be referred to as a 6DoF (six degree of freedom) based service.

A file format for 3DoF service has a structure in which a position of rendering, information of a file to be transmitted, and decoding information may be varied depending on a head/eye tracking module as shown in FIG. 15. However, this structure is not suitable for transmission of a media file of 6DoF in which rendering information/transmission details and decoding information are varied depending on a viewpoint or position of a user, correction is required.

Figure 16:
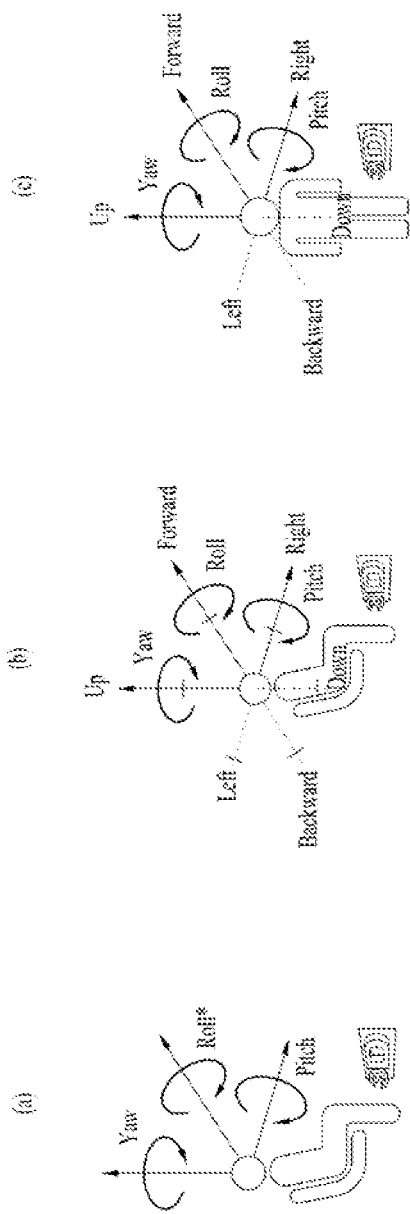
FIG. 16 shows a type of media according to movement of a user.

FIG. 16 shows a type of media according to movement of a user.

The present disclosure provides a method for providing 6DoF content to provide a user with experiences of immersive media/realistic media. The immersive media/realistic media is a concept extended from a virtual environment provided by the existing 360 contents, and the position of the user is fixed in the form of (a) of the existing 360-degree video contents. If the immersive media/realistic media has only a concept of rotation, the immersive media/realistic media may mean an environment or contents, which may provide a user with more sensory experiences such as movement/rotation of the user in a virtual space by giving a concept of movement when the user experiences contents as described in (b) or (c).

(a) indicates media experiences if a view of a user is rotated in a state that a position of the user is fixed.

(b) indicates media experiences if a user's head may additionally move in addition to a state that a position of the user is fixed.

(c) indicates media experiences when a position of a user may move.

The realistic media contents may include 6DoF video and 6DoF audio for providing corresponding contents, wherein 6DoF video may mean video or image required to provide realistic media contents and captured or reproduced as 3DoF or 360-degree video newly formed during every movement. 6DoF content may mean videos or images displayed on a 3D space. If movement within contents is fixed, the corresponding contents may be displayed on various types of 3D spaces like the existing 360-degree video. For example, the corresponding contents may be displayed on a spherical surface. If movement within the contents is a free state, a 3D space may newly be formed on a moving path based on the user every time and the user may experience contents of the corresponding position. For example, if the user experiences an image displayed on a spherical surface at a position where the user first views, and actually moves on the 3D space, a new image on the spherical surface may be formed based on the moved position and the corresponding contents may be consumed. Likewise, 6DoF audio is an audio content for providing a content to allow a user to experience realistic media, and may mean contents for newly forming and consuming a spatial audio according to movement of a position where sound is consumed.

The present disclosure provides a method for effectively providing 6DoF video. The 6DoF video may be captured at different positions by two or more cameras. The captured video may be transmitted through a series of processes, and the reception terminal may process and render some of the received data as 360-degree video having an initial position of the user as a starting point. If the position of the user moves, the reception terminal may process and render new 360-degree video based on the position where the user has moved, whereby the 6DoF video may be provided to the user.

Hereinafter, a transmission method and a reception method for providing 6DoF video services will be described.

Figure 17:
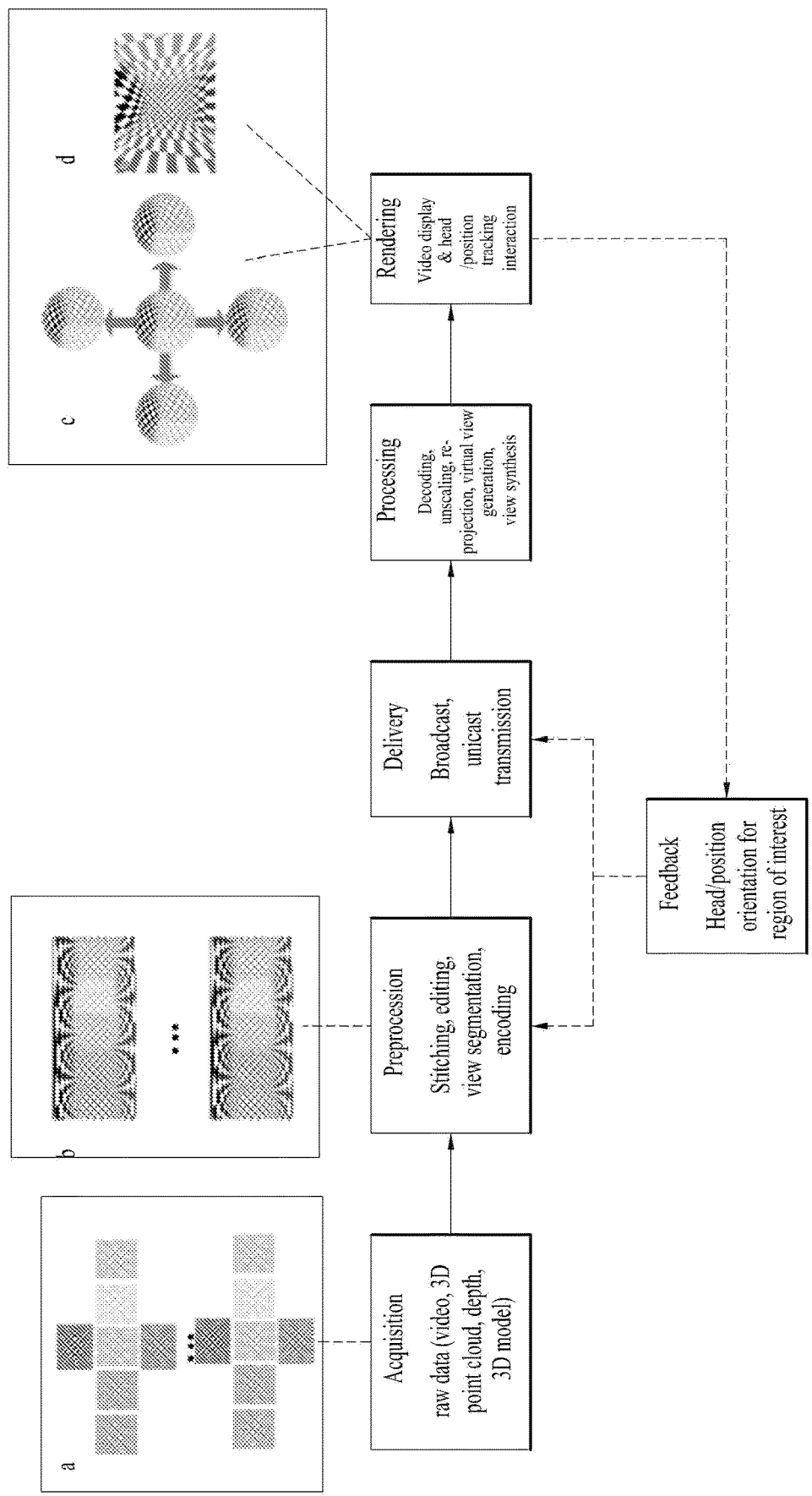
FIG. 17 shows an overall architecture for providing 6DoF video.

FIG. 17 shows an overall architecture for providing 6DoF video.

A series of processes described above will be described in detail based on FIG. 17. First of all, as an acquisition step, HDCA (High Density Camera Array), Lenslet (microlens) camera, etc. may be used to capture 6DoF contents, and 6DoF video may be acquired by a new device designed for capture of the 6DoF video. The acquired video may be generated as several image/video data sets generated according to a position of a camera, which is captured as shown in FIG. 3*a*. At this time, metadata such as internal/external setup values of the camera may be generated during the capturing process. In case of image generated by a computer not the camera, the capturing process may be replaced. The preprocessing process of the acquired video may be a process of processing the captured image/video and the metadata delivered through the capturing process. This process may correspond to all of types of preprocessing steps such as a stitching process, a color correction process, a projection process, a view segmentation process for segmenting views into a primary view and a secondary view to enhance coding efficiency, and an encoding process.

The stitching process may be a process of making image/video by connecting image captured in the direction of 360-degree in a position of each camera with image in the form of panorama or sphere based on the position of each camera. Projection means a process of projecting the image resultant from the stitching process to a 2D image as shown in FIG. 3*b*, and may be expressed as mapping into 2D image. The image mapped in the position of each camera may be segmented into a primary view and a secondary view such that resolution different per view may be applied to enhance video coding efficiency, and arrangement or resolution of mapping image may be varied even within the primary view, whereby efficiency may be enhanced during coding. The secondary view may not exist depending on the capture environment. The secondary view means image/video to be reproduced during a movement process when a user moves from the primary view to another primary view, and may have resolution lower than that of the primary view but may have the same resolution as that of the primary view if necessary. The secondary view may be newly generated as virtual information by the receiver in some cases.

In some embodiments, the preprocessing process may further include an editing process. In this process, editing for image/video data may further be performed before and after projection, and metadata may be generated even during the preprocessing process. Also, when the image/video are provided, metadata for an initial view to be first reproduced and an initial position and a region of interest (ROI) of a user may be generated.

The media transmission step may be a process of processing and transmitting the image/video data and metadata acquired during the preprocessing process. Processing according to a random transmission protocol may be performed for transmission, and the pre-processed data may be delivered through a broadcast network and/or a broadband. The pre-processed data may be delivered to the reception terminal on demand.

The processing process may include all steps before image is generated, wherein all steps may include decoding the received image/video data and metadata, re-projection which may be called mapping or projection into a 3D model, and a virtual view generation and synthesis process. The 3D model which is mapped or a projection map may include a sphere, a cube, a cylinder or a pyramid like the existing 360-degree video, and may be a modified type of a projection map of the existing 360-degree video, or may be a projection map of a free type in some cases.

The virtual view generation and synthesis process may mean a process of generating and composing the image/video data to be reproduced when the user moves between the primary view and the secondary view or between the primary view and the primary view. The process of processing the metadata delivered during the capture and preprocessing processes may be required to generate the virtual view. In some cases, only some of the 360 images/videos may be generated/synthesized.

In some embodiments, the processing process may further include an editing process, an up scaling process, and a down scaling process. Additional editing required before reproduction may be applied to the editing process after the processing process. The process of up scaling or down scaling the received images/videos may be performed, if necessary.

The rendering process may mean a process of rendering image/video, which is re-projected by being transmitted or generated, to be displayed. As the case may be, rendering and re-projection process may be referred to as rendering. Therefore, the rendering process may include the re-projection process. A plurality of re-projection results may exist in the form of 360 degree video/image based on the user and 360 degree video/image formed based on the position where the user moves according to a moving direction as shown in FIG. 3c. The user may view some region of the 360 degree video/image according to a device to be displayed. At this time, the region viewed by the user may be a form as shown in FIG. 3d. When the user moves, the entire 360 degree videos/images may not be rendered but the image corresponding to the position where the user views may only be rendered. Also, metadata for the position and the moving direction of the user may be delivered to previously predict movement, and video/image of a position to which the user will move may additionally be rendered.

The feedback process may mean a process of delivering various kinds of feedback information, which may be acquired during the display process, to the transmission side. Interactivity between 6DoF content and the user may occur through the feedback process. In some embodiments, the user's head/position orientation and information on a viewport where the user currently views may be delivered during the feedback process. The corresponding information may be delivered to the transmission side or a service provider during the feedback process. In some embodiments, the feedback process may not be performed.

The user's position information may mean information on the user's head position, angle, movement and moving distance. Information on a viewport where the user views may be calculated based on the corresponding information.

Figure 18:
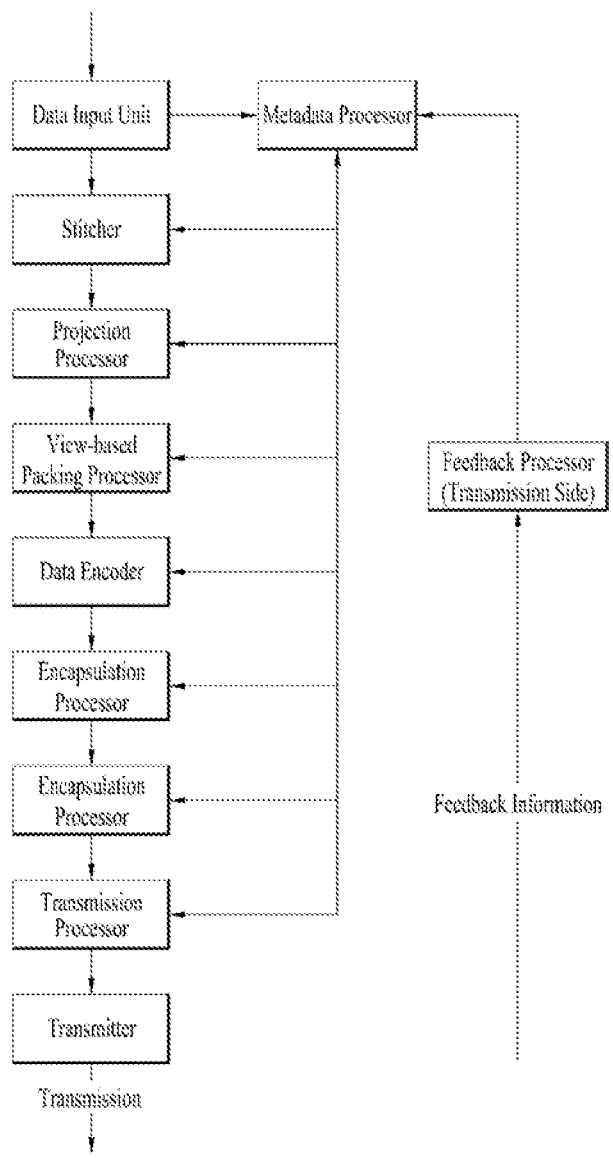
FIG. 18 illustrates the configuration of a transmission apparatus for providing a 6DoF video service.

FIG. 18 illustrates the configuration of a transmission apparatus for providing a 6DoF video service.

The present disclosure may relate to a 6DoF video transmission apparatus at the transmission side. The 6DoF video transmission apparatus according to the present disclosure may perform the aforementioned preparation processes and operations. The 6DoF video/image transmission apparatus according to the present disclosure may include a data input unit, a depth information processor (not shown), a stitcher, a projection processor, a view segmentation processor, a packing processor per view, a metadata processor, a feedback processor, a data encoder, an encapsulation processor, a transmission-processor, and/or a transmitter as internal/external components.

The data input unit may receive image/video/depth information/audio data per view captured by one or more cameras at one or more positions. The data input unit may receive metadata generated during the capturing process together with the video/image/depth information/audio data. The data input unit may deliver the input video/image data per view to the stitcher and deliver the metadata generated during the capturing process to the metadata processor.

The stitcher may perform stitching for image/video per captured view/position. The stitcher may deliver the stitched 360 degree video data to the processor. The stitcher may perform stitching for the metadata delivered from the metadata processor if necessary. The stitcher may deliver the metadata generated during the stitching process to the metadata processor. The stitcher may vary a video/image stitching position by using a position value delivered from the depth information processor (not shown). The stitcher may deliver the metadata generated during the stitching process to the metadata processor. The delivered metadata may include information as to whether stitching has been performed, a stitching type, IDs of a primary view and a secondary view, and position information on a corresponding view.

The projection processor may perform projection for the stitched 6DoF video data to 2D image frame. The projection processor may obtain different types of results according to a scheme, and the corresponding scheme may similar to the projection scheme of the existing 360 degree video, or a scheme newly proposed for 6DoF may be applied to the corresponding scheme. Also, different schemes may be applied to the respective views. The depth information processor may deliver depth information to the projection processor to vary a mapping resultant value. The projection processor may receive metadata required for projection from the metadata processor and use the metadata for a projection task if necessary, and may deliver the metadata generated during the projection process to the metadata processor. The corresponding metadata may include a type of a scheme, information as to whether projection has been performed, ID of 2D frame after projection for a primary view and a secondary view, and position information per view.

The packing processor per view may segment view into a primary view and a secondary view as described above and perform region wise packing within each view. That is, the packing processor per view may categorize 6DoF video data projected per view/position into a primary view and a secondary view and allow the primary view and the secondary view to have their respective resolutions different from each other so as to enhance coding efficiency, or may vary rotation and rearrangement of the video data of each view and vary resolution per region categorized within each view. The process of categorizing the primary view and the second view may be optional and thus omitted. The process of varying resolution per region and arrangement may selectively be performed. When the packing processor per view is performed, packing may be performed using the information delivered from the metadata processor, and the metadata generated during the packing process may be delivered to the metadata processor. The metadata defined in the packing process per view may be ID of each view for categorizing each view into a primary view and a secondary view, a size applied per region within a view, and a rotation position value per region.

The stitcher, the projection processor and/or the packing processor per view described as above may occur in an ingest server within one or more hardware components or streaming/download services in some embodiments.

The metadata processor may process metadata, which may occur in the capturing process, the stitching process, the projection process, the packing process per view, the encoding process, the encapsulation process and/or the transmission process. The metadata processor may generate new metadata for 6DoF video service by using the metadata delivered from each process. In some embodiments, the metadata processor may generate new metadata in the form of signaling table. The metadata processor may deliver the delivered metadata and the metadata newly generated/processed therein to another components. The metadata processor may deliver the metadata generated or delivered to the data encoder, the encapsulation processor and/or the transmission-processor to finally transmit the metadata to the reception terminal.

The data encoder may encode the 6DoF video data projected on the 2D image frame and/or the view/region-wise packed video data. The video data may be encoded in various formats, and encoded result values per view may be delivered separately if category per view is made.

The encapsulation processor may encapsulate the encoded 6DoF video data and/or the related metadata in the form of a file. The related metadata may be received from the aforementioned metadata processor. The encapsulation processor may encapsulate the corresponding data in a file format of ISOBMFF or OMAF, or may process the corresponding data in the form of a DASH segment, or may process the corresponding data in a new type file format. The metadata may be included in various levels of boxes in the file format, or may be included as data in a separate track, or may separately be encapsulated per view. The metadata required per view and the corresponding video information may be encapsulated together.

The transmission processor may perform additional processing for transmission on the encapsulated video data according to the format. The corresponding processing may be performed using the metadata received from the metadata processor. The transmitter may transmit the data and/or the metadata received from the transmission-processor through a broadcast network and/or a broadband. The transmission-processor may include components required during transmission through the broadcast network and/or the broadband.

The feedback processor (transmission side) may further include a network interface (not shown). The network interface may receive feedback information from the reception apparatus, which will be described later in the present disclosure, and may deliver the feedback information to the feedback processor (transmission side). The feedback processor may deliver the information received from the reception terminal to the stitcher, the projection processor, the packing processor per view, the encoder, the encapsulation processor and/or the transmission-processor. The feedback processor may deliver the information to the metadata processor so that the metadata processor may deliver the information to the other components or generate/process new metadata and then deliver the generated/processed metadata to the other components. According to another embodiment, the feedback processor may deliver position/view information received from the network interface to the metadata processor, and the metadata processor may deliver the corresponding position/view information to the projection processor, the packing processor per view, the encapsulation processor and/or the data encoder to transmit only information suitable for current view/position of the user and peripheral information, thereby enhancing coding efficiency.

The components of the aforementioned 6DoF video transmission apparatus may be hardware components implemented by hardware. In some embodiments, the respective components may be modified or omitted or new components may be added thereto, or may be replaced with or incorporated into the other components.

Figure 19:
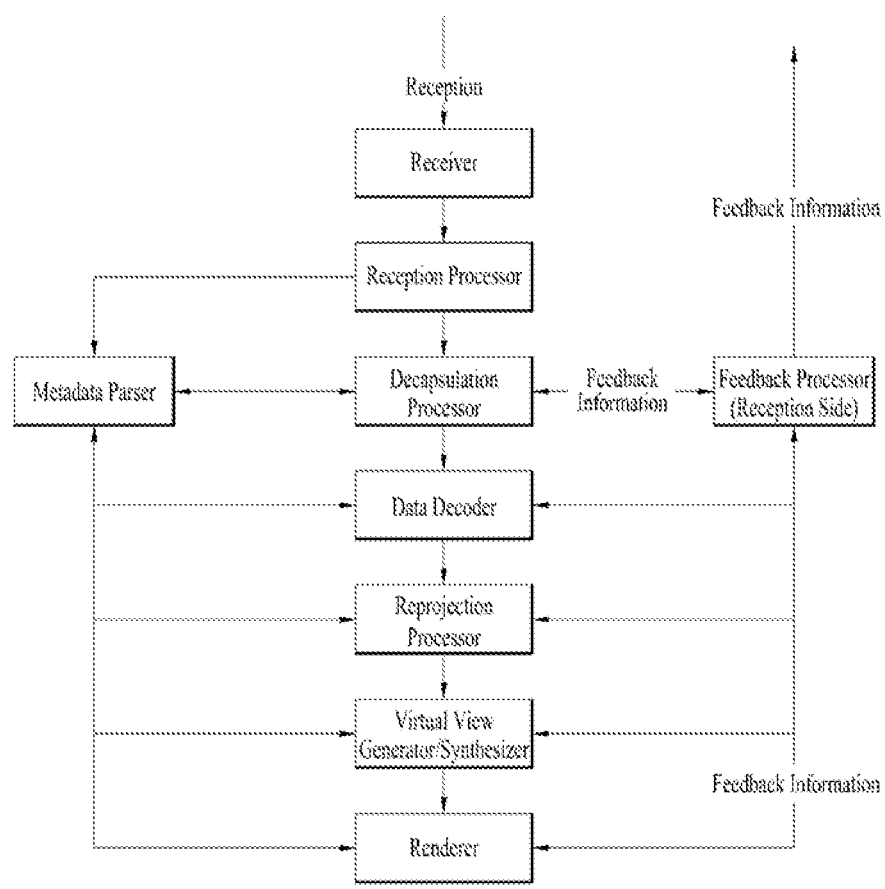
FIG. 19 illustrates the configuration of a 6DoF video reception apparatus.

FIG. 19 illustrates the configuration of a 6DoF video reception apparatus.

The present disclosure may be related to the reception apparatus. According to the present disclosure, the 6DoF video reception apparatus may include a reception unit, a reception processor, a decapsulation-processor, a metadata parser, a feedback processor, a data decoder, a re-projection processor, a virtual view generation/synthesis unit and/or a renderer as components.

The reception unit may receive video data from the aforementioned 6DoF transmission apparatus. The reception unit may receive the video data through a broadcast network or a broadband according to a channel through which the video data are transmitted.

The reception processor may perform processing according to a transmission protocol for the received 6DoF video data. The reception processor may perform an inverse processing of the process performed in the transmission processor or perform processing according to a protocol processing method to acquire data obtained at a previous step of the transmission processor. The reception processor may deliver the acquired data to the decapsulation-processor, and may deliver metadata information received from the reception unit to the metadata parser.

The decapsulation-processor may decapsulate the 6DoF video data received in the form of file from the reception-processor. The decapsulation-processor may decapsulate the files to be matched with the corresponding file format to acquire 6DoF video and/or metadata. The acquired 6DoF video data may be delivered to the data decoder, and the acquired 6DoF metadata may be delivered to the metadata parser. The decapsulation-processor may receive metadata necessary for decapsulation from the metadata parser, when necessary.

The data decoder may decode the 6DoF video data. The data decoder may receive metadata necessary for decoding from the metadata parser. The metadata acquired during the data decoding process may be delivered to the metadata parser and then processed.

The metadata parser may parse/decode the 6DoF video-related metadata. The metadata parser may deliver the acquired metadata to the decapsulation-processor, the data decoder, the re-projection processor, the virtual view generation/synthesis unit and/or the renderer.

The re-projection processor may re-project the decoded 6DoF video data. The re-projection processor may re-project the 6DoF video data per view/position in a 3D space. The 3D space may have different forms depending on the 3D models that are used, or may be re-projected on the same type of 3D model through a conversion process. The re-projection processor may receive metadata necessary for re-projection from the metadata parser. The re-projection processor may deliver the metadata defined during the re-projection process to the metadata parser. For example, the re-projection processor may receive 3D model of the 6DoF video data per view/position from the metadata parser. If 3D model of video data is different per view/position and video data of all views are re-projected in the same 3D model, the re-projection processor may deliver the type of the 3D model that is applied, to the metadata parser. In some embodiments, the re-projection processor may re-project only a specific area in the 3D space using the metadata for re-projection, or may re-project one or more specific areas.

The virtual view generation/synthesis unit may generate video data, which are not included in the 6DoF video data re-projected by being transmitted and received on the 3D space but need to be reproduced, in a virtual view area by using given data, and may compose video data in a new view/position based on the virtual view. The virtual view generation/synthesis unit may use data of the depth information processor (not shown) when generating video data of a new view. The virtual view generation/synthesis unit may generate/compose the specific area received from the metadata parser and a portion of a peripheral virtual view area, which is not received. The virtual view generation/synthesis unit may selectively be performed, and is performed when there is no video information corresponding to a necessary view and position.

The renderer may render the 6DoF video data delivered from the re-projection unit and the virtual view generation/synthesis unit. As described above, all the processes occurring in the re-projection unit or the virtual view generation/synthesis unit on the 3D space may be incorporated within the renderer such that the renderer may perform these processes. In some embodiments, the renderer may render only a portion that is being viewed by a user and a portion on a predicted path according to the user's view/position information.

In the present disclosure, the feedback processor (reception terminal) and/or the network interface (not shown) may be included as additional components. The feedback processor of the reception terminal may acquire and process feedback information from the renderer, the virtual view generation/synthesis unit, the re-projection processor, the data decoder, the decapsulation unit and/or the VR display. The feedback information may include viewport information, head and position orientation information, gaze information, and gesture information. The network interface may receive the feedback information from the feedback processor, and may transmit the feedback information to the transmitter. The feedback information may be consumed in each component of the reception terminal. For example, the decapsulation processor may receive position/viewpoint information of the user from the feedback processor, and may perform decapsulation, decoding, re-projection and rendering for corresponding position information if there is the corresponding position information in the received 6DoF video. If there is no corresponding position information, the 6DoF video located near the corresponding position may be subjected to decapsulation, decoding, re-projection, virtual view generation/synthesis, and rendering.

The components of the aforementioned 6DoF video reception apparatus may be hardware components implemented by hardware. In some embodiments, the respective components may be modified or omitted or new components may be added thereto, or may be replaced with or incorporated into the other components.

Figure 20:
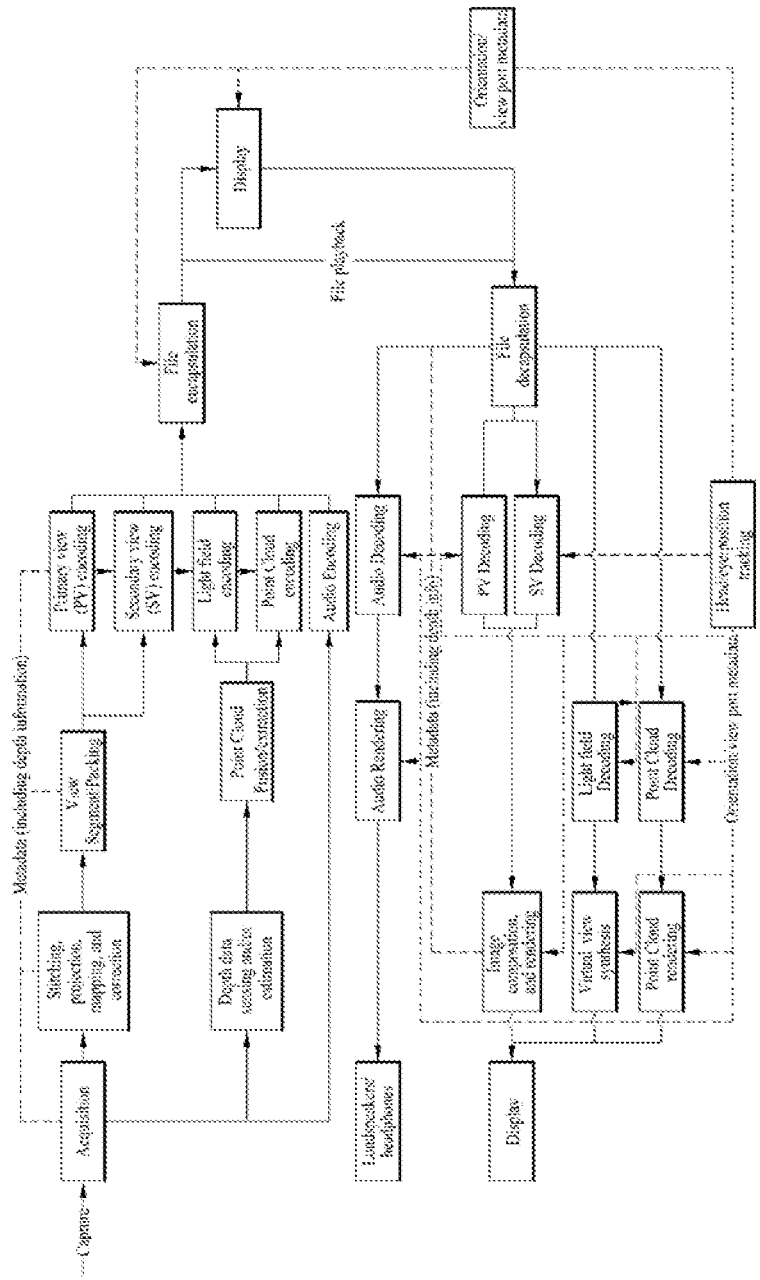
FIG. 20 illustrates the configuration of a 6DoF video transmission/reception apparatus.

FIG. 20 illustrates a configuration of a 6DoF video transmission/reception apparatus.

6DoF contents may be provided in the form of a file or a segment-based download or streaming service such as DASH, or a new file format or streaming/download service method may be used. In this case, 6DoF contents may be called immersive media contents, light field contents, or point cloud contents.

As described above, each process for providing a corresponding file and streaming/download services may be described in detail as follows.

Acquisition: is an output obtained after being captured from a camera for acquiring multi view/stereo/depth image, and two or more videos/images and audio data are obtained, and a depth map in each scene may be acquired if there is a depth camera.

Audio encoding: 6DoF audio data may be subjected to audio preprocessing and encoding. In this process, metadata may be generated, and related metadata may be subjected to encapsulation/encoding for transmission.

Stitching, projection, mapping, and correction: 6DoF video data may be subjected to editing, stitching and projection of the image acquired at various positions as described above. Some of these processes may be performed according to the embodiment, or all of the processes may be omitted and then may be performed by the reception terminal.

View segmentation/packing: As described above, the view segmentation/packing processor may segment images of a primary view (PV), which are required by the reception terminal, based on the stitched image and pack the segmented images and then perform preprocessing for packing the other images as secondary views. Size, resolution, etc. of the primary view and the secondary views may be controlled during the packing process to enhance coding efficiency. Resolution may be varied even within the same view depending on a condition per region, or rotation and rearrangement may be performed depending on the region.

Depth sensing and/or estimation: is intended to perform a process of extracting a depth map from two or more acquired videos if there is no depth camera. If there is a depth camera, a process of storing position information as to a depth of each object included in each image in image acquisition position may be performed.

Point cloud fusion/extraction: a process of modifying a previously acquired depth map to data capable of being encoded may be performed. For example, a preprocessing of allocating a position value of each object of image on 3D by modifying the depth map to a point cloud data type may be performed, and a data type capable of expressing 3D space information not the pointer cloud data type may be applied.

PV encoding/SV encoding/light field/point cloud encoding: each view may previously be packed or depth information and/or position information may be subjected to image encoding or video encoding. The same contents of the same view may be encoded by bitstreams different per region. There may be a media format such as new codec which will be defined in MPEG-I, HEVC-3D and OMAF++.

File encapsulation: The encoded 6DoF video data may be processed in a file format such as ISOBMFF by file-encapsulation which is the encapsulation processor. Alternatively, the encoded 6DoF video data may be processed into segments.

Metadata (including depth information): Like the 6DoF vide data processing, the metadata generated during stitching, projection, view segmentation/packing, encoding, and encapsulation may be delivered to the metadata processor, or the metadata generated by the metadata processor may be delivered to each process. Also, the metadata generated by the transmission side may be generated as one track or file during the encapsulation process and then delivered to the reception terminal. The reception terminal may receive the metadata stored in a separate file or in a track within the file through a broadcast network or a broadband.

Delivery: file and/or segments may be included in a separate track for transmission based on a new model having DASH or similar function. At this time, MPEG DASH, MMT and/or new standard may be applied for transmission.

File decapsulation: The reception apparatus may perform processing for 6DoF video/audio data reception.

Audio decoding/audio rendering/loudspeakers/headphones: The 6DoF audio data may be provided to a user through a speaker or headphone after being subjected to audio decoding and rendering.

PV/SV/light field/point cloud decoding: The 6DoF video data may be image or video decoded. As a codec applied to decoding, a codec newly proposed for 6DoF in HEVC-3D, OMAF++ and MPEG may be applied. At this time, a primary view PV and a secondary view SV are segmented from each other and thus video or image may be decoded within each view packing, or may be decoded regardless of view segmentation. Also, after light field and point cloud decoding are performed, feedback of head, position and eye tracking is delivered and then image or video of a peripheral view in which a user is located may be segmented and decoded.

Head/eye/position tracking: a user's head, position, gaze, viewport information, etc. may be acquired and processed as described above.

Point cloud rendering: when captured video/image data are re-projected on a 3D space, a 3D spatial position is configured, and a process of generating a 3D space of a virtual view to which a user may move is performed although the virtual view is failed to be obtained from the received video/image data.

Virtual view synthesis: a process of generating and synthesizing video data of a new view is performed using 6DoF video data already acquired near a user's position/view if there is no 6DoF video data in a space in which the user is located, as described above. In some embodiments, the virtual view generation and/or synthesis process may be omitted.

Image composition and rendering: as a process of rendering image based on a user's position, video data decoded according to the user's position and eyes may be used or video and image near the user, which are made by the virtual view generation/synthesis, may be rendered.

Figure 21:
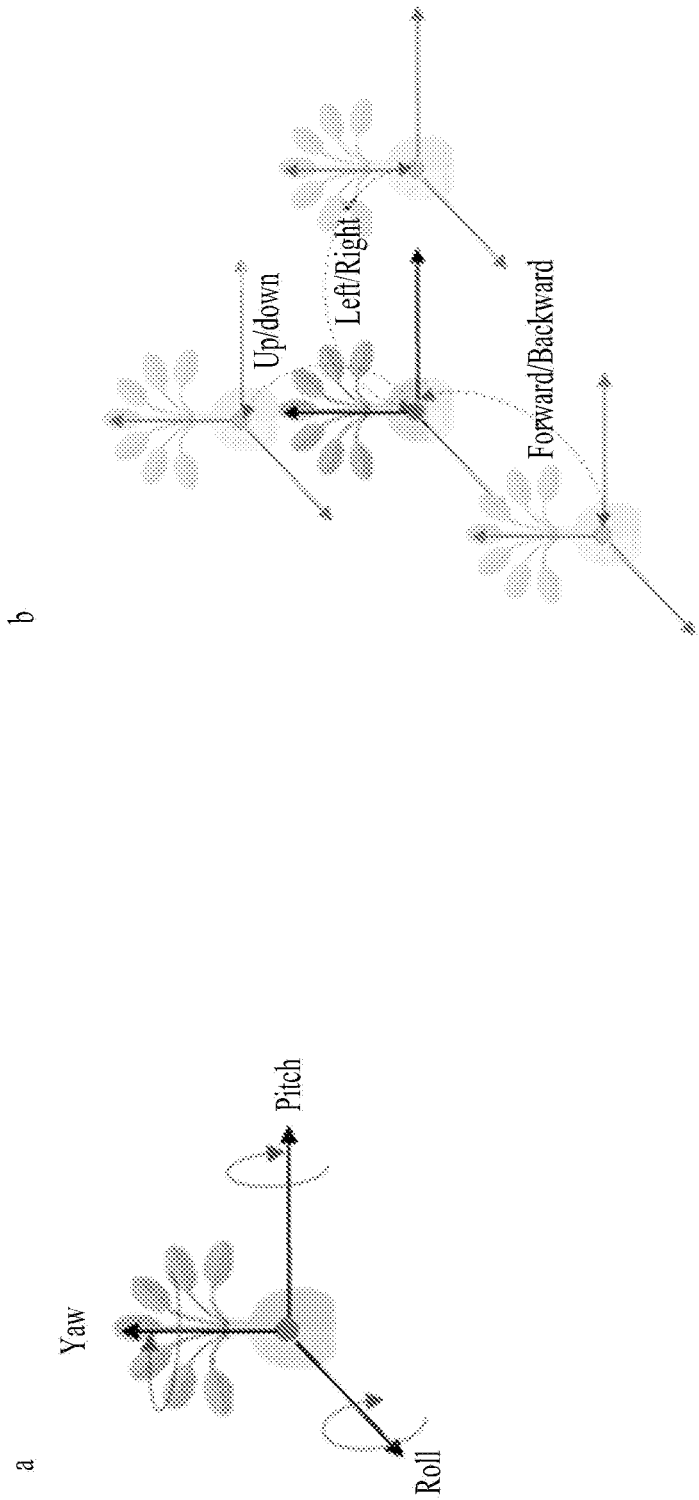
FIG. 21 shows a 6DoF space.

FIG. 21 shows a 6DoF space.

In the present disclosure, a 6DoF space before projection or after re-projection will be described and the concept of FIG. 21 may be used to perform corresponding signaling.

The 6DoF space may categorize an orientation of movement into two types, rational and translation, unlike the case that the 360 degree video or 3DoF space is described by yaw, pitch and roll. Rational movement may be described by yaw, pitch and roll as described in the orientation of the existing 3DoF like 'a', and may be called orientation movement. On the other hand, translation movement may be called position movement as described in 'b'. Movement of a center axis may be described by definition of one axis or more to indicate a moving orientation of the axis among Left/Right orientation, Forward/Backward orientation, and Up/down orientation.

The present disclosure proposes an architecture for 6DoF video service and streaming, and also proposes basic metadata for file storage and signaling for future use in the disclosure for 6DoF related metadata and signaling extension.

Metadata generated in each process may be extended based on the proposed 6DoF transceiver architecture.

Metadata generated among the processes of the proposed architecture may be proposed.

6DoF video related parameter of contents for providing 6DoF video services by later addition/correction/extension based on the proposed metadata may be stored in a file such as ISOBMFF and signaled.

6DoF video metadata may be stored and signaled through SEI or VUI of 6DoF video stream by later addition/correction/extension based on the proposed metadata.

Region (meaning in region-wise packing): Region may mean a region where 360 video data projected on 2D image is located in a packed frame through region-wise packing. In this case, the region may refer to a region used in region-wise packing depending on the context. As described above, regions may be identified by equally dividing 2D image, or may be identified by being randomly divided according to a projection scheme.

Region (general meaning): Unlike the region in the aforementioned region-wise packing, the terminology, region may be used as a dictionary definition. In this case, the region may mean 'area', 'zone', 'portion', etc. For example, when the region means a region of a face which will be described later, the expression 'one region of a corresponding face' may be used. In this case, the region is different from the region in the aforementioned region-wise packing, and both regions may indicate their respective areas different from each other.

Picture: may mean the entire 2D image in which 360 degree video data are projected. In some embodiments, a projected frame or a packed frame may be the picture.

Sub-picture: A sub-picture may mean a portion of the aforementioned picture. For example, the picture may be segmented into several sub-pictures to perform tiling. At this time, each sub-picture may be a tile. In detail, an operation of reconfiguring tile or MCTS as a picture type compatible with the existing HEVC may be referred to as MCTS extraction. A result of MCTS extraction may be a sub-picture of a picture to which the original tile or MCTS belongs.

Tile: A tile is a sub-concept of a sub-picture, and the sub-picture may be used as a tile for tiling. That is, the sub-picture and the tile in tiling may be the same concept. Specifically, the tile may be a tool enabling parallel decoding or a tool for independent decoding in VR. In VR, a tile may mean a Motion Constrained Tile Set (MCTS) that restricts a range of temporal inter prediction to a current tile internal range. Therefore, the tile herein may be called MCTS.

Spherical region: spherical region or sphere region may mean one region on a spherical surface when 360 degree video data are rendered on a 3D space (for example, spherical surface) at the reception terminal. In this case, the spherical region is regardless of the region in the region-wise packing. That is, the spherical region does not need to mean the same region defined in the region-wise packing. The spherical region is a terminology used to mean a portion on a rendered spherical surface, and in this case, 'region' may mean 'region' as a dictionary definition. According to the context, the spherical region may simply be called region.

Face: Face may be a term referring to each face according to a projection scheme. For example, if cube map projection is used, a front face, a rear face, side face, an upper face, or a lower face may be called face.

Figure 22:
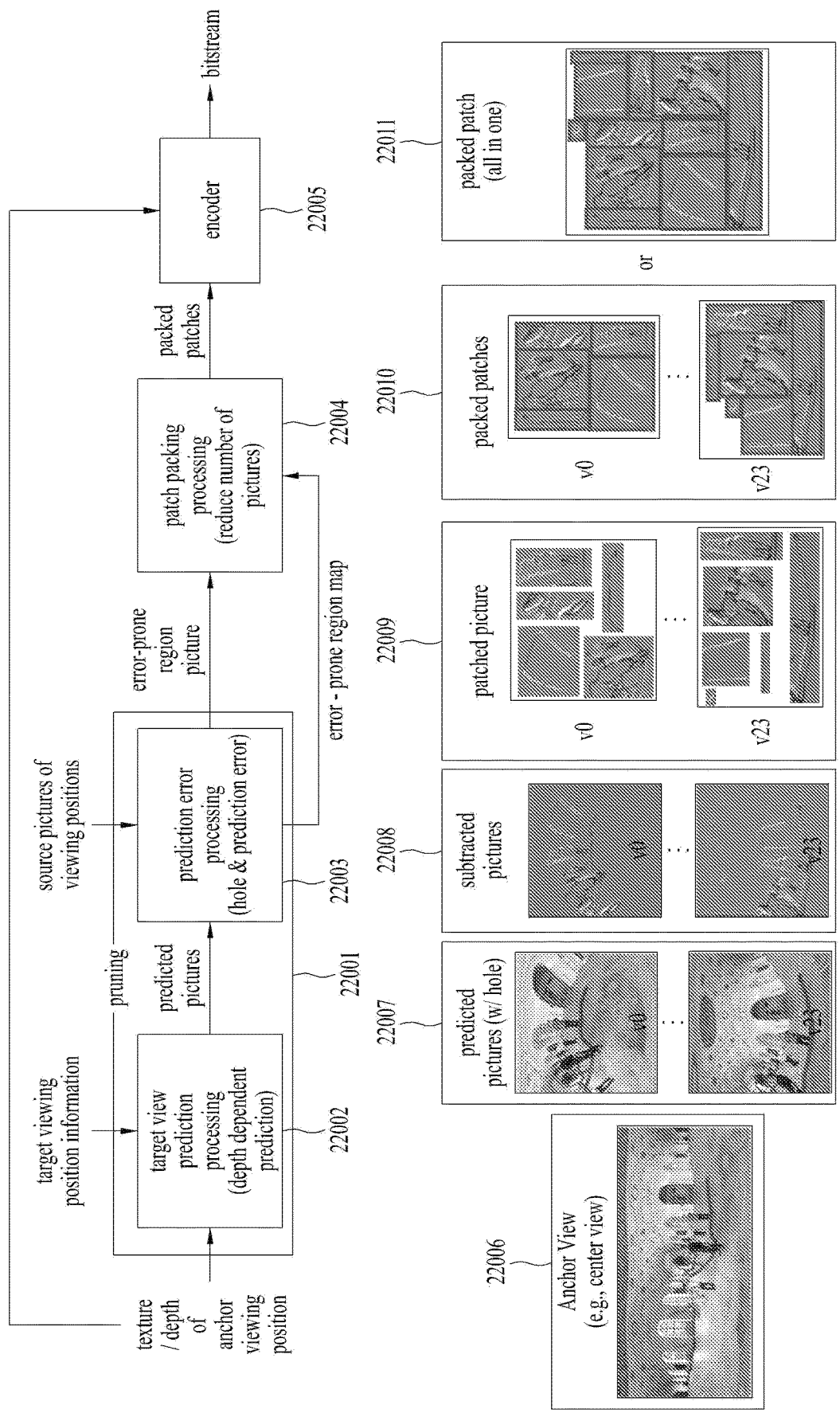
FIG. 22 shows the structure of a pre-encoder according to embodiments of the present disclosure.

FIG. 22 shows the structure of a pre-encoder according to embodiments of the present disclosure.

The pre-encoder according to the embodiments includes a pruning 22001, a patch packing processor 22004, and/or an encoder 22005. Further, the pruning 22001 includes a target view prediction processor 22002 and/or a prediction error processor 22003. In the present disclosure, the pre-encoder may be referred to as a video transmission apparatus.

The pruning 22001 receives a texture picture or depth picture of an anchor viewing position, target viewing position information, and/or source pictures of viewing positions. The target viewing position information and the source pictures of the viewing positions may be received through metadata or signaling information.

The pruning 22001 includes a target view prediction processor 22002 and a prediction error processor 22003.

The pruning 22001 may pack and transmit only a valid information region except information overlapping between images in transmitting a 3DOF+ video.

Accordingly, the pruning 22001 may enable efficient transmission by reducing the number of images.

The target view prediction processor 22002 estimates an image of a target viewing position based on information related to the target viewing position, which is a target, from an image forming a basis of the encoding. In the present disclosure, the image may be referred to as data or a picture. In the present disclosure, the base image may be an anchor view (or a center view).

Specifically, the target view prediction processor 22002 receives an image (texture picture or depth picture) of an anchor viewing position, and estimates an image based on the target viewing position and/or depth information as a target. Also, the target view prediction processor 22002 performs image estimation image according to depth information.

For example, the target viewing position may be a position related to camera position information. The target view prediction processor 22002 may recognize the overall disparity through the target viewing position. In addition, different disparities may be calculated according to objects through the depth information. Also, the target view prediction processor 22002 may use/generate additional information to increase the accuracy of the image estimation.

The prediction error processor 22003 calculates a difference between the predicted picture(s) and source pictures (or original images) of viewing positions. The prediction error processor 22003 finds a position where an error may occur based on the difference between the estimated image and the original image, and provides the receiver with information on an error-prone region (an error-prone region map). The prediction error processor 22003 is intended to take information that may be estimated through the base image as redundant information and to transmit other information. Accordingly, the receiver may receive only necessary information and efficiently reproduce the image of each viewing position. The prediction error processor 22003 may generate information with which the receiver may replace information on a position where an error may occur. In addition, it may deliver only information that cannot be estimated by the receiver or information in which a large error occurs to the receiver. The prediction error processor 22003 increases data transmission efficiency of the transmission terminal by detecting a hole in a picture or a prediction error in a picture.

The patch packing processor 22004 performs patch packing on a prediction error-processed picture (error-prone region picture) based on the error-prone region map. The patch packing processor 22004 reconstructs a compact image based on the information that cannot be estimated by the receiver or information in which a large error occurs. Regarding patches, patches for the respective viewing positions may be collected to create each image, or patches corresponding to several viewing positions may be collected into one.

The encoder 22005 encodes the packed patches and outputs a bitstream thereof. The encoder 22005 may encode the packed patches based on the texture or depth of the anchor viewing position.

An anchor view 22006 refers to an image that is a basis for pre-encoding. For example, according to embodiments of the present disclosure, the anchor view 22006 may be a center view. The video transmission apparatus according to the embodiments generates an estimated image based on the target viewing position based on the anchor view 22006, performs error estimation based on the original image for the viewing positions, and packs, encodes and transmits patches to deliver only information required by the receiver.

Predicted pictures 22007 represent an image generated by the target view prediction processor 22002. The predicted pictures 22007 may include a hole.

For example, the predicted pictures 22007 may be composed of 24 views. The number of views may be adjusted according to embodiments of the present disclosure. An example of performing prediction with 24 views will be described. The target view prediction processor 22002 may estimate 24 views (v0 to v23) for a target viewing position from the image or picture(s) for the anchor view. Also, a hole may be produced according to image estimation.

Prediction error-processed pictures (or subtracted pictures) 22008 represent a difference between the original image and the estimated image. As described above, the prediction error processor 22003 calculates the difference (error) between source pictures of viewing positions, for example, 24 original views and predicted pictures (24 estimated views) to generate the subtracted picture 22008.

A patched picture 22009 is a picture representing subtracted pictures 22008 on a per patch basis. A meaningful region included in the subtracted pictures 22008 for 24 views may be distinguished on a per patch basis.

Packed patches 22010 are patches into which the patch packing processor 22004 packs the patched picture. The packed patches may be generated for 24 views.

A packed patch (all in one) 22011 is patches into which a patched picture is packed by the patch packing processor 22004, and may be packed as all in one instead of patches for each of 24 views.

According to the embodiments, the target view prediction processor 22002, the prediction error processor 22003, and the patch packing processor 22004 include a target view prediction controller, a prediction error controller, and a patch packing controller, respectively.

Each operation of the pre-encoder according to the embodiments will be described in detail below based on each drawing.

According to embodiments of the present disclosure, a video transmission apparatus includes a target view prediction controller configured to predict a picture for a target viewing position from a texture picture or a depth picture of an anchor viewing position based on target viewing position information; a prediction error controller configured to process a prediction error for the predicted picture based on a source picture of the target viewing position, wherein an error-prone region map is generated based on the predicted picture and the source picture; a patch packing controller configured to perform patch packing on the prediction error-processed picture based on the error-prone region map; and an encoder configured to encode the packed patch based on a texture picture or a depth picture of the anchor viewing position.

Figure 23:
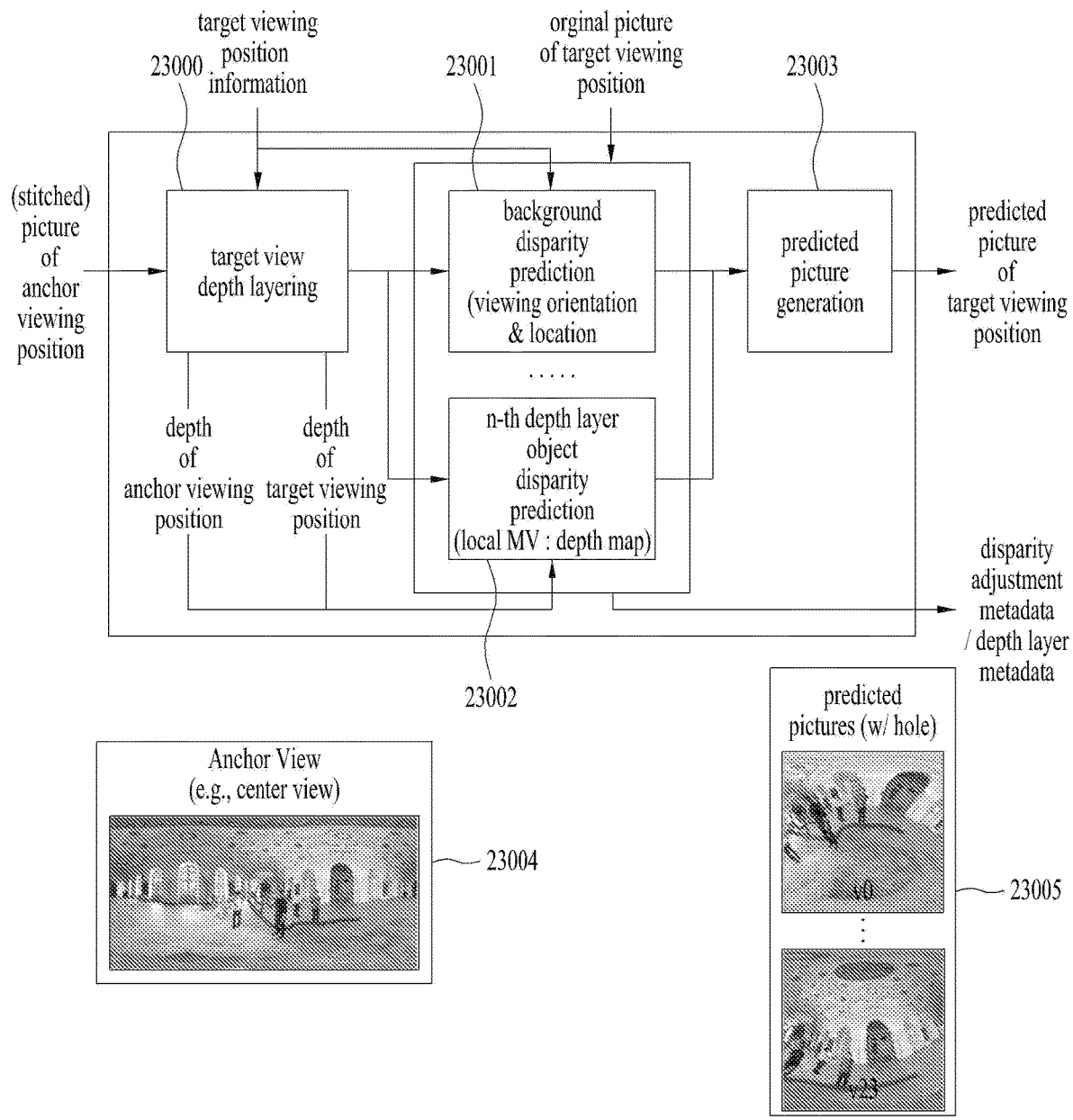
FIG. 23 illustrates a target view prediction process according to embodiments of the present disclosure.

FIG. 23 illustrates a target view prediction process according to embodiments of the present disclosure.

The target view prediction processing includes target view depth layering 23000, background disparity prediction 23001, depth layer object disparity prediction 23002, and/or predicted picture generation 23003.

The target view prediction processing distinguishes the depth layer of the texture picture or the depth picture of the anchor viewing position based on at least one of the target viewing position information, the depth of the anchor viewing position, or the depth of the target viewing position (Target view depth layering), predicts the distinguished depth layer based on the depth of the anchor viewing position and the depth of the target viewing position (Prediction), and generate a prediction picture for the target viewing position by integrating the predicted depth layer (Picture generation).

The target view prediction processing receives an anchor view picture including a texture and/or depth, a source view picture including a texture and/or depth, and/or target viewing position information. The target view prediction processing may generate a prediction picture by predicting a picture for the target viewing position based on the received data, and generate disparity adjustment metadata by adjusting the disparity. Details of the process are described below.

The target view depth layering 23000 receives a picture 23004 for the anchor viewing position. The picture for the anchor viewing position includes a texture and/or depth. The picture 23004 for the anchor viewing position may be a stitched picture as shown in FIG. 10. In the target view depth layering 23000, target viewing position information, a depth of the anchor viewing position, and a depth of the target viewing position are received. In the target view depth layering 23000, a picture is separated according to the depth based on an anchor view depth and a target view depth. An object for a picture may be separated according to the depth. A background of the picture and objects of different depth layers may be classified according to the depth. Furthermore, the depth layer may be further subdivided to accurately distinguish layers.

For example, in the target view depth layering 23000 may classify (or generate) n depth layer objects including the background. In addition, when the depth layer is divided in detail, information on the depth layer may be generated in the form of metadata.

The predictions 23001 and 23002 include background disparity prediction 23001 and/or n-th depth layer object disparity prediction 23002. The predictions 23001 and 23002 perform prediction on a picture based on the divided layer. In the predictions 23001 and 23002, the object disparity of each depth layer is estimated (predicted) based on the target viewing position information, the original picture of the target viewing position, the depth of the anchor viewing position, and the depth of the target viewing position. The predictions 23001 and 23002 are performed based on the depth information about the anchor view and/or position information about the target view. The original texture and depth of the target view is compared with the texture and depth of the anchor view. When correction of the texture and depth of the anchor view is needed, disparity adjustment metadata or depth layer metadata may be generated.

In the background disparity prediction 23001, the background is estimated (predicted) based on the viewing orientation and/or location information.

In the n-th depth layer object disparity prediction 23002, the disparity of the object for the generated n-th depth layer is estimated (predicted). In the n-th depth layer object disparity prediction 23002, the disparity may be predicted using a depth map and/or local MV information.

In the predicted picture generation 23003, a final prediction picture (or image) is generated by integrating the predicted data according to different depth layers. If a region hidden in the anchor view is visible in the target view, a hole is generated.

The anchor view 23004 represents a picture (or image) for the anchor view. The anchor view 23004 may include a texture and/or depth. The anchor view 23004 is input to the target view depth layering 23000.

A prediction picture 23005 represents data generated in the predicted picture generation 23003. The prediction picture 23005 may include a plurality of pictures. For example, the prediction picture 23005 may consist of 24 views. The prediction picture 23005 may include a hole due to a difference in region between the anchor view and the target view.

The target view prediction processing generates the prediction picture 23005 for the target viewing position. Disparity adjustment metadata and depth layer metadata may also be generated. When correction between the target viewing position and the anchor viewing position is required in the disparity prediction process, the metadata may include a position and a depth to be corrected, an XY correction value, a depth value corresponding to each depth layer when there are multiple depth layers, and a total number of depth layers. The receiver according to the embodiments may perform a target view prediction process based on this metadata in the decoder post-processing process. Since the operation of the receiver according to the embodiments follows the reverse process of the operation of the transmitter according to the embodiments, the transmitter transmits signaling information to the receiver to allow the receiver to implement the target view prediction process, which is performed in the encoder preprocessing of the transmitter.

The target view prediction controller of the video transmission apparatus distinguishes a depth layer of the texture picture or depth picture of the anchor viewing position based on at least one of the target viewing position information (Target view depth layering), predicts the distinguished depth layer based on the depth of the anchor viewing position and the depth of the target viewing position (Prediction), and generates a prediction picture for the target viewing position by integrating the predicted depth layers (Picture generation).

Figure 24:
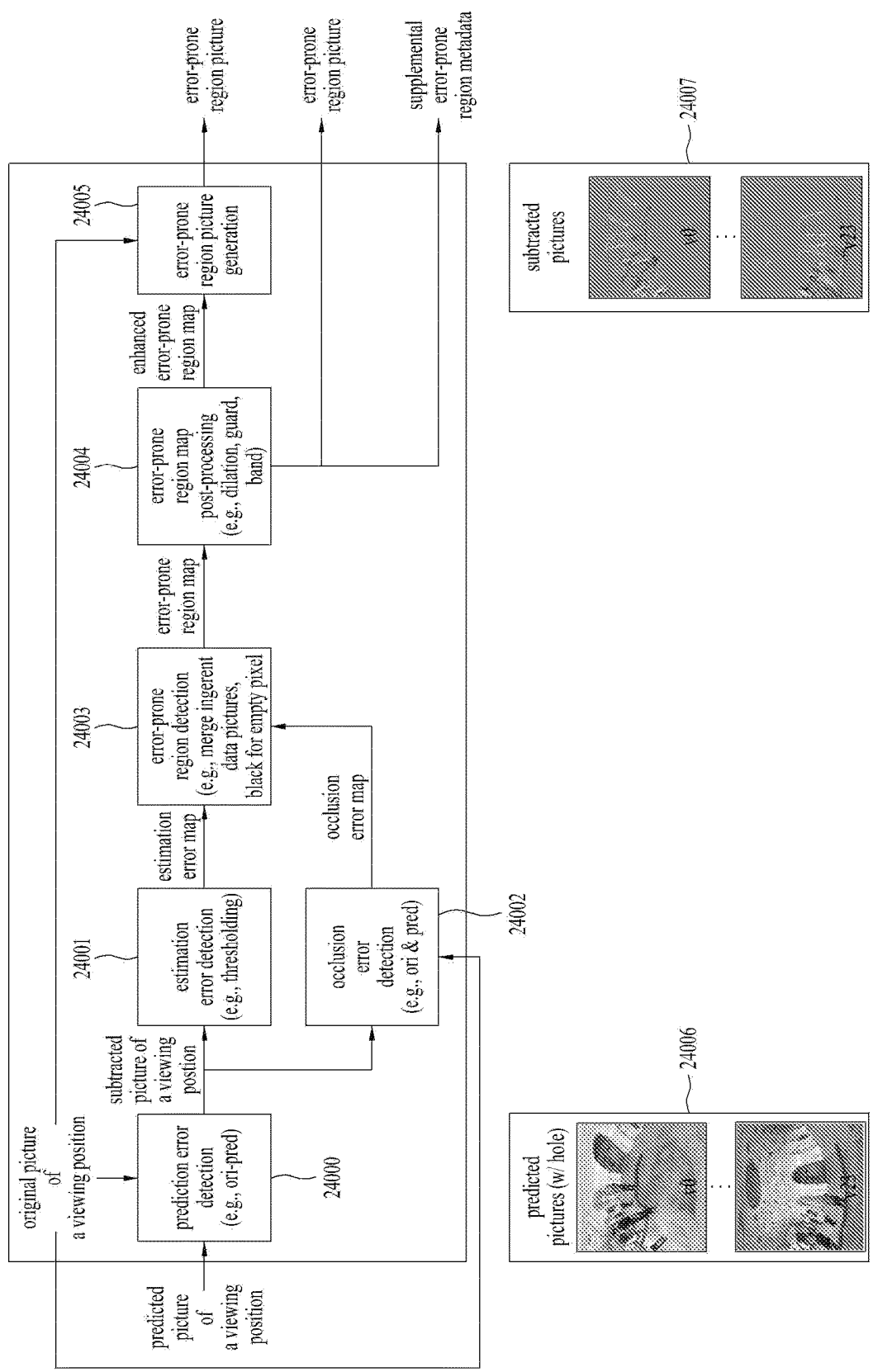
FIG. 24 illustrates prediction error processing according to embodiments of the present disclosure.

FIG. 24 illustrates prediction error processing according to embodiments of the present disclosure.

The prediction error processing includes prediction error detection 24000, estimation error detection 24001, occlusion error detection 24002, and error-prone region detection 24003, error-prone region map post-processing 24004, and/or error-prone region picture generation 24005.

The prediction error detection 24000 receives a picture estimated (predicted) for a viewing position. Here, the viewing position may be a target viewing position. The prediction error detection 24000 receives the original picture of the viewing position. Here, the original picture of the viewing position may be a source picture of the viewing position. In the prediction error detection 24000, a prediction error for the viewing position is acquired by performing subtraction on the original picture and the prediction picture. The prediction error may be referred to as a subtracted picture or the like.

The estimation error detection 24001 receives the prediction error (subtracted picture). In the estimation error detection 24001, an estimation error is acquired from the prediction error. In the estimation error detection 24001, the estimation error using a threshold scheme. In the estimation error detection 24001, an estimation error map indicating the estimation error is generated.

The occlusion error detection 24002 receives the prediction error (subtracted picture). In the occlusion error detection 24002, an occlusion error is acquired based on the prediction error. For example, information present in the original picture and not in the prediction picture may be detected as an occlusion error. In the occlusion error detection 24002, an occlusion error map indicating the occlusion error is generated.

In the error-prone region detection 24003, an error-prone region is detected based on the estimation error map and/or the occlusion error map. For example, the error-prone region detection 24003 may merge an inherent data picture through error-prone region detection or perform black processing on empty pixels. In the he error-prone region detection 24003, an error-prone region map indicating the error-prone region may be generated.

The error-prone region map post-processing 24004 receives the error-prone region map. In the error-prone region map post-processing, post-processing for enhancing the error-prone region map is performed. For example, the error-prone region map may be dilated or a guard band may be added. In the error-prone region map post-processing 24004, an error-prone region map and supplemental error-prone region metadata may be generated.

The error-prone region picture generation 24005 receives the enhanced error-prone region map. The error-prone region picture generation 24005 receives the original picture of the viewing position. In the error-prone region picture generation, an error-prone region picture is generated based on the post-processed error-prone region map and/or the original picture.

The predicted picture 24006 represents a picture (image or data) input to the prediction error detection 24000. The predicted picture 24006 includes a hole. The hole represents a hole generated due to the prediction. For example, the predicted picture 24006 may include 24 views from v0 to v23.

The subtracted picture 24007 represents an error picture generated by the prediction error detection 24000. For example, it is an error picture generated by subtracting the predicted picture from the source picture (original picture).

Each process of the prediction error processing according to embodiments will be described in detail.

The prediction error processing processes a region that is not predictable from the anchor view picture through target view prediction.

The input data of the prediction error processing is a predicted picture (texture, depth) including a texture and/or depth, and/or a source view picture (texture, depth) including a texture and/or depth.

The output data of the prediction error processing is an error-prone region picture, an error-prone region map, and/or supplemental error-prone region metadata.

In the prediction error detection 24000, an error generated due to the target view prediction is estimated. For example, the error (error picture) is estimated by subtracting the estimated picture from the original picture.

For example, the error picture in the n-th viewing position is estimated as follows. The estimated picture of the n-th viewing position is subtracted from the source view picture of the n-th viewing position. In addition, the error may be acquired in the following equation (Equation: eg, error picture (of the n-th viewing position)=(source view picture (of the n-th viewing position)−predicted picture (of the n-th viewing position))/2+512).

In the estimation error detection 24001, information may be estimated through the anchor view picture, but a portion of low accuracy is detected. For example, a prediction error may be detected through a threshold. According to embodiments, the estimation errors is acquired through an equation as follows (e.g., estimation error (x.y pixel location)=minimum threshold<error picture (x, y)<maximum threshold). Here, the minimum threshold is intended to include only errors of a certain degree or more as prediction errors. The maximum threshold is used to distinguish an occlusion error. The prediction error map serves as an indicator that has a value only for a location where a prediction error is present.

In the occlusion error detection 24002, a portion where information cannot be estimated is detected through the anchor view picture. The portion that cannot be estimated may be estimated through a hole (a region without information) that occurs after the prediction. For example, when the prediction error is almost similar to the original pixel value and the original pixel value is not 0, it may be considered as a hole produced due to occlusion (e.g., occlusion error (x.y)=abs((error (x, y)−512)*2)−source view picture (x, y))<threshold && source view picture (x, y)>threshold). The occlusion error map serves as an indicator having a value only for a position where it is determined that an occlusion error has occurred.

In the error-prone region detection 24003, the types of errors may be divided into an estimation error and an occlusion error, which may be processed in different forms. In this case, the estimation error may carry residual data, and the occlusion error may carry substitutable data that may fill the hole with the original data. However, in this case, compression efficiency may be degraded due to the difference in characteristics between the residual data, which is composed of high frequency components, and the occlusion data, which is mainly composed of low frequency components. When a different codec is used or a different image is constructed depending on the type of data, the number of necessary codecs may increase, which may put a burden on the transceiver. As a method to address this issue, the embodiments of the present disclosure may use a method of selecting an estimation error with a large error and delivering information that may be replaced such as the occlusion error. Thereby, an image may be constructed with real data by reflecting the characteristics of a compression codec, 2) the complexity of patch configuration may be reduced, and 3) the number of codecs may be reduced. In addition, the need for a codec for residual data may be eliminated.

For example, a pixel in which any of the prediction error map or the occlusion error map is on may indicate an error-prone region. In this case, a portion with a value of 0 may indicate that it has no error and that information estimated through target view prediction may be used, a portion with a value (1 or max, etc.) other than 0 may indicate an error-prone region (prediction error, occlusion error, etc.), and indicate that the information estimated through the target view prediction is not used or additional processing is required therefor.

The supplemental error-prone region metadata may carry a pixel width dilated through the dilation, or carry the position and size information about the guard band and the error type (e.g., estimation error or occlusion error).

The error-prone region map post-processing 24004 is a post-processing process for the error-prone region map that is performed to increase the accuracy of the error-prone region or to prevent additional errors that may occur during compression. For example, processing may be performed to add a guard band to the periphery of the error-prone region, and the error-prone region may be extended to a certain degree using a method such as dilation. In this case, the region information (e.g., pixel width) added through the post-processing process may be delivered or may be delivered without a separate indicator.

The error-prone region picture generation 24005 may construct an image with information about the original image (e.g., the original picture or the source view picture) that may replace the region with a large estimation error or impossible to estimate based on the previously generated error-prone region map.

The error-prone region map may be delivered directly to the receiver, or may be generated by inference from the delivered error-prone region picture.

The prediction error controller of the prediction error processing according to the embodiments is configured to: detect a prediction error from a predicted picture based on the source picture (Prediction error detection), wherein the prediction error is estimated by subtracting the prediction picture from the source picture; acquire an estimation error from an error picture corresponding to the prediction error based on a threshold (Estimation error detection); generate an estimation error map including position information about the estimation error and acquire an occlusion error from the prediction error based on a hole (Occlusion error detection); generate an occlusion error map including position information about the occlusion error; detect an error-prone region related to prediction for a target viewing position based on at least one of the estimation error map or the occlusion error map; generate an error-prone region map including position information about the error-prone region; perform post-processing of adding a guard band to the error-prone region map or dilating the error-prone region map (Error-prone region map post-processing); and generate a picture related to the error-prone region based on the error-prone region map and the source picture (Error-region picture generation).

The prediction error controller of a video transmission apparatus according to embodiments is configured to: detect a prediction error from a predicted picture based on the source picture (Prediction error detection), wherein the prediction error is estimated by subtracting the prediction picture from the source picture; acquire an estimation error from an error picture corresponding to the prediction error based on a threshold (Estimation error detection); generate an estimation error map including position information about the estimation error and acquire an occlusion error from the prediction error based on a hole (Occlusion error detection); and generate an occlusion error map including position information about the occlusion error.

Figure 25:
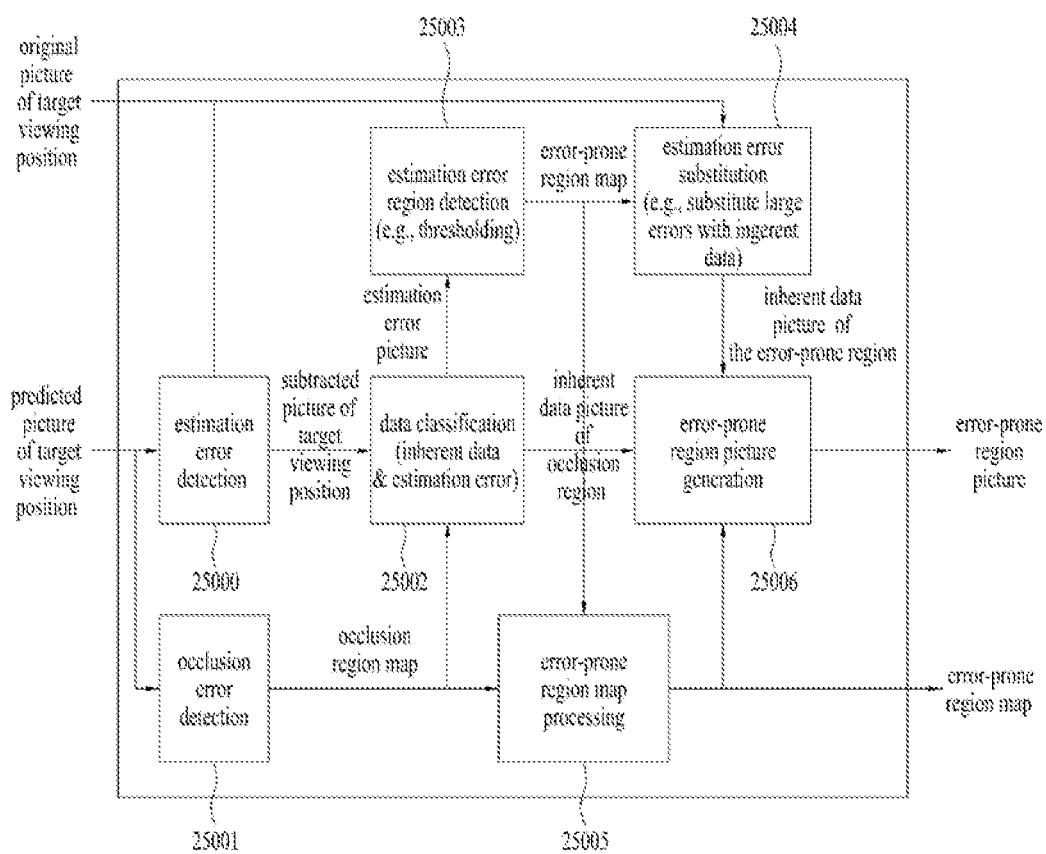
FIG. 25 illustrates prediction error processing according to embodiments of the present disclosure.

FIG. 25 illustrates prediction error processing according to embodiments of the present disclosure.

The prediction error processing includes estimation error detection 25000, occlusion error detection 25001, data classification 25002, estimation region detection estimation region detection 25003, estimation error substitution 25004, error-prone region map processing 25005, and/or error-prone region picture generation 25006.

In the estimation error detection 25000, a predicted picture of a target viewing position and a source picture (or original picture) of the target viewing position are received. In the estimation error detection 25000, a prediction error between the estimated picture and the original picture is detected. In the estimation error detection 25000, a subtracted picture of the target viewing position is generated. A specific estimation error detection method is described above with reference to FIG. 24. For example, the subtracted picture of the viewing position may be generated through a difference between the original picture and the prediction picture.

In the occlusion error detection 25001, an occlusion error is detected from the predicted picture. In the occlusion error detection 25001, an occlusion region map indicating position information about the occlusion error is generated. Details of the occlusion error detection 25001 are described above with reference to FIG. 24.

The data classification 25002 receives the subtracted picture of the target viewing position. The data classification 25002 receives the occlusion region map. In the data classification 25002, inherent data (or the original picture or source picture) and the estimation error are classified based on the occlusion region map and the subtracted picture. In the data classification 25002, a classified estimation error (estimation error picture) is generated. In the data classification 25002, the type of error is classified based on the prediction error and the occlusion error. In the data classification 25002, an inherent data picture of the occlusion region (original picture or source picture) for the classified occlusion error is generated.

The estimation region detection 25003 receives an estimation error picture (or estimation error). In the estimation error region detection 25003, the region of the estimation error is detected. Details of the method of detecting the region of the estimation error are described above with reference to FIG. 24. For example, a region in which an estimation error has occurred may be indicated through a threshold or thresholding. In the estimation error region detection 25003, an error-prone region map indicating information about an error-prone region may be generated.

The estimation error substitution 25004 receives the error-prone region map. For example, when the value of error is large, the estimation error substitution replaces the large error with inherent data. In the estimation error substitution 25004, an inherent data picture of the error-prone region is generated.

The error-prone region map processing 25005 receives the occlusion region map. The error-prone region map processing 25005 receives the error-prone region map. The error-prone region map processing 25005 increases the accuracy of the error-prone region. The error-prone region map processing 25005 prevents additional errors that may occur in the encoding or compression process. Details of the method for the error-prone region map processing are described above in the error-prone region map post-processing of FIG. 24.

The error-prone region picture generation 25006 receives the inherent data picture of the occlusion region. In the error-prone region picture generation 25006, the error-prone region map and/or the inherent data picture of the error-prone region are received. In the error-prone region picture generation 25006, an error-prone region picture is generated.

Details of the method for the specific error-prone region picture generation method are described above with reference to FIG. 24.

Prediction error processing is a process of processing an unpredictable region from an anchor view picture through a target view prediction process. The input data (inputs) of the prediction error processing are a predicted picture (texture, depth) including a texture and/or depth, and a source view picture including a texture and/or depth. The output data (outputs) of the prediction error processing are an error-prone region picture, an error-prone region map, and/or supplemental error-prone region metadata.

The prediction error detection 25000, the occlusion error detection 25001, error-prone region detection 25003, the error-prone region picture generation 25006, and the error-prone region map processing 25005 of FIG. 25 may correspond to the content described above with reference to FIG. 24.

In the data classification 25002, error related data is classified according to the type of the error based on the prediction error and the occlusion error.

For the estimation error, the video transmission apparatus according to the embodiments may deliver a difference value from the prediction error in the estimation error substitution 25004. Further, in order to reduce the types of image data, the video transmission apparatus according to the embodiments may deliver original image information about the prediction error. For example, when the prediction error is excessively large, or when it is rather inefficient to delvier the difference value, the video transmission apparatus according to the embodiments may deliver the original image information to replace the information.

The prediction error controller of the prediction error processing according to embodiments is configured to detect an estimation error of the predicted picture of the target viewing position based on the source picture of the target viewing position (Estimation error detection); generate a subtracted picture of the target viewing position; detect an occlusion error from the predicted picture (Occlusion error detection); generate an occlusion region map indicating an occlusion error; classify the type of errors including the prediction error and the occlusion error based on the subtracted picture and the occlusion region map (Data classification); detect a region of the prediction error for the predicted picture based on a picture for the prediction error (Estimation error region detection); generate an error-prone region map indicating the region of the prediction error; substitute the source picture for the prediction error when a value of the prediction error is greater than a specific value (Estimation error substitution); generate an error-prone region map indicating an error-prone region based on the occlusion region map and the error-prone region map; and generate an error-prone region picture based on the source picture substituted and the source picture of the occlusion region (Error-prone region picture generation).

Figure 26:
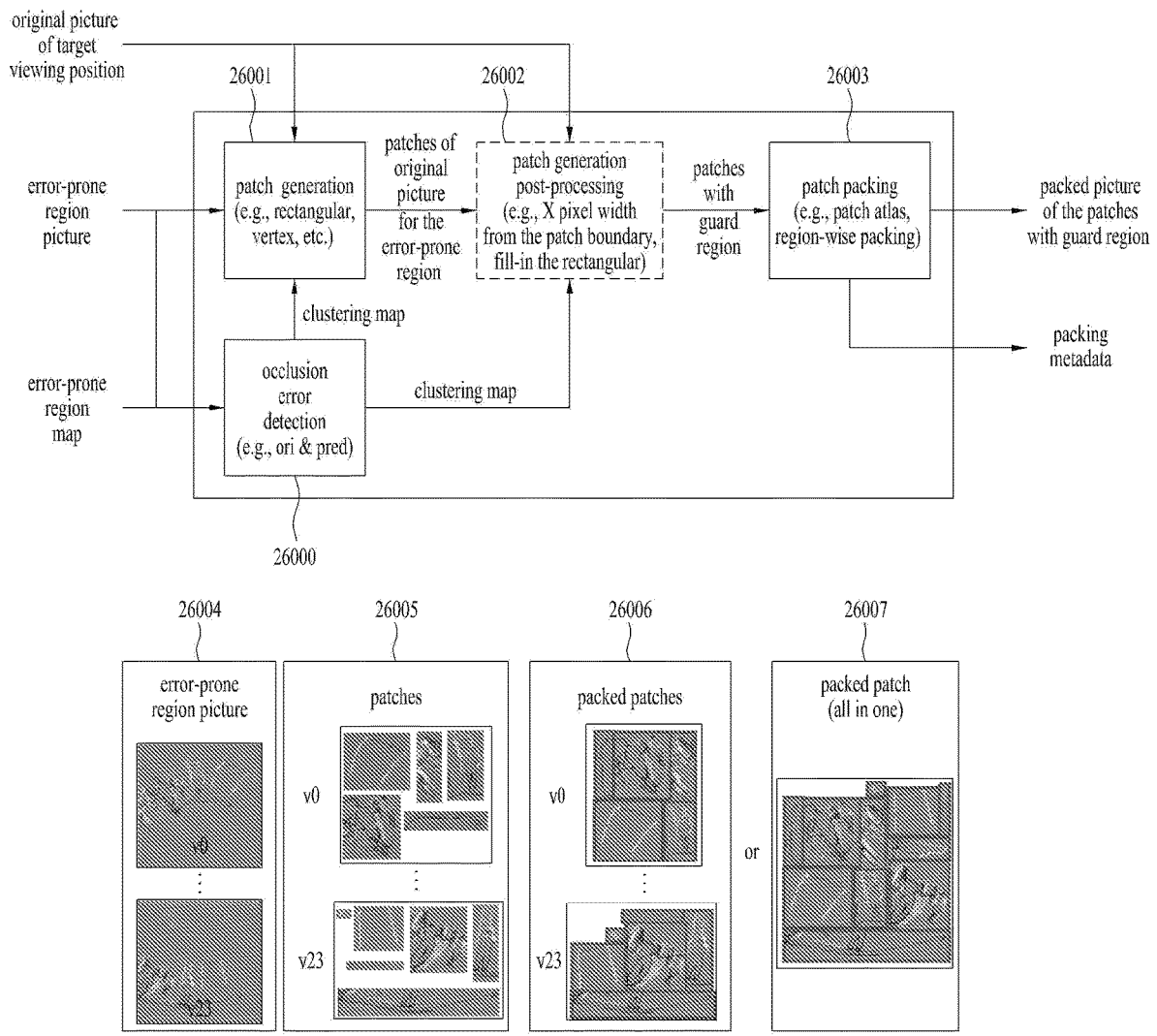
FIG. 26 illustrates patch packing processing according to embodiments of the present disclosure.

FIG. 26 illustrates patch packing processing according to embodiments of the present disclosure.

The patch packing processing includes region clustering 26000, patch generation 26001, patch generation post-processing 26002, and/or patch packing 26003.

The region clustering 26000 receives the error-prone region picture. The region clustering 26000 receives the error-prone region map. In the region clustering 26000, regions (areas) of the error-prone region picture are grouped (or clustered) based on the error-prone region map. In the region clustering 26000, a clustering map is generated by grouping regions (areas) of the error-prone region picture.

For example, the region clustering may be performed through a manual mode, or neighbor pixels included in the error-prone region picture may be clustered (neighborhood search).

The patch generation 26001 receives the error-prone region picture. The patch generation 26001 receives the original picture of the target viewing position. The patch generation 26001 receives the clustering map. In the patch generation 26001, patch(es) of the original picture for the error-prone region are generated based on the error-prone region picture, the original picture, and the clustering map. For example, the shape of the patch may be a rectangle or a vertex. According to embodiments, various shapes may be set for the patch.

In the patch generation post-processing 26002, the patch (es) (patches of original picture for the error-prone region) are received. The patch generation post-processing 26002 receives the original picture of the target viewing position. The patch generation post-processing 26002 receives the clustering map. In the patch generation post-processing 26002, patches with a guard region are generated based on the patches, the original picture and/or the clustering map. For example, the patch generation post-processing 26002 fills in the empty spaces in the rectangular patch with pixels of the original picture. In addition, in the patch generation post-processing 26002, a guard band corresponding to a predetermined patch width from the patch boundary (X pixel width from the patch boundary) may be generated. The patch generation post-processing 26002 according to the embodiments may be optionally performed.

The patch packing 26003 receives the patches of the original picture for the error-prone region or the patches with the guard region. In the patch packing 26003, a packed picture of the patches with the guard region is generated based on the received patches. Alternatively, in the patch packing 26003, a packed picture of the patches is generated. In the patch packing 26003, packing metadata containing signaling information related to the patch packing is generated.

Data of the patch packing processing according to the embodiments are as follows.

The error-prone region picture 26004 is input data of the patch packing processing. For example, data about a total of 24 (v0 to v23) views may be input. The error-prone region picture 26004 corresponds to the above-described subtracted picture. For example, the error-prone region picture 26004 is a picture generated due to a difference between the original picture and the predicted picture.

The patches 26005 are patches generated by the patch generation 26001. For example, when there is data about a total of 24 views (v0 to v23), patches including a region containing significant data may be generated for data about each view. The shaded region included in the error-prone region picture is insignificant data, and the region containing significant data is included in the patch.

The packed patches 26006 are packed patches generated by the patch packing 26003. For example, patches generated for the data about a total of 24 views (v0 to v23) are packed. The packed patches may include the guard region generated by the patch generation post-processing 26006. Guard regions may be included between the respective packed patches.

The packed patch (all in one) 26007 is a packed patch generated by the patch packing 26003. For example, one patch may be packed by collecting the patches generated for the data about the 24 views (v0 to v23) (all in one).

Details of the operation of the packing processing according to the embodiments are disclosed below.

The packing process is a process for efficiently delivering information about a region that cannot be estimated. Since this process removes a region without information from the entire image, the size of the image to be transmitted may be reduced, or the total number of images to be transmitted may be reduced. Thereby, the amount of data to be transmitted may be reduced.

The region clustering 26000 is a process of grouping regions to be transmitted in the error-prone region picture generated through the prediction error processing. Most sparsely, each pixel indicated in the error-prone region map may be delivered. In this case, however, the amount of information for indicating the reactive pixels may increase to the maximum, and thus the efficiency of data transmission may be lowered. Therefore, a grouping process of bundling and delivering related information is needed. In this process, a user may directly create a group, or spatially adjacent pixels may be grouped into a group when they are valid pixels. As a result, pixels belonging to a plurality of groups are indicated through a region clustering map, and all valid pixels in the error-prone region should be included in one of the groups in the region clustering map.

The patch generation 26001 is a process of selecting regions to be transmitted in the error-prone region picture generated through the prediction error processing, and configuring each of them as a patch. Referring to the drawing, gray portions are regions without data, and are included as rectangular regions including a portion with valid pixels. Using the rectangular region is intended to inform the receiver of the position of a packed patch and to efficiently use the patch required by the receiver. However, since a number of unnecessary portions are included in the rectangular patch region, the patch may be configured to be compact by using a patch of an arbitrary shape or by using a patch region of various predetermined shapes.

The patch generation post-processing 26002 is a post-processing process for a generated patch. For example, by filling empty spaces in the patch with original picture data, the computation required for the prediction at the receiver may be reduced, and/or an operation of generating a guard band of the patch may be performed in order to prevent errors that may occur due to the patch packing and encoding/decoding.

The patch packing is a process of constructing one or more images with the previously generated patches and generating information about each patch. In constructing the image, only patches for each viewing position may be collected to construct each image, or patches for a plurality of viewing positions may be collected to construct to construct one image. In this case, if necessary, the patch may be efficiently packed through size adjustment, rotation, flip, or the like. The packing metadata may contain information necessary for unpacking, and carry the size and position of the patch, adjustment information (size adjustment, rotation, flip, etc.), the position and size in the original image, guard band information, and the error type (estimation error/occlusion error).

According to embodiments of the present disclosure, there is a case where only packing is used without a pruning process. For example, as shown in FIG. 22, there may be a mode in which a pruning process including target view prediction processing 22002 and prediction error processing 22001 is optional. In this case, packing may be performed on the full picture for all or some views. The packing may be performed by assigning different weights according to the importance of a region (e.g., the user's viewing direction/viewing position) or quality).

The patch packing controller of the video transmission apparatus according to the embodiments clusters regions for distinguishing an error-prone region picture of a prediction error-processed picture based on the error-pro region map (Region clustering), generates a clustering map indicating regions, generates a patch from the error-prone region picture based on the source picture and the clustering map (Patch generation), generates one or more pictures using the patch (Patch packing).

Figure 27:
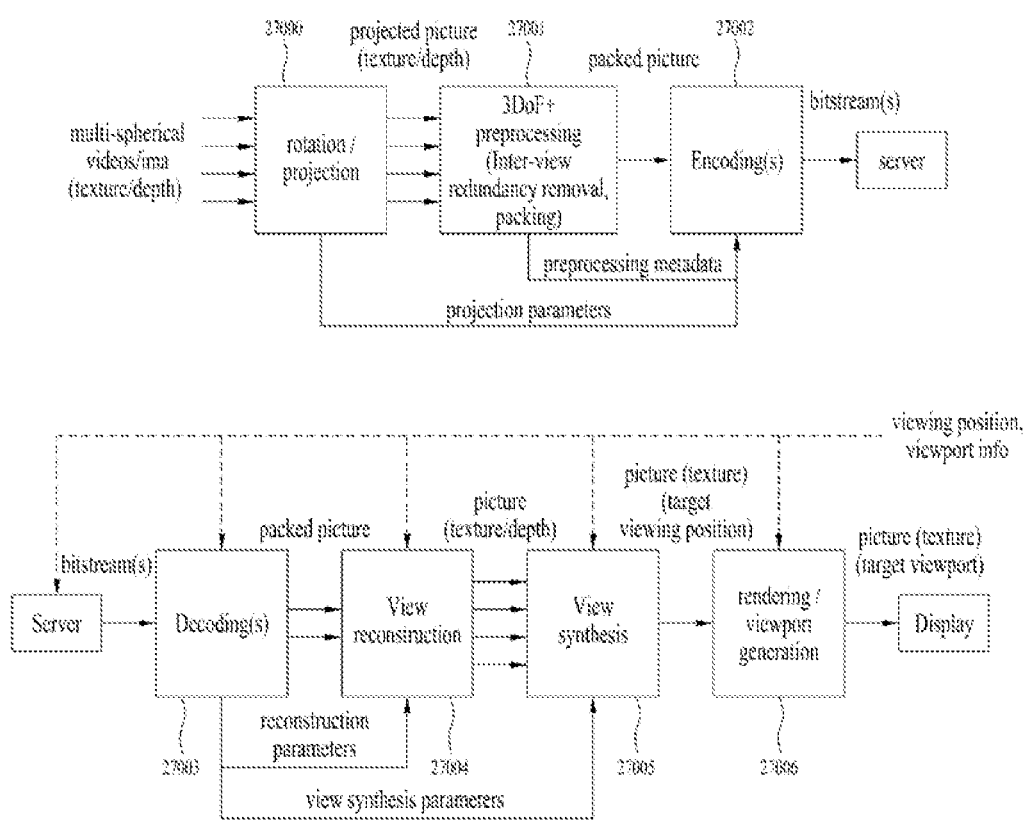
FIG. 27 illustrates architectures of an encoder of a video transmission apparatus and a decoder of a video reception apparatus according to embodiments of the present disclosure.

FIG. 27 illustrates architectures of an encoder of a video transmission apparatus and a decoder of a video reception apparatus according to embodiments of the present disclosure.

The encoder of the video transmission apparatus performs rotation/projection 27000, preprocessing 27001, and/or encoding 27002.

The rotation/projection 27000 receives multiple spherical videos/images including a texture and/or depth. In the rotation/projection 27000, the multiple spherical video/images are rotated and/or projected to generate a projected picture including a texture and/or depth. In the rotation/projection 27000, projection parameters including signaling information related to the projection process are generated.

The preprocessing 27001 receives the projected picture. For example, the preprocessing 27001 includes inter-view redundancy removal, and/or packing. In the inter-view redundancy removal, redundancy between adjacent pictures among multiple projected pictures is removed. In the packing, the multiple projected pictures are packed into a picture. In the preprocessing 27001, preprocessing metadata containing signaling information related to the preprocessing is generated.

The encoding 27002 receives the packed picture. The encoding 27002 receives the preprocessing metadata. The encoding 27002 receives the projection parameters. In the encoding 27002, the packed picture is encoded based on the preprocessing metadata and/or the projection parameters. The encoded data is transmitted to the video reception apparatus through a server in the form of a bitstream.

The encoder of FIG. 27 corresponds to the pre-encoder of FIG. 22 and may be coupled thereto.

The decoder of the video reception apparatus performs decoding 27003, view reconstruction 27004, view synthesis 27005, and rendering/viewport generation 27006.

The decoding 27003 receives a bitstream from the video transmission apparatus through a server. The decoding 27003 receives viewing position and/or viewport information. The viewing position and/or viewport information may be transmitted in the bitstream. The viewing position and/or viewport information may be received as feedback information at the reception terminal separately from the bitstream. In the decoding 27003, data contained in the bitstream is decoded to generate a packed picture. In the decoding 27003, reconstruction parameters are generated by decoding the data contained in the bitstream. In the decoding 27003, view synthesis parameters are generated by decoding the data contained in the bitstream.

The view reconstruction 27004 receives the packed picture. In the view reconstruction 27004, a picture including a texture and/or depth is generated (reconstructed) from the packed picture based on the reconstruction parameters. The view reconstruction 27004 receives viewing position and/or viewport information. The viewing position and/or viewport information may be transmitted in the bitstream. The viewing position and/or viewport information may be received as feedback information at the receiving terminal separately from the bitstream. In the view reconstruction 27004, a picture may be reconstructed based on the viewing position and/or viewport information.

The view synthesis 27005 receives the picture including a texture and/or depth. The view synthesis 27005 receives the view synthesis parameters. In the view synthesis 27005, a picture for the target viewing position is generated from the received picture based on the view synthesis parameters. The picture for the target viewing position includes a texture. The view synthesis 27005 receives viewing position and/or viewport information. The viewing position and/or viewport information may be transmitted in the bitstream. The viewing position and/or viewport information may be received as feedback information at the receiving terminal separately from the bitstream. In the view synthesis 27005, a picture (texture) for the target viewing position may be synthesized based on the viewing position and/or viewport information.

The rendering/viewport generation 27006 receives the picture (texture) for the target viewing position. The rendering/viewport generation 27006 receives the viewing position and/or viewport information. The viewing position and/or viewport information may be transmitted in the bitstream. The viewing position and/or viewport information may be received as feedback information at the receiving terminal separately from the bitstream. In the rendering/viewport generation 27006, a picture (texture) for the target viewing position is rendered, and a picture (texture) for a target viewport is generated. In the rendering/viewport generation 27006, the picture (texture) for the target viewport is generated based on the viewing position and/or viewport information. The picture (texture) for the target viewport is displayed.

Figure 28:
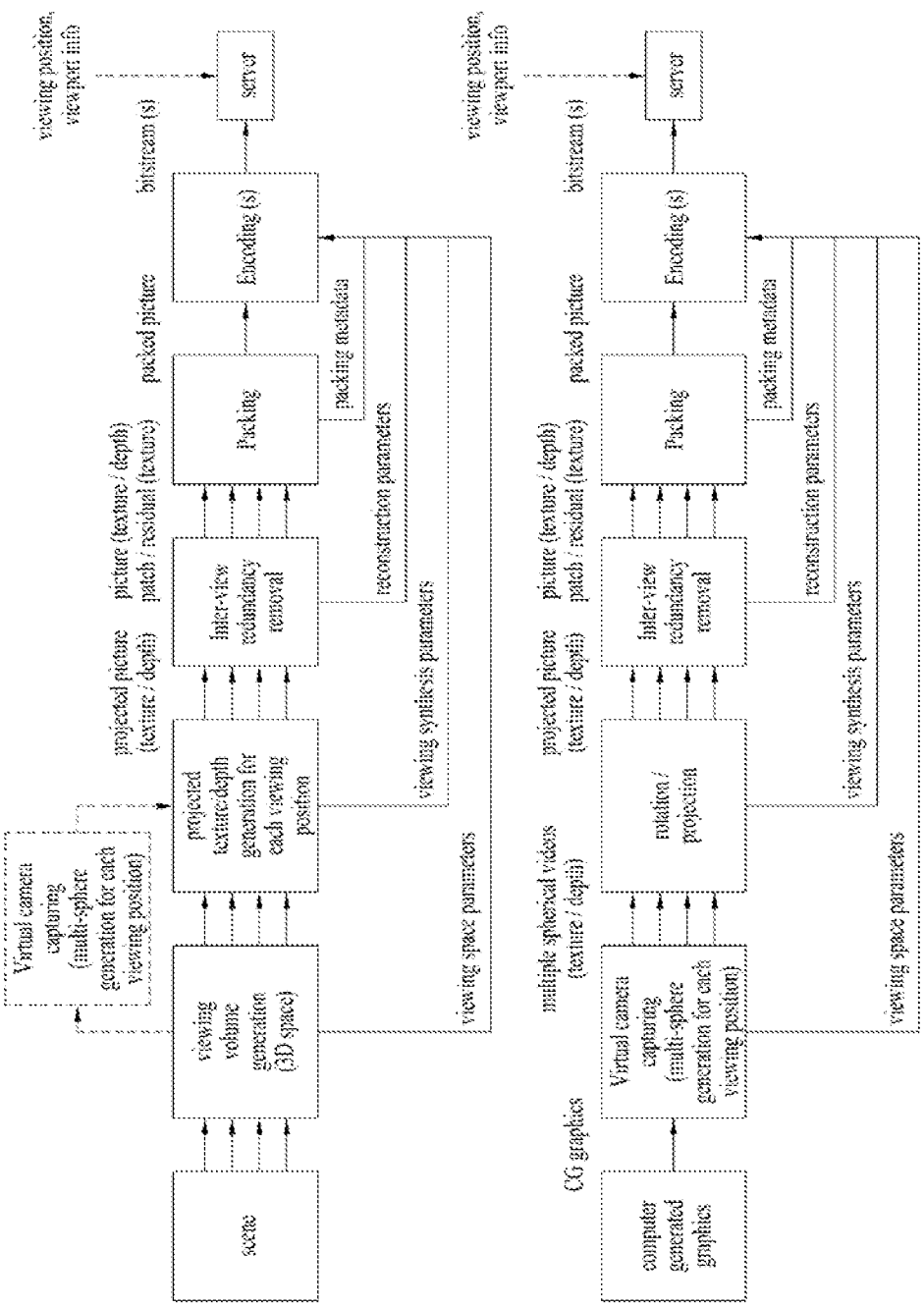
FIG. 28 shows a detailed architecture of an encoder according to embodiments of the present disclosure.

FIG. 28 shows a detailed architecture of an encoder according to embodiments of the present disclosure.

The video transmission apparatus (encoder) according to the embodiments of the present disclosure may perform the following operations.

Viewing volume generation 28000 is performed to acquire 360 video data for multiple views from a target scene. In the viewing volume generation, scene information may be received in the form of CG, and a viewing volume may be generated in consideration of a 3D space for the scene. As a result, multiple spherical videos including a texture and depth are generated.

Here, the scene represents an image acquired from a camera, and CG represents an image acquired through preprocessing including computer graphics.

In the viewing volume generation, a viewing space parameter related to the viewing volume is generated. The viewing volume refers to a space that supports 3DoF+. This operation synthesizes an image of a virtual view in a 3D space through processing including computer graphics, rather than employing the original images captured by the camera, and creates a 3DoF+ image from the synthesized image.

Virtual camera capturing 28001 may be performed to create a multi-sphere for each viewing position. Virtual camera capture information may be generated based on the viewing volume. The virtual camera capturing may be optionally performed.

Projected texture/depth generation for each viewing position 28002 is performed to create a projected picture including texture/depth for each viewing position and to create a view synthesis parameter for synthesizing the projected pictures.

Inter-view redundancy removal 28003 is performed to remove inter-view redundancy between the views for the projected pictures to generate a picture including a texture and depth. The inter-view redundancy removal generates an optimal picture in consideration of a patch and a residual for the texture, and generates reconstruction parameters for reconstructing the picture.

Packing 28004 is performed to generate a packed picture by packing pack a plurality of pictures and to generate packing metadata related to the packing of the pictures.

Encoding 28005 is performed to encode the packed picture. In the encoding, data included in the picture is encoded based on the viewing space parameter, view synthesis parameter, reconstruction parameters, and/or packing metadata generated in the above-described operations.

The encoded data is transmitted from the video transmission apparatus (encoder) to the video reception apparatus (decoder) in the form of a bitstream through a server. Here, viewing position information and/or viewport information may be transmitted together.

Each operation of the above-described video transmission apparatus may be performed by a viewing volume generator, a virtual camera capturer, a projector, an inter-view redundancy remover, a packing unit, an encoder, or the like included in the video transmission apparatus.

According to embodiments of the present disclosure, the video transmission apparatus may perform the following operations.

Virtual camera capturing 28006 is performed to receive computer-generated graphic data and generate multi-spherical data for each viewing position. The virtual camera capturing generates multiple spherical videos including a texture and depth, and generates a viewing space parameter related to the multiple spherical videos.

Rotation/projection 28007 is performed to rotate and/or project the plurality of spherical videos including a texture and depth to generate projected pictures. Also, a view synthesis parameter for view synthesis of the pictures is generated.

Inter-view redundancy removal 28008 is performed to remove redundancy between the views for the projected pictures. The inter-view redundancy removal generates a inter-view redundancy removed picture optimized for a patch/residual (texture), and generates a reconstruction parameter for reconstructing the picture.

Packing 28009 is performed to pack a plurality of pictures to generate an optimal picture. The packing generates packing metadata indicating the packed picture.

Encoding 28010 is performed to encode the packed picture. The encoding encodes data included in the packed picture based on the viewing space parameter, the view synthesis parameter, the reconstruction parameter, and/or packing metadata generated in the above-described operations.

The encoded data is transmitted from the video transmission apparatus (encoder) to the video reception apparatus (decoder) in the form of a bitstream through a server. Here, viewing position information and/or viewport information may also be transmitted together.

Each operation of the above-described video transmission apparatus may be performed by the virtual camera capturer, the rotator/projector, the inter-view redundancy remover, the packing unit, the encoder, or the like.

Figure 29:
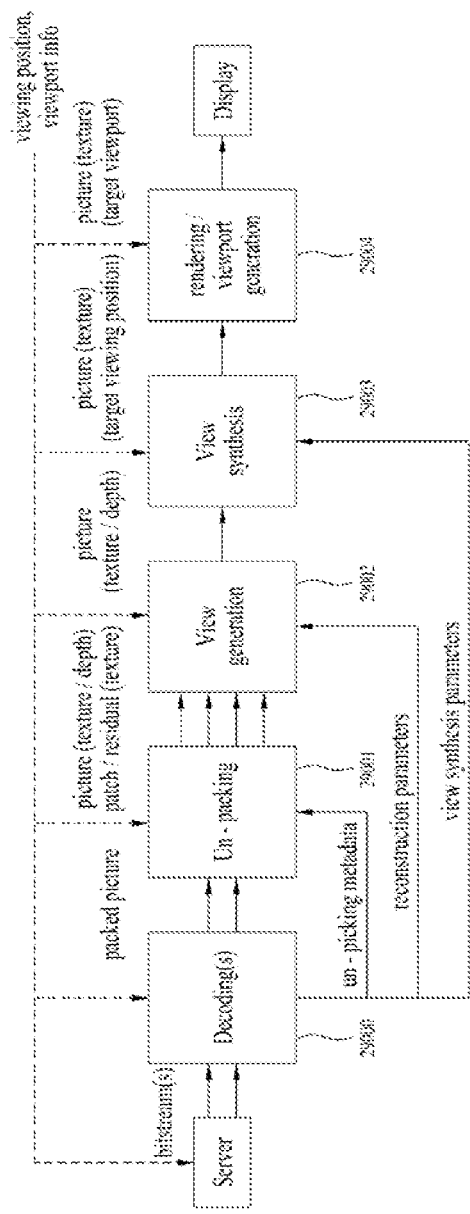
FIG. 29 shows a detailed architecture of a decoder according to embodiments of the present disclosure.

FIG. 29 shows a detailed architecture of a decoder according to embodiments of the present disclosure.

According to embodiments of the present disclosure, the video reception apparatus (decoder) may perform the following operations.

The video reception apparatus may receive data from the video transmission apparatus through the server. Decoding 29000 is performed to decode data included in a bitstream. In the decoding, a packed picture may be generated by decoding the data. In addition, unpacking metadata for unpacking the packed picture from the data included in the bitstream, reconstruction parameters for reconstructing a picture, and view synthesis parameters for synthesizing a view for the picture may be generator.

Unpacking 29001 is performed to generate a plurality of pictures by unpacking one or more packed pictures. The unpacked pictures are pictures which include texture and depth, and are optimized from a patch/residual (texture) perspective. In the unpacking, the packed picture is unpacked based on the unpacking metadata.

View generation 29002 is performed to generate a view for the unpacked pictures. The view generation generates a view from a picture based on the reconstruction parameters.

View synthesis 29003 is performed to receive pictures including the generated view and generate a picture for a texture based on the target viewing position. The view synthesis generates (synthesizes) a picture based on the view synthesis parameters.

Rendering/viewport generation 29004 is performed to generate a viewport for the synthesized view, and render a picture for the texture based on the target viewport.

Display is performed to display the picture for the target viewport.

Each operation of the video reception apparatus described above may additionally use viewing position information and/or viewport information received from the encoder and/or feedback information received from the display unit.

Each operation of the video reception apparatus described above may be performed by the decoder, the unpacking unit, the view generator, the view synthesizer, the rendering/viewport generator, or the like.

According to embodiments of the present disclosure, the video transmission apparatus and the video reception apparatus provide a 3DoF+ video transmission/reception system reflecting real-time motion.

According to embodiments of the present disclosure, the video transmission method and the video reception method may reduce the load to the receiver and the latency of the receiver. Specifically, the process of view estimation and reconstruction removes inter-view redundancy. For example, 3D prediction & patch and 2D prediction & patch may be used. In addition, pictures having different textures, depths, patches, and the like for multiple viewing positions may be packed to generate a picture of an optimum or minimum size with high coding efficiency. In addition, an image optimized for the receiver may be generated. For example, a layered patch may be used, which may allow the view generation and the view synthesis to be performed simultaneously. In addition, an image for change in viewing position with a low delay may be generated. For example, MCTS may be used to group and process the same viewing direction.

Additionally, according to the embodiments of the present disclosure, the video transmission method and the video reception method may generate a multi-view 3DoF+ image. Specifically, the view synthesizer is robust to view generation errors, and thus the performance of the view synthesizer may be improved. In addition, the view synthesizer is viewport-dependent and may be integrated with the renderer to optimize the performance of the view synthesizer.

The video transmission apparatus and the video reception apparatus according to the embodiments may generate and use the following metadata.

Unpacking metadata includes configuration information about decoding. In the decoding, data is decoded, and configuration information about the configuration of a decoded picture is generated as the unpacking metadata. The unpacking metadata may include attribute information about the texture, patch, residual, depth, overlay, etc. included in the picture. The unpacking metadata may include attribute information about each part of the packed picture, information indicating a viewing position that each part of the packed picture corresponds to, and information indicating a position which each part of the packed picture corresponds to on the projected picture. The unpacking metadata may also include spatial scaling information, transformation information, and brightness scaling information for the decoded picture.

Reconstruction parameters may be used as view generation parameters. After the unpacking, the view generation is performed to combine a texture, a patch, and a residual to generate a texture or a picture including the texture. Accordingly, the reconstruction parameters may include information related to a combination of a texture, a patch, and a residual for view synthesis of pictures. In addition, since the view generation may additionally perform view estimation, the reconstruction parameters may include information related to the view estimation. Specifically, the reconstruction parameters may include information indicating the viewing position(s) whose texture and depth are used for prediction, and information indicating a method for view estimation (e.g., type information such as 3D prediction, 2D prediction, and view synthesizer). Here, the 3D prediction represents a method of re-projecting a picture in 3D space. For example, it represents a method of wrapping the picture of the viewing position B. The 2D prediction represents a method of performing motion estimation on a picture in a projection format. For example, it represents object/viewing direction-based motion estimation. The reconstruction parameters may include information indicating a method of processing the patch/residual.

View synthesis synthesizes a view of a picture including a texture and depth using a signal (or information) about each viewing position, and thus a view synthesis parameter is required. Specifically, the view synthesis parameter may include information indicating a texture and depth of a video, and information about a current video. For example, the information about the current video may represent a viewpoint and a viewing position. The view synthesis parameter may include information about a movable video. For example, it may represent available viewpoints and viewing space information. The view syntax parameter may include information for view synthesis, such as information indicating the position of the source viewing position, information indicating presence or absence of depth, information indicating the near/far range of the depth, information indicating presence or absence of a reconstructed view, information indicating a quality, information indicating a resolution, and information indicating camera parameters.

In the present disclosure, the above-described metadata may be referred to by various terms such as signaling information, first signaling information, and first information.

An encoder (transmitter) according to embodiments of the present disclosure may signal the following metadata.

For example, prediction error processing and target view prediction processing may be signaled through a target depth regeneration information SEI message. Thereby, metadata related to a method of generating a patch and/or a residual may be signaled. In addition, in relation to view estimation, there may be signaling information indicating viewing position(s) whose texture/depth is used to perform the prediction, signaling information indicating a method used to perform the view estimation (e.g., view synthesizer method, 3D prediction (3D reprojection (e.g., warping to viewing position B)), 2D prediction: motion estimation in a projection format (e.g., object/viewing direction-based motion estimation)), and the like.

For example, patch packing may be signaled through a multiview region-wise packing SEI message. Specifically, there may be signaling information indicating how the patched picture is constructed, signaling information indicating attributes of respective portions (e.g., texture, patch, residual, depth, overlay, etc.), signaling information indicating a viewing position to which each portion belongs, signaling information indicating a position of each portion in an encoded picture, and signaling information indicating spatial scaling, transformation, brightness scaling, or the like.

For example, information on the entire image may be signaled through a viewing position information SEI message or a head motion information SEI message. Specifically, there may be signaling information indicating a video texture and depth, signaling information indicating information about the current video (viewpoint, viewing position), signaling information indicating available video (available viewpoints, viewing space), signaling information indicating view synthesis parameters (source viewing position location, presence/absence of depth, depth near/far range, reconstructed view, quality, resolution, camera parameter), and signaling information indicating information specialized for view synthesis.

FIG. 30 shows metadata related to prediction error processing and target view prediction processing according to embodiments of the present disclosure.

Metadata related to prediction error processing and target view prediction processing may be signaled through texture depth regeneration information SEI message semantics.

The texture depth regeneration information SEI message provides information to enable regeneration of the texture and depth pictures for viewing positions derived from pictures of other viewing positions and partial region or information from the viewing position.

texture_depth_regeneration_info_id contains an identifying number that may be used to identify the purpose of view regeneration. The value of texture_depth_regeneration_info_id may be used to indicate the different use cases of this SEI message, to support different receiver capabilities, etc.

When more than one view regeneration information SEI message is present with the same value of view_regeneration_info_id, the content of these view regeneration information SEI messages shall be the same. When view regeneration information SEI messages are present that have more than one value of view_regeneration_info_id, this may indicate that the information indicated by the different values of view_regeneration_info_id are alternatives that are provided for different purposes, for different component (such as texture, depth, etc) or that a cascading of correction. The value of view_regeneration_info_id may be in the range of 0 to 2^12−1, inclusive.

texture_depth_regeneration_info_cancel_flag equal to 1 indicates that the texture depth regeneration information SEI message cancels the persistence of any previous texture depth regeneration information SEI message in output order that applies to the current layer. texture_depth_regeneration_info_cancel_flag equal to 0 indicates that texture depth regeneration information follows.

texture_depth_regeneration_info_persistence_flag specifies the persistence of the texture depth regeneration information SEI message for the current layer.

texture_depth_view_regeneration_info_persistence_flag equal to 0 specifies that the texture depth regeneration information applies to the current decoded picture only.

The case where picA is the current picture will be described as an example. texture_depth_regeneration_info_persistence_flag to 1 specifies that the texture depth regeneration information SEI message persists for the current layer in output order until any of the following conditions are true:

A new CLVS of the current layer begins

The bitstream ends

A picture picB in the current layer in an access unit containing a texture depth regeneration information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB. texture_depth_regeneration_info_persistence_flag to 1 specifies that the texture depth regeneration information SEI message persists for the current layer in output order until any of the following conditions are true)

A new CLVS of the current layer begins.

The bitstream ends.

A picture picB in the current layer in an access unit containing a texture depth regeneration information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

num_texture_depth_regeneration_minus1 plus 1 specifies the number of pictures which are to be regenerated by the SEI message.

regenerated_view_id specifies the identifying number of the viewing position or head position of the regeneration process. This value should be one of the pre-defined identifying number of a viewing positions of a 3DoF+ video specified in the same or in the other SEI message, such as mrwp_view_id specified in the multiview region-wise packing SEI message.

view_location_x[i], view_location_y[i] and view_location_z[i] indicates the location of a viewing position in the units of 2^−16 millimeters, respectively. The range of view_location_x[i], view_location_y[i] and view_location_z[i] shall be in the range of −32 768*2^16−1 (i.e., −2 147 483 647) to 32 768*2^16 (i.e., 2 147 483 648), inclusive.

view_rotation_yaw[i], view_rotation_pitch[i], and view_rotation_roll[i] indicate the yaw, pitch, and roll rotation angles, respectively. This information is is applied to the unit sphere of a viewing position head position related to view_location_x[i], view_location_y[i] and view_location_z[i] to convert the local coordinate axes to the global coordinate axes, in units of $2^{-16}$ degrees. The value of view_rotation_yaw[i] shall be in the range of $-180*2^{16}$ (i.e., $-11\ 796\ 480$) to $180*2^{16}-1$ (i.e., $11\ 796\ 479$), inclusive, the value of view_rotation_pitch[i] shall be in the range of $-90*2^{16}$ (i.e., $-5\ 898\ 240$) to $90*2^{16}$ (i.e., $5\ 898\ 240$), inclusive, and the value of view_rotation_roll[i] shall be in the range of $-180*2^{16}$ (i.e., $-11\ 796\ 480$) to $180*2^{16}-1$ (i.e., $11\ 796\ 479$), inclusive. view_rotation_yaw[i], view_rotation_pitch[i], and view_rotation_roll[i] could be used to indicate azimuth, elevation, and tilt, respectively.

num_components[i] specifies the number of the components that are related to the i-th view.

regenerated_component_id[i][j] specifies the identifying number of the j-th component of the i-th viewing position or head position of the regeneration process. This value should be one of the pre-defined identifying number of a component that belongs to a viewing positions of a 3DoF+ video specified in the same or in the other SEI message, such as mrwp_component_id specified in the multiview region-wise packing SEI message.

picture_width[i][j] and picture_height[i][j] specify the width and height, respectively, of the picture that is to be regenerated that is corresponding to the j-th component of the i-th viewing position or head position, in relative projected picture sample units. The values of picture width and picture_height shall both be greater than 0.

projection_type[i][j] specifies the type of the projection used in generating the projected picture from a 360 sphere. projection_type[i][j] equal to 0 indicates the type of the projection is unspecified. projection_type[i][j] equal to 1 indicates the equirectangular projection. projection_type[i][j] equal to 2 indicates the cube map projection. projection_type[i][j] from 3 to 15, inclusive, are reserved for future use.

component_type[i][j] specifies the type of the i-th component. component_type[i][j] equal to 0 indicates that the type of the component is unspecified. component_type[i][j] equal to 1 indicates the component is a video or texture component. component_type[i][j] equal to 2 indicates that the component is a depth map. component_type[i][j] equal to 3 indicates that the component is an alpha channel. When the value of a pixel is equal to 1, the value in a texture picture at the corresponding pixel location is not transparent. When the value of a pixel equals to 0, the value in a texture picture at the corresponding pixel location is transparent. component_type[i][j] equal to 4 indicates that the component is an indication map for usability indication. When the value of a pixel is equal to 1, the value in a texture or depth picture at the corresponding pixel location is used for occlusion enhancement process. When the value of a pixel is equal to 1, the value in a texture or depth picture at the corresponding pixel location is not used for occlusion enhancement process. component_type[i][j] equal to 5 indicates that the component is an overlay. component_type[i][j] from 6 to 15, inclusive, are reserved for future use.

depth_near[i] and depth far[i] specifies the minimum and maximum distances from the image plane to objects of the i-th component, in units of $2^{-16}$ degrees, respectively.

texture_depth_regeneration_info_flag[i] equal to 1 indicates the information for texture depth regeneration process of the i-th component. texture_depth_regeneration_flag[i] equal to 0 indicates that the information for texture depth regeneration process of the i-th picture is not provided.

reserved_zero_7 bits[i] shall be equal to 0 and other values for reserved_zero_7 bits[i] are reserved for future use. Decoders may ignore the value of reserved_zero_7 bits[i].

merging_flag[i] equal to 1 indicates that the information for the merging module in the texture depth generation process of the i-th component is present in this SEI message. merging_flag[i] equal to 0 indicates that the information for the merging module in the texture depth generation process of the i-th component is not present in this SEI message.

hole_filling_flag[i] equal to 1 indicates that the information for the hole filling module in the texture depth generation process of the i-th component is present in this SEI message. merging_flag[i] equal to 0 indicates that the information for the hole filling module in the texture depth generation process of the i-th component is not present in this SEI message.

crack removal flag[i] equal to 1 indicates that the information for the crack removal module in the texture depth generation process of the i-th component is present in this SEI message. crack removal flag[i] equal to 0 indicates that the information for the crack removal module in the texture depth generation process of the i-th component is not present in this SEI message.

occlusion_enh_flag[i] equal to 1 indicates that the information for the occlusion enhancement module in the texture depth generation process of the i-th component is present in this SEI message. occlusion_enh_flag[i] equal to 0 indicates that the information for the occlusion enhancement module in the texture depth generation process of the i-th component is not present in this SEI message.

reserved_zero_4 bits[i] may be equal to 0 and other values for reserved_zero_4 bits[i] may be reserved for future use. Decoders shall ignore the value of reserved_zero_4 bits[i].

num_ref_views_minus1[i] plus 1 specifies the number of reference views that are used for texture depth regeneration process.

ref_view_id[i][j] specifies the identifying number of the viewing position of the j-th reference picture that is used to estimate (to regenerate, to reconstruct, or to predict) the i-th component. This value should be one of the pre-defined identifying number of viewing positions of a 3DoF+ video specified in the same or in the other SEI message, such as mrwp_view_id specified in the multiview region-wise packing SEI message.

ref_component_id[i][j] specifies the identifying number of the j-th component of a reference viewing position or head position that is used to estimate regenerate, reconstruct, or predict the i-th component. This value should be one of the pre-defined identifying number of a component that belongs to a viewing positions of a 3DoF+ video specified in the same or in the other SEI message, such as mrwp_component_id specified in the multiview region-wise packing SEI message.

hor_min_fov[i][j], hor_max_fov[i][j], ver_min_fov[i][j], and ver_max_fov[i][j] specifies the minimum and maximum ranges of the horizontal and vertical FoV of the j-th component of a reference viewing position or head position that is used to estimate (to regenerate, to reconstruct, or to predict) the i-th component, respectively, in units of $2^{-16}$ degrees.

global_offset_x_axis[i][j], global_offset_y_axis[i][j], and global_offset_z_axis[i][j] specify the offset between the location of the j-th component of a reference view from the i-th component of a view to be regenerated, in the direction of the x, y, z-axis, in units of $2^{-16}$ meters.

num_depth_levels_minus1[i][j] plus 1 specifies the number of depth levels in the j-th component of the reference view for the regeneration of the i-th view.

num_angular_levels_minus1[i][j][k] plus 1 specifies the number of angular levels to provide angular of the k-th depth level of the j-th component of the reference view for the regeneration of the i-th view.

weight_depth_level[i][j][k][1] specifies the weight factor of the 1-th algular region of k-th depth level of a reference picture that is used to estimate (to regenerate, to reconstruct, or to predict) the j-th reference view for the i-th component. When the value of num_depth_levels_minus1[i][j] and num_angular_levels_minus1[i][j][k] are greater than zero, the pixel values of the target region is calculated by the weighted mean of the pixel values in the corresponding pixel location in the regions of the reference pictures, where the weighting value for the k-th reference picture is given by weight_depth_level [i][j][k]. When the values of num_depth_levels_minus1[i][j] and num_angular_levels_minus1[i][j][k] are equal to zero, the weight is assumed to be equal to one.

hole_filling_process_type[i] specifies the type of hole filling filter used for the texture depth regeneration process.

num_coeffs_minus1[i] specifies the number of coefficients of the hole filling process.

hole_filling_coeff[i][j] specifies the value of the filter coefficient in the units of $2^{-16}$. The value of hole_filling_coeff[i][j] shall be in the range of $-32768*2^{16}-1$ (i.e., −2147483647) to $32768*2^{16}$ (i.e., 2147483648), inclusive.

crack_removal_process_type[i] specifies the type of crack removal process used for the texture depth regeneration process.

num_coeffs_minus1[i] specifies the number of coefficients of the crack removal process.

crack_removal_process_coeff[i][j] specifies the value of the filter coefficient in the units of $2^{-16}$. The value of crack_removal_process_coeff[i][j] shall be in the range of $-32768*2^{16}-1$ (i.e., −2147483647) to $32768*2^{16}$ (i.e., 2147483648), inclusive.

num_patched_blocks[i] specifies the number of patches which are to be used for the view regeneration of the i-th component.

regenerated_picture_top_left_index_x[i][j], regenerated_picture_top_left_index_y[i][j], regenerated_picture_bottom_right_index_x[i][j], and regenerated_picture_bottom_right_index_y[i][j] specifies the (x, y) pixel location of the top-left and bottom-right corner of the j-th block of the i-th component of regenerated picture, in the units of luma samples. The values of regenerated_picture_top_left_index_x[i][j], regenerated_picture_top_left_index_y[i][j], regenerated_picture_bottom_right_index_x[i][j], and regenerated_picture_bottom_right_index_y[i][j] shall be in the range of 0 to 65 535, inclusive.

patch_view_id specifies the i-th identifying number of the viewing position or head position of the regeneration process. This value should be one of the pre-defined identifying numbers of viewing positions of a 3DoF+ video specified in the same or in the other SEI message, such as mrwp_view_id specified in the multiview region-wise packing SEI message.

patch_component_id specifies the i-th identifying number of a component of a viewing position or head position of the regeneration process. This value should be one of the pre-defined identifying numbers of a component that belongs to viewing positions of a 3DoF+ video specified in the same or in the other SEI message, such as mrwp_component_id specified in the multiview region-wise packing SEI message.

patch_top_left_index_x[i][j], patch_top_left_index_y[i][j], patch_bottom_right_index_x[i][j], and patch_bottom_right_index_y[i][j] specifies the (x, y) pixel location of the top-left and bottom-right corner of the j-th patch block for the i-th component, in the units of luma samples. The values of patch_top_left_index_x[i][j], patch_top_left_index_y[i][j], patch_bottom_right_index_x[i][j], and patch_bottom_right_index_y[i][j] shall be in the range of 0 to 65 535, inclusive.

FIGS. 31 and 32 show metadata related to patch packing according to embodiments of the present disclosure.

The metadata related to patch packing may be included in, for example, a multi-view region-wise packing SEI message.

The multiview region-wise packing SEI message provides information to enable remapping of the color samples of the cropped decoded pictures onto projected pictures as well as information on the location and size of the guard bands, if any.

multiview_regionwise_packing_id contains an identifying number that may be used to identify the purpose of the multiview region-wise packing. The value of multiview_regionwise_packing_id may be used to indicate the different use cases of this SEI message, to support different receiver capabilities, or to indicate sub-pictures which could be used to construct sphere image, panoramic image, multiview image, or multi-viewpoint image, etc.

When more than one multiview region-wise packing SEI message is present with the same value of multiview_regionwise_packing_id, the content of these multiview region-wise packing SEI messages shall be the same. When multiview regionwise packing SEI messages are present that have more than one value of multiview_regionwise_packing_id, this may indicate that the information indicated by the different values of multiview_regionwise_packing_id are alternatives that are provided for different purposes or that a cascading of correction or projection is to be applied in a sequential order (an order might be specified depending on the application). The value of multiview_regionwise_packing_id shall be in the range of 0 to $2^{12}-1$, inclusive.

multiview_regionwise_packing_cancel_flag equal to 1 indicates that the multiview region-wise packing SEI message cancels the persistence of any previous multiview region-wise packing SEI message in output order that applies to the current layer. Multiview_regionwise_packing_cancel_flag equal to 0 indicates that multiview region-wise packing information follows.

multiview_regionwise_packing_persistence_flag specifies the persistence of the multiview region-wise packing SEI message for the current layer. multiview_regionwise_packing_persistence_flag equal to 0 specifies that the camera lens information applies to the current decoded picture only. Let picA be the current picture. multiview_regionwise_packing_persistence_flag to 1 specifies that the multiview region-wise packing SEI message persists for the current layer in output order until any of the following conditions are true:—A new CLVS of the current layer begins.—The bitstream ends.—A picture picB in the current layer in an access unit containing a multiview region-wise packing SEI message that is applicable to the current layer is output for which PicOrderCnt(picB) is greater than PicOrderCnt (picA), where PicOrderCnt(picB) and PicOrderCnt(picA) are the PicOrderCntVal values of picB and picA, respectively, immediately after the invocation of the decoding process for the picture order count of picB.

constituent_picture_matching_flag equal to 1 specifies that the projected region information, packed region information, and guard band region information in this SEI message apply individually to each constituent picture and that the packed picture and the projected picture have the same stereoscopic frame packing format indicated by the frame packing arrangement SEI message. constituent_picture_matching_flag equal to 0 specifies that the projected region information, packed region information, and guard band region information in this SEI message apply to the projected picture. When StereoFlag is equal to 0, or StereoFlag is equal to 1 and frame_packing_arrangement_type is equal to 5, the value of constituent_picture_matching_flag shall be equal to 0.

packing_format_matching_between_views_flag equal to 1 specifies that the packed picture have the same packing format per viewing position or head position where the projection format is indicated by mrwp_projection_type. packing_format_matching_between_views_flag equal to 0 specifies that the different projection format is used for each viewing position.

num_view_minus1 plus 1 specifies the number of view or head position considered in the SEI message.

mrwp_view_id contains an identifying number that may be used to identify the view or head position. The value of mrwp_view_id[i] may be used to indicate the i-th view or head position. mrwp_view_id[i] could be used to indicate one or multiple regions for specific purposes, e.g., indication of sub-pictures corresponding to a head location that causes head motion parallax, or indication of sub-picture pair supporting binocular disparity of a head location, etc.

mrwp_anchor_view_flag equal to 1 indicates that the i-th view or head position with the i-th mrwp_view_id is the anchor (or center or representative) view or head position. mrwp_anchor_view_flag equal to 0 indicates that the i-th view or head position is a peripheral view or head position.

mrwp_view_independent_rotation_flag equal to 1 indicates that the rotation of the i-th view or head position is different from the rotation of the center or anchor view or head position. mrwp_view_independent_rotation_flag equal to 0 indicates that the rotation of the i-th view or head position is identical to the rotation of the center or anchor view or head position.

mrwp_all_components_in_one_packedregion_flag equal to 1 indicates that the packed regions that consist the projected picture corresponds to the i-th view or head position are packed exclusively in a rectangular region. mrwp_exclusive_packing_flag equal to 0 indicates that the packed regions that corresponds to the i-th view or head position are not packed within a rectangular region.

mrwp_reserved_zero_5 bits shall be equal to 0 and other values for mrwp_reserved_zero_5 bits[i] are reserved for future use. Decoders may ignore the value of mrwp_reserved_zero_5 bits[i].

mrwp_location_anchor_view_x[i], mrwp_location_anchor_view_y[i] and mrwp_location_anchor_view_z[i] indicate the location of head position related to mrwp_view_id[i] in units of $2^{-16}$ millimeters. The range of mrwp_location_anchor_view_x[i], mrwp_location_anchor_view[i] and mrwp_location_anchor_view_z[i] shall be in the range of $-32768*2^{16}-1$ (i.e., $-2147483647$) to $32768*2^{16}$ (i.e., 2147483648), inclusive.

mrwp_rotation_anchor_view_yaw[i], mrwp_rotation_anchor_view_pitch[i], and mrwp_rotation_anchor_view_roll[i] indicate the yaw, pitch, and roll rotation angles, respectively, that are applied to the unit sphere of head position related to mrwp_view_id[i], mrwp_location_anchor_view_x[i], mrwp_location_anchor_view[i], and mrwp_location_anchor_view_z[i] to convert the local coordinate axes to the global coordinate axes, in units of $2^{-16}$ degrees. The value of mrwp_rotation_anchor_view_yaw[i] shall be in the range of $-180*2^{16}$ (i.e., $-11796480$) to $180*2^{16}-1$ (i.e., 11796479), inclusive, the value of mrwp_rotation_anchor_view_pitch[i] shall be in the range of $-90*2^{16}$ (i.e., $-5898240$) to $90*2^{16}$ (i.e., 5898240), inclusive, and the value of mrwp_rotation_anchor_view_roll[i] shall be in the range of $-180*2^{16}$ (i.e., $-11796480$) to $180*2^{16}-1$ (i.e., 11796479), inclusive. mrwp_rotation_anchor_view_yaw[i], mrwp_rotation_anchor_view_pitch[i], and mrwp_rotation_anchor_view_roll[i] could be used to indicate azimuth, elevation, and tilt, respectively.

mrwp_location_diff_x[i], mrwp_location_diff_y[i] and mrwp_location_diff_z[i] indicate the location of the i-th view or head position relative to the location of the view or head position of the anchor view in the units of $2^{-16}$ millimeters. The (x,y,z) location of the i-th view could be calculated by adding mrwp_location_anchor_view_x[i] and mrwp_location_diff_x[i], mrwp_location_anchor_view[i] and mrwp_location_diff_y[i], and mrwp_location_anchor_view_z[i] and mrwp_location_diff_z[i], respectively. The range of mrwp_location_diff_x[i], mrwp_location_diff_y[i] and mrwp_location_diff_z[i] shall be in the range of $-32768*2^{16}-1$ (i.e., $-2147483647$) to $32768*2^{16}$ (i.e., 2147483648), inclusive.

mrwp_rotation_diff_yaw[i], mrwp_rotation_diff_pitch[i], and mrwp_rotation_diff_roll[i] indicate the yaw, pitch, and roll rotation angle of the i-th view relative to the anchor view in units of $2^{-16}$ degrees, respectively. The yaw, pitch, and roll rotation angles of the i-th view relative to the global coordinate could be calculated by adding mrwp_rotation_diff_yaw[i] and mrwp_rotation_anchor_view_yaw[i], mrwp_rotation_diff_pitch[i] and mrwp_rotation_anchor_view_pitch[i], and mrwp_rotation_diff_roll[i] and mrwp_rotation_anchor_view_roll[i], respectively. They may be applied to the unit sphere of head position related to mrwp_view_id[i], mrwp_location_anchor_view_x[i], mrwp_location_anchor_view[i], and mrwp_location_anchor_view_z[i] to convert the local coordinate axes to the global coordinate axes.

The value of mrwp_rotation_diff_yaw[i] shall be in the range of $-180*2^{16}$ (i.e., $-11796480$) to $180*2^{16}-1$ (i.e., 11796479), inclusive, the value of camera rotation diff pitch[i] shall be in the range of $-90*2^{16}$ (i.e., $-5898240$) to $90*2^{16}$ (i.e., 5898240), inclusive, and the value of mrwp_rotation_diff_roll[i] shall be in the range of $-180*2^{16}$ (i.e., $-11796480$) to $180*2^{16}-1$ (i.e., 11796479), inclusive. mrwp_rotation_diff_yaw[i], mrwp_rotation_diff_pitch[i], and mrwp_rotation_diff_roll[i] could be used to indicate azimuth, elevation, and tilt, respectively.

num_component_minus1[i] plus 1 specifies the number of components in the i-th view considered in the SEI message.

mrwp_component_id[i][j] specifies an identifying number that may be used to identify the j-th component of the i-th view.

mrwp_component_type[i][j] specifies the type of the j-th component of the i-th view. mrwp_component_type[i][j] equal to 0 indicates that the type of the component is unspecified. mrwp_component_type[i][j] equal to 1 indicates that the component is a video component mrwp_component_type[i][j] equal to 2 indicates that the component is a depth map. mrwp_component_type[i][j] equal to 3 indicates that the component is an alpha channel. mrwp_component_type[i][j] equal to 4 indicates that the component is a video component of the left-eye-view. mrwp_component_type[i][j] equal to 5 indicates that the component is a video component of the right-eye-view. mrwp_component_type[i][j] equal to 6 indicates that the component is a video component of both-eye-view. mrwp_component_type[i][j] equal to 7 indicates that the component is a residual video component of the left-eye-view. mrwp_component_type[i][j] equal to 8 indicates that the component is a residual video component of the right-eye-view. mrwp_component_type[i][j] equal to 9 indicates that the component is a residual video component of both-eye-view. mrwp_component_type[i][j] from 10 to 15, inclusive, are reserved for future use.

mrwp_projection_type[i][j] specifies the type of the projection used in generating the projected picture from a 360 sphere. mrwp_projection_type[i][j] equal to 0 indicates the type of the projection is unspecified. mrwp_projection_type[i][j] equal to 1 indicates the equirectangular projection. mrwp_projection_type[i][j] equal to 2 indicates the cube map projection. mrwp_projection_type[i][j] from 3 to 15, inclusive, are reserved for future use.

mrwp_proj_picture_width[i][j] and mrwp_proj_picture_height[i][j] specify the width and height, respectively, of the j-th component of the i-th projected picture, in relative projected picture sample units. The values of mrwp_proj_picture_width and mrwp_proj_picture_height shall both be greater than 0.

mrwp_coverage_horizontal[i][j] and mrwp_coverage_vertical[i][j] specify the horizontal and vertical ranges of the coverage of the j-th component of the i-th view or head position, in units of $2^{-16}$ degrees, respectively.

depth_near[i][j] and depth_far[i][j] specify the minimum and maximum distances from the image plane to objects of the j-th component of the i-th view or head position, in units of $2^{-16}$ degrees, respectively.

mrwp_rotation_component_diff_yaw[i][j], mrwp_rotation_component_diff_pitch[i][j], mrwp_rotation_component_diff_roll[i][j] indicate the yaw, pitch, and roll rotation angle difference of the j-th component of the i-th view relative to the reference rotation angle of the i-th view in units of $2^{-16}$ degrees, respectively. The yaw, pitch, and roll rotation angles of the j-th component of the i-th view relative to the global coordinate could be calculated by adding each difference values and the reference rotation angles, respectively. The value of mrwp_rotation_component_diff_yaw[i] shall be in the range of $-180*2^{16}$ (i.e., −11796480) to $180*2^{16}-1$ (i.e., 11796479), inclusive, the value of camera rotation component diff pitch[i] shall be in the range of $-90*2^{16}$ (i.e., −5898240) to $90*2^{16}$ (i.e., 5898240), inclusive, and the value of mrwp_rotation_component_diff_roll[i] shall be in the range of $-180*2^{16}$ (i.e., −11796480) to $180*2^{16}-1$ (i.e., 11796479), inclusive. mrwp_rotation_component_diff_yaw[i], mrwp_rotation_component_diff_pitch[i], and mrwp_rotation_component_diff_roll[i] could be used to indicate azimuth, elevation, and tilt, respectively.

mrwp_packed_region_width[i][j], mrwp_packed_region_height[i][j], mrwp_packed_region_top[i][j] and mrwp_packed_region_left[i][j] specify the width, height, top sample row, and the left-most sample column, respectively, of the j-th component of the i-th projected region in relative packed picture sample units, either within the packed picture (when constituent_picture_matching_flag is equal to 0) or within the constituent picture of the packed picture (when constituent_picture_matching_flag is equal to 1 num_packed_regions specifies the number of packed regions when constituent_picture_matching_flag is equal to 0. The value of num_packed_regions shall be greater than 0. When constituent_picture_matching_flag is equal to 1, the total number of packed regions is equal to num_packed_regions*2, and the information in each entry of the loop of num_packed_regions entries applies to each constituent picture of the projected picture and the packed picture.

packed_picture_width and packed_picture_height specify the width and height, respectively, of the packed picture, in relative packed picture sample units. The values of packed_picture_width and packed_picture_height shall both be greater than 0. It is a requirement of bitstream conformance that packed_picture_width and packed_picture_height shall have such values that packed_picture_width is an integer multiple of cropPicWidth and packed_picture_height is an integer multiple of cropPicHeight, where cropPicWidth and cropPicHeight are the width and height, respectively, of the cropped decoded picture.

num_view_id_minus1[i] plus 1 specifies the number of view indicators describing the i-th packed region. num_view_id_minus1[i] greater than 1 could represent that the i-th packed region is shared with the different views.

view_idx[i][j] specifies the j-th view indicator which describes the view information and projected picture information with regard to the i-th packed region. The value of view_idx[i][j] may be matched with one of the values of mrwp_view_id defined in the current SEI message.

num_component_id_minus1[i][j] plus 1 specifies the number of the component view indicators describing the i-th packed region. num_component_id_minus1[i][j] greater than 1 could represent that the i-th packed region is shared among the components of the j-th view.

component_idx[i][j][k] specifies the k-th component indicator of the j-th view which describes the component type, projection type and the size of the projected picture with regard to the i-th packed region. The value of component_idx[i][j][k] may be matched with one of the values of mrwp_component_id defined in the current SEI message.

proj_region_width[i][j][k], proj_region_height[i][j][k], proj_region_top[i][j][k] and proj_region_left[i][j][k] specify the width, height, top sample row, and the left-most sample column, respectively, of the i-th projected region, either within the projected picture (when constituent_picture_matching_flag is equal to 0) or within the constituent picture of the projected picture (when constituent_picture_matching_flag is equal to 1). For this extension, the projected picture represents the projected picture of the component of the viewing position indicated by component_idx and view_idx. proj_region_width[i][j][k], proj_region_height[i][j][k], proj_region_top[i][j][k], and proj_region_left[i][j][k] are indicated in relative projected picture sample units.

NOTE 1—Two projected regions may partially or entirely overlap with each other.

rwp_reserved_zero_4 bits[i] be equal to 0 in bitstreams conforming to this version of this Specification. Other values for rwp_reserved_zero_4 bits[i] are reserved for future use by ITU-T|ISO/IEC. Decoders shall ignore the value of rwp_reserved_zero_4 bits[i].

rwp_transform_type[i] specifies the rotation and mirroring to be applied to the i-th packed region to remap to the i-th projected region. When rwp_transform_type[i] specifies both rotation and mirroring, rotation applies before mirroring. The values of rwp_transform_type[i] are specified as follows. rwp_transform_type[i] equal to 0 indicates that no transformation is used for the i-th packed region rwp_transform_type[i] equal to 1 indicates mirroring horizontally for the i-th packed region rwp_transform_type[i] equal to 2 indicates rotation by 180 degrees (anticlockwise) for the i-th packed region rwp_transform_type[i] equal to 3 indicates rotation by 180 degrees (anticlockwise) after mirroring horizontally for the i-th packed region rwp_transform_type[i] equal to 4 indicates rotation by 90 degrees (anticlockwise) before mirroring horizontally for the i-th packed region rwp_transform_type[i] equal to 5 indicates rotation by 90 degrees (anticlockwise) for the i-th packed region rwp_transform_type[i] equal to 6 indicates rotation by 270 degrees (anticlockwise) before mirroring horizontally for the i-th packed region rwp_transform_type[i] equal to 7 indicates rotation by 270 degrees (anticlockwise) for the i-th packed region.

rwp_guard_band_flag[i] equal to 0 specifies that the i-th packed region does not have a guard band. rwp_guard_band_flag[i] equal to 1 specifies that the i-th packed region has a guard band.

packed_region_width[i], packed_region_height[i], packed_region_top[i], and packed_region_left[i] specify the width, height, the top luma sample row, and the left-most luma sample column, respectively, of the packed region, either within the region-wise packed picture (when constituent_picture_matching_flag is equal to 0) or within each constituent picture of the region-wise packed picture (when constituent_picture_matching_flag is equal to 1). packed_region_width[i], packed_region_height[i], packed_region_top[i], and packed_region_left[i] are indicated in relative region-wise packed picture sample units. packed_region_width[i], packed_region_height[i], packed_region_top[i], and packed_region_left[i] shall represent integer horizontal and vertical coordinates of luma sample units within the cropped decoded pictures.

NOTE 2—Two packed regions may partially or entirely overlap with each other.

rwp_left_guard_band_width[i] specifies the width of the guard band on the left side of the i-th packed region in relative region-wise packed picture sample units. When chroma_format_idc is equal to 1 (4:2:0 chroma format) or 2 (4:2:2 chroma format), rwp_left_guard_band_width[i] may correspond to an even number of luma samples within the cropped decoded picture.

rwp_right_guard_band_width[i] specifies the width of the guard band on the right side of the i-th packed region in relative region-wise packed picture sample units. When chroma_format_idc is equal to 1 (4:2:0 chroma format) or 2 (4:2:2 chroma format), rwp_right_guard_band_width[i] may correspond to an even number of luma samples within the cropped decoded picture.

rwp_top_guard_band_height[i] specifies the height of the guard band above the i-th packed region in relative region-wise packed picture sample units. When chroma_format_idc is equal to 1 (4:2:0 chroma format), rwp_top_guard_band_height[i] shall correspond to an even number of luma samples within the cropped decoded picture.

rwp_bottom_guard_band_height[i] specifies the height of the guard band below the i-th packed region in relative region-wise packed picture sample units. When chroma_format_idc is equal to 1 (4:2:0 chroma format), rwp_bottom_guard_band_height[i] shall correspond to an even number of luma samples within the cropped decoded picture. When rwp_guard_band_flag[i] is equal to 1, rwp_left_guard_band_width[i], rwp_right_guard_band_width[i], rwp_top_guard_band_height[i], or rwp_bottom_guard_band_height[i] shall be greater than 0. The i-th packed region as specified by this SEI message shall not overlap with any other packed region specified by the same SEI message or any guard band specified by the same SEI message.

The guard bands associated with the i-th packed region, if any, as specified by this SEI message shall not overlap with any packed region specified by the same SEI message or any other guard bands specified by the same SEI message.

rwp_guard_band_not_used_for_pred_flag[i] equal to 0 specifies that the guard bands may or may not be used in the inter prediction process. rwp_guard_band_not_used_for_pred_flag[i] equal to 1 specifies that the sample values of the guard bands are not used in the inter prediction process.

NOTE 3—When rwp_guard_band_not_used_for_pred_flag[i] is equal to 1, the sample values within guard bands in cropped decoded pictures may be rewritten even if the cropped decoded pictures were used as references for inter prediction of subsequent pictures to be decoded. For example, the content of a packed region may be seamlessly expanded to its guard band with decoded and re-projected samples of another packed region.

rwp_guard_band_type[i][j] indicates the type of the guard bands for the i-th packed region as follows, with j equal to 0, 1, 2, or 3 indicating that the semantics below apply to the left, right, top, or bottom edge, respectively, of the packed region. rwp_guard_band_type[i][j] equal to 0 indicates that the content of the guard bands in relation to the content of the packed regions is unspecified. When rwp_guard_band_not_used_for_pred_flag[i] is equal to 0, rwp_guard_band_type[i][j] shall not be equal to 0. rwp_guard_band_type[i][j] equal to 1 indicates that the content of the guard bands suffices for interpolation of sample values at sub-pel sample fractional locations within the packed region and less than one sample outside of the boundary of the packed region. NOTE 4 rwp_guard_band_type[i][j] equal to 1 can be used when the boundary samples of a packed region have been copied horizontally or vertically to the guard band.

rwp_guard_band_type[i][j] equal to 2 indicates that the content of the guard bands represents actual picture content that is spherically adjacent to the content in the packed region and is on the surface of the packed region at a quality that gradually changes from the picture quality of the packed region to that of the spherically adjacent packed region.

rwp_guard_band_type[i][j] equal to 3 indicates that the content of the guard bands represents actual picture content that is spherically adjacent to the content in the packed region and is on the surface of the packed region at a similar picture quality as within the packed region.

rwp_guard_band_type[i][j] values greater than 3 are reserved for future use by ITU-T ISO/IEC. Decoders shall treat the value of rwp_guard_band_type[i][j] when the value is greater than 3 as equivalent to the value 0.

shall be equal to 0 in bitstreams conforming to this version of this Specification. Other values for rwp_guard_band_reserved_zero_3 bits[i] are reserved for future use by ITU-T ISO/IEC. Decoders shall ignore the value of rwp_guard_band_reserved_zero_3 bits[i].

The variables NumPackedRegions, PackedRegionLeft[n], PackedRegionTop[n], PackedRegionWidth[n], PackedRegionHeight[n], ProjRegionLeft[n], ProjRegionTop[n], ProjRegionWidth[n], ProjRegionHeight[n], and TransformType[n] are derived as follows.

For n in the range of 0 to num_packed_regions−1, inclusive, the following applies: PackedRegionLeft[n] is set equal to packed_region_left[n]. PackedRegionTop[n] is set equal to packed_region_top[n]. PackedRegionWidth[n] is set equal to packed_region_width[n]. PackedRegionHeight[n] is set equal to packed_region_height[n]. ProjRegionLeft[n] is set equal to proj_region_left[n]. ProjRegionTop[n] is set equal to proj_region_top[n]. ProjRegionWidth[n] is set equal to proj_region_width[n]. ProjRegionHeight[n] is set equal to proj_region_height[n]. TransformType[n] is set equal to rwp_transform_type[n].

If constituent_picture_matching_flag is equal to 0, the following applies: NumPackedRegions is set equal to num_packed_regions.

Otherwise (constituent_picture_matching_flag is equal to 1), the following applies: NumPackedRegions is set equal to 2*num_packed_regions. When TopBottomFlag is equal to 1, the following applies: projLeftOffset and packedLeftOffset are both set equal to 0. projTopOffset is set equal to proj_picture_height/2 and packedTopOffset is set equal to packed_picture_height/2. When SideBySideFlag is equal to 1, the following applies: projLeftOffset is set equal to proj_picture_width/2 and packedLeftOffset is set equal to packed_picture_width/2. projTopOffset and packedTopOffset are both set equal to 0. For n in the range of NumPackedRegions/2 to NumPackedRegions−1, inclusive, the following applies: nIdx is set equal to n−NumPackedRegions/2. PackedRegionLeft[n] is set equal to packed_region_left[nIdx]+packedLeftOffset. PackedRegionTop[n] is set equal to packed_region_top[nIdx]+packedTopOffset. PackedRegionWidth[n] is set equal to packed_region_width[nIdx]. PackedRegionHeight[n] is set equal to packed_region_height[nIdx]. ProjRegionLeft[n] is set equal to proj_region_left[nIdx]+projLeftOffset. ProjRegionTop[n] is set equal to proj_region_top[nIdx]+projTopOffset. ProjRegionWidth[n] is set equal to proj_region_width[nIdx]. ProjRegionHeight[n] is set equal to proj_region_height[nIdx]. TransformType[n] is set equal to rwp_transform_type[nIdx].

For each value of n in the range of 0 to NumPackedRegions−1, inclusive, the values of ProjRegionWidth[n], ProjRegionHeight[n], ProjRegionTop[n], and ProjRegionLeft[n] are constrained as follows: ProjRegionWidth[n] shall be in the range of 1 to proj_picture_width, inclusive. ProjRegionHeight[n] shall be in the range of 1 to proj_picture_height, inclusive. ProjRegionLeft[n] shall be in the range of 0 to proj_picture_width−1, inclusive. ProjRegionTop[n] shall be in the range of 0 to proj_picture_height−1, inclusive. If ProjRegionTop[n] is less than proj_picture_height/VerDiv1, the sum of ProjRegionTop[n] and ProjRegionHeight[n] shall be less than or equal to proj_picture_height/VerDiv1. Otherwise, the sum of ProjRegionTop[n] and ProjRegionHeight[n] shall be less than or equal to proj_picture_height/VerDiv1*2.

For each value of n in the range of 0 to NumPackedRegions−1, inclusive, the values of PackedRegionWidth[n], PackedRegionHeight[n], PackedRegionTop[n], and PackedRegionLeft[n] are constrained as follows: PackedRegionWidth[n] shall be in the range of 1 to packed_picture_width, inclusive. ProjRegionHeight[n] shall be in the range of 1 to packed_picture_height, inclusive. PackedRegionLeft[n] shall be in the range of 0 to packed_picture_width−1, inclusive. PackedRegionTop[n] shall be in the range of 0 to packed_picture_height−1, inclusive. If PackedRegionLeft[n] is less than packed_picture_width/HorDiv1, the sum of PackedRegionLeft[n] and PackedRegionWidth[n] shall be less than or equal to packed_picture_width/HorDiv1. Otherwise, the sum of PackedRegionLeft[n] and PackedRegionWidth[n] shall be less than or equal to packed_picture_width/HorDiv1*2. If PackedRegionTop[n] is less than packed_picture_height/VerDiv1, the sum of PackedRegionTop[n] and PackedRegionHeight[n] shall be less than or equal to packed_picture_height/VerDiv1. Otherwise, the sum of PackedRegionTop[n] and PackedRegionHeight[n] shall be less than or equal to packed_picture_height/VerDiv1*2. When chroma_format_idc is equal to 1 (4:2:0 chroma format) or 2 (4:2:2 chroma format), PackedRegionLeft[n] shall correspond to an even horizontal coordinate value of luma sample units, and PackedRegionWidth[n] shall correspond to an even number of luma samples, both within the decoded picture. When the chroma_format_idc is equal to 1 (4:2:0 chroma format), PackedRegionTop[n] shall correspond to an even vertical coordinate value of luma sample units, and ProjRegionHeight[n] shall correspond to an even number of luma samples, both within the decoded picture.

FIG. 33 shows metadata for an entire image according to embodiments of the present disclosure.

Metadata for the entire image may be included in, for example, a viewing position information SEI message or a head motion information SEI message.

The viewing position information SEI message is specified as follows.

The viewing position information SEI message provides information of the viewing position and/or corresponding adjacent viewing positions of the current video corresponding to a viewpoint.

viewing_position_info_id contains an identifying number that may be used to identify the purpose of the viewing position information. The value of viewing_position_info_id may be used to indicate the different use cases of this SEI message, to support different receiver capabilities, or to indicate different level of information contained in the SEI message, or different viewpoint, etc.

When more than one viewing position information SEI message is present with the same value of viewing_posidion_info_id, the content of these viewing position information SEI messages shall be the same. When viewing position information SEI messages are present that have more than one value of viewing_position_info_id, this may indicate that the information indicated by the different values of viewing_posidion_info_id are alternatives that are provided for different purposes or that a cascading of correction to be applied in a sequential order (an order might be specified depending on the application). The value of viewing_posidion_info_id shall be in the range of 0 to 2^12−1, inclusive.

viewing_position_info_cancel_flag equal to 1 indicates that the viewing position information SEI message cancels the persistence of any previous viewing position information SEI message in output order that applies to the current layer. viewing_position_info_cancel_flag equal to 0 indicates that viewing position information follows.

viewing_position_info_persistence_flag specifies the persistence of the viewing position information SEI message for the current layer. viewing_position_info_persistence_flag equal to 0 specifies that the viewing position information applies to the current decoded picture only.

Let picA be the current picture. viewing_position_info_persistence_flag to 1 specifies that the viewing position information SEI message persists for the current layer in output order until any of the following conditions are true:—A new CLVS of the current layer begins.—The bitstream ends.—A picture picB in the current layer in an access unit containing a viewing position information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

anchor_viewing_position_flag equal to 1 indicates that the corresponding decoded picture is the anchor (or center or representative) viewing position which could be assumed (0,0,0) in XYZ coordinate or explicitly given by anchor_viewing_position x, anchor_viewing_position_y and anchor_viewing_position z. anchor_viewing_position_flag equal to 0 indicates that the corresponding decoded picture is peripheral or side or non-anchor viewing position and the location, orientation, and coverage information of the anchor viewing position is given by anchor_viewing_position x, anchor_viewing_position_y and anchor_viewing_position_z)

viewing_position_x, viewing_position_y, and viewing_position_z indicate the (x,y,z) location of viewing position corresponding to the decoded picture in the units of $2^{-16}$ millimeters, respectively The range of viewing_position_x, viewing_position_y and viewing_position_z shall be in the range of $-32768*2^{16}-1$ (i.e., $-2147483647$) to $32768*2^{16}$ (i.e., 2147483648), inclusive.

The value of viewing_position_x, viewing_position_y and viewing_position_z could be represented by absolute position in the XYZ coordinate or relative position corresponding to the anchor location.

viewing_orientation_yaw, viewing_orientation_pitch, and viewing_orientation_roll indicate the yaw, pitch, and roll orientation angles in units of $2^{-16}$ degrees, respectively. The value of viewing_orientation_yaw shall be in the range of $-180*2^{16}$ (i.e., $-11796480$) to $180*2^{16}-1$ (i.e., 11796479), inclusive, the value of viewing_orientation_pitch shall be in the range of $-90*2^{16}$ (i.e., $-5898240$) to $90*2^{16}$ (i.e., 5898240), inclusive, and the value of viewing_orientation_roll shall be in the range of $-180*2^{16}$ (i.e., $-11796480$) to $180*2^{16}-1$ (i.e., 11796479), inclusive.

Depending on the applications, viewing_orientation_yaw, viewing_orientation_pitch, and viewing_orientation_roll could be used to indicate azimuth, elevation, and tilt, respectively. Also, viewing_orientation_yaw, viewing_orientation_pitch, and viewing_orientation_roll could represent the rotation that is applied to the unit sphere of head position corresponding to the decoded picture to convert the local coordinate axes to the global coordinate axes, respectively.

coverage_horizontal and coverage_vertical specifies the horizontal and vertical ranges of the coverage of the viewing position corresponding to the decoded picture, in units of $2^{-16}$ degrees, respectively.

anchor_viewing_position_x, anchor_viewing_position_y and anchor_viewing_position_z indicate the (x,y,z) location of anchor viewing position of a viewing position set corresponding to the decoded picture, in the units of $2^{-16}$ millimeters, respectively The range of anchor_viewing_position_x, anchor_viewing_position_y and anchor_viewing_position_z shall be in the range of $-32768*2^{16}-1$ (i.e., $-2147483647$) to $32768*2^{16}$ (i.e., 2147483648), inclusive.

In some cases, anchor_viewing_position_x, anchor_viewing_position_y and anchor_viewing_position_z could be assumed to be (0, 0, 0) so that the location of other viewing positions in the same viewing position set could be represented as the position relative to the anchor viewing position.

In some applications, anchor_viewing_position_x, anchor_viewing_position_y and anchor_viewing_position_z could be used to indicate the viewpoint.

anchor viewing_orientation_yaw, anchor viewing_orientation_pitch, and anchor viewing_orientation_roll indicate the yaw, pitch, and roll orientation angles of the sphere representing anchor viewing position in units of $2^{-16}$ degrees, respectively. The value of anchor viewing_orientation_yaw shall be in the range of $-180*2^{16}$ (i.e., $-11796480$) to $180*2^{16}-1$ (i.e., 11796479), inclusive, the value of anchor viewing_orientation_pitch shall be in the range of $-90*2^{16}$ (i.e., $-5898240$) to $90*2^{16}$ (i.e., 5898240), inclusive, and the value of anchor viewing_orientation_roll shall be in the range of $-180*2^{16}$ (i.e., $-11796480$) to $180*2^{16}-1$ (i.e., 11796479), inclusive.

Depending on the applications, anchor_viewing_orientation_yaw, anchor_viewing_orientation_pitch, and anchor_viewing_orientation_roll could be used to indicate azimuth, elevation, and tilt, respectively. Also, anchor_viewing_orientation_yaw, anchor_viewing_orientation_pitch, and anchor_viewing_orientation_roll could represent the rotation that is applied to the unit sphere of the anchor viewing position to convert the local coordinate axes to the global coordinate axes, respectively.

anchor_coverage_horizontal and anchor coverage vertical specify the horizontal and vertical ranges of the coverage of the anchor viewing position, in units of $2^{-16}$ degrees, respectively.

num_viewing_positions specifies the number of viewing positions related to the current viewing position.

set_viewing_position_x, set_viewing_position_y and set_viewing_position_z indicate the i-th XYZ coordinate location of the adjacent or all viewing positions in the viewing position set corresponding to the decoded picture, in the units of $2^{-16}$ millimeters, respectively. The range of set_viewing_position_x, set_viewing_position_y and set_viewing_position_z shall be in the range of $-32768*2^{16}-1$ (i.e., $-2147483647$) to $32768*2^{16}$ (i.e., 2147483648), inclusive.

The value of set_viewing_position_x, set_viewing_position_y and set_viewing_position_z could be represented by absolute position in the XYZ coordinate or relative position corresponding to the anchor location, which shall be aligned with the representation of viewing_position_x, viewing_position_y and viewing_position_z.

set_viewing_orientation_yaw, set_viewing_orientation_pitch, and set_viewing_orientation_roll indicate the yaw, pitch, and roll orientation angles, respectively, of the i-th viewing position in a viewing position set corresponding to the decoded picture, in units of $2^{-16}$ degrees. The value of set_viewing_orientation_yaw shall be in the range of $-180*2^{16}$ (i.e., $-11796480$) to $180*2^{16}-1$ (i.e., 11796479), inclusive, the value of set_viewing_orientation_pitch shall be in the range of $-90*2^{16}$ (i.e., $-5898240$) to $90*2^{16}$ (i.e., 5898240), inclusive, and the value of set_viewing_orientation_roll shall be in the range of $-180*2^{16}$ (i.e., $-11796480$) to $180*2^{16}-1$ (i.e., 11796479), inclusive.

Depending on the applications, set_viewing_orientation_yaw, set_viewing_orientation_pitch, and set_viewing_orientation_roll could be used to indicate azimuth, elevation, and tilt, respectively. Also, set_viewing_orientation_yaw, set_viewing_orientation_pitch, and set_viewing_orientation_roll could represent the rotation that is applied to the unit sphere of the i-th viewing position in a viewing position set corresponding to the decoded picture to convert the local coordinate axes to the global coordinate axes, respectively.

set_coverage_horizontal and set_coverage_vertical specifies the horizontal and vertical ranges of the coverage of the i-th viewing position in a viewing position set corresponding to the decoded picture, in units of $2^{-16}$ degrees, respectively.

FIG. 34 shows metadata for an entire image according to embodiments of the present disclosure.

The head motion information SEI message is specified as follows.

The head motion information SEI message provides information of the head motion boundary of the current video corresponding to a viewpoint, where head motion boundary or viewing space represent the 3D space of viewing positions within which rendering of image and video is enabled and VR experience is valid. In the receiver, a viewport could be generated by a decoded picture of a viewing position or a synthesized/reconstructed picture for an intermediate viewing position.

It is meaningful to define the range of the intermediate views according to the conditions of capture, and typically to define the intermediate views range.

head_motion_info_id contains an identifying number that may be used to identify the purpose of the viewing position information. The value of head_motion_info_id may be used to indicate the different use cases of this SEI message, to support different receiver capabilities, or to indicate different level of information contained in the SEI message, or different viewpoint, etc.

When more than one head motion information SEI message is present with the same value of head_motion_info_id, the content of these head motion information SEI messages shall be the same. When head position information SEI messages are present that have more than one value of head_motion_info_id, this may indicate that the information indicated by the different values of head_motion_info_id are alternatives that are provided for different purposes or that a cascading of correction to be applied in a sequential order (an order might be specified depending on the application). The value of head_position_info_id shall be in the range of 0 to $2^{12}-1$, inclusive.

head_motion_info_cancel_flag equal to 1 indicates that the head motion information SEI message cancels the persistence of any previous head position information SEI message in output order that applies to the current layer. head_motion_info_cancel_flag equal to 0 indicates that head motion information follows.

head_motion_info_persistence_flag specifies the persistence of the head motion information SEI message for the current layer. head_motion_info_persistence_flag equal to 0 specifies that the head motion information applies to the current decoded picture only.

Let picA be the current picture. head_motion_info_persistence_flag to 1 specifies that the head motion information SEI message persists for the current layer in output order until any of the following conditions are true:

A new CLVS of the current layer begins. The bitstream ends. A picture picB in the current layer in an access unit containing a head motion information SEI message that is applicable to the current layer is output for which PicOrderCnt(picB) is greater than PicOrderCnt(picA), where PicOrderCnt(picB) and PicOrderCnt(picA) are the PicOrderCntVal values of picB and picA, respectively, immediately after the invocation of the decoding process for the picture order count of picB.

num_nested_boundaries_minus1 indicates the number of nesting shapes of head motion boundary. When num_nested_boundaries_minus1 is greater than 1, the head motion boundaries shall be informed in the descending order of the ranges, i.e., from the outermost boundary to the innermost boundary.

head_motion_boundary_center_present_flag equal to 1 indicates that the center location of the i-th head motion boundary is present in the SEI message. head_motion_boundary_center_present_flag equal to 0 indicates that the center location of the i-th head motion boundary is not present in the SEI message. Depending on the applications, head_motion_boundary_center_present_flag equal to 0 could indicate that the center of the i-th head motion boundary is identical to the center of the anchor viewing position or (0,0,0) in XYZ coordinate.

When num_nested_boundaries_minus1 is greater than 1, head_motion_boundary_center_present_flag equal to 0 could indicate that the center of the i-th head motion boundary is identical to the center of the outermost boundary, i.e., the center of the 0-th head motion boundary. head_motion_boundary_rotation_flag equal to 1 indicates that the yaw, pitch, and roll rotation of the i-th head motion boundary is present in the SEI message. head_motion_boundary_rotation_flag equal to 0 indicates that the yaw, pitch, and roll rotation of the i-th head motion boundary is not present in the SEI message. Depending on the applications, head_motion_boundary_rotation_flag equal to 0 could indicate that the yaw, pitch, and roll rotation of the i-th head motion boundary is (0, 0, 0) or identical to the rotation of the rotation of anchor viewing position.

When num_nested_boundaries_minus1 is greater than 1, head_motion_boundary_rotation_flag equal to 0 could indicate that the yaw, pitch, and roll rotation of the i-th head motion boundary is identical to the yaw, pitch, and roll of the outermost boundary, i.e., the yaw, pitch, and roll of the 0-th head motion boundary, respectively.

head_motion_boundary_asymmetric_flag equal to 1 indicate that the shape of the i-th head motion boundary is not symmetric in terms of the center. head_motion_boundary_asymmetric_flag equal to 0 indicate that the shape of the i-th head motion boundary is symmetric in terms of the center.

head_motion_boundary_type specifies the shape type of the head motion boundary. head_motion_boundary_type equal to 0 indicates undefined. head_motion_boundary_type equal to 1 indicates the sphere. head_motion_boundary_type equal to 2 indicates the paraboloid shape. head_motion_boundary_type equal to 3 indicates the cube. head_motion_boundary_type equal to 4 indicates the rectangular prism. head_motion_boundary_type equal to 5 indicates the spheroid. head_motion_boundary_type equal to 6 indicates the tri-axial ellipsoid. head_motion_boundary_type equal to 15 indicates a shape defined by vertexes. Other values of head_motion_boundary_type is preserved for future use.

indicate the minimum and maximum radius of the head motion boundary from the center of the boundary. When head_motion_boundary_type not equal to 1, head_motion_boundary_radius_min and head_motion_boundary_radius_max could provide approximated boundary.

head_motion_boundary_center_x, head_motion_boundary_center_y and head_motion_boundary_center_z indicate the (x,y,z) location of center of the i-th head motion boundary of the viewing position corresponding to the decoded picture in the units of $2^{-16}$ millimeters, respectively. The head_motion_boundary_x, head_motion_boundary_y and head_motion_boundary_z shall be in the range of $-32768*2^{16}-1$ (i.e., −2147483647) to $32768*2^{16}$ (i.e., 2147483648), inclusive.

head_motion_boundary_rotation_yaw, head_motion_boundary_rotation_pitch, and head_motion_boundary_rotation_roll indicate the yaw, pitch, and roll rotation angles of the i-th head motion boundary shape in units of $2^{-16}$ degrees, respectively. The value of head_motion_boundary_rotation_yaw shall be in the range of $-180*2^{16}$ (i.e., −11796480) to $180*2^{16}-1$ (i.e., 11796479), inclusive, the value of head_motion_boundary_rotation_pitch shall be in the range of −90*2^16 (i.e., −5898240) to 90*2^16 (i.e., 5898240), inclusive, and the value of head_motion_boundary_rotation_roll shall be in the range of −180*2^16 (i.e., −11796480) to 180*2^16−1 (i.e., 11796479), inclusive.

Depending on the applications, head_motion_boundary_rotation_yaw, head_motion_boundary_rotation_pitch, and head_motion_boundary_rotation_roll could be used to indicate azimuth, elevation, and tilt, respectively. Also, head_motion_boundary_rotation_yaw, head_motion_boundary_rotation_pitch, and head_motion_boundary_rotation_roll could represent the orientation.

head_motion_boundary radius indicates the radius of the i-th head_motion_boundary. The radius indicates the distance from the center to the outermost boundary. The range of head_motion_boundary_radius shall be in the range of 0 to to 65 536*2^16−1 (i.e., 4 294 967 295), inclusive.

head_motion_boundary_param_alpha, head_motion_boundary_param_beta, and head_motion_boundary_z_max specify the parameter values of paraboloid shape of the i-th head motion boundary. The ranges of head_motion_boundary_param_alpha, head_motion_boundary_param_beta, and head_motion_boundary_z_max shall be in the range of 0 to to 65 536*2^16−1 (i.e., 4 294 967 295), inclusive.

head_motion_boundary_positive_x_axis, head_motion_boundary_negative_x_axis, head_motion_boundary_positive_y_axis, head_motion_boundary_negative_y_axis, head_motion_boundary_positive_z_axis, and head_motion_boundary_negative_z_axis indicate the range of the head_motion_boundary in the directions of x, y, and z axis of positive and negative directions in units of 2^−16 millimeters, respectively, where the XYZ axises are local coordinated rotated in the amount of head_motion_boundary_rotation_yaw, head_motion_boundary_rotation_pitch, and head_motion_boundary_rotation_roll for yaw, pitch, and roll, respectively. The value of head_motion_boundary_positive_x_axis, head_motion_boundary_negative_x_axis, head_motion_boundary_positive_y_axis, head_motion_boundary_negative_y_axis, head_motion_boundary_positive_z_axis, and head_motion_boundary_negative_z_axis shall be in the range of 0 to 65 536*2^16−1 (i.e., 4 294 967 295), inclusive.

head_motion_boundary_param_a, head_motion_boundary_param_b, and head_motion_boundary_param_c specify the parameter values of the i-th head_motion_boundary of spheroid or tri-axis ellipsoid shape. The ranges of head_motion_boundary_param_a, head_motion_boundary_param_b, and head_motion_boundary_param_c shall be in the range of 0 to 65 536*2^16−1 (i.e., 4 294 967 295), inclusive.

head_motion_boundary_symmetry_axis specifies the axis that the spheroid is symmetric when the center is (0,0,0). When head_motion_boundary_symmetry_axis equal to 0, the symmetry axis is indicated as x axis when the center is (0,0,0). When head_motion_boundary_symmetry_axis equal to 1, the symmetry axis is indicated as y axis when the center is (0,0,0). When head_motion_boundary_symmetry_axis equal to 2, the symmetry axis is indicated as z axis when the center is (0,0,0). The other values of head_motion_boundary_symmetry_axis are reserved.

num_boundary_vertex_minus4 plus 4 specifies the number of vertexes that describes the head_motion_boundary.

boundary_vertex_x, boundary_vertex_y, and boundary_vertex_z specifies the location of a vertex that describes the head_motion_boundary in XYZ coordinate in the units of 2^−16 millimeters, respectively. The boundary_vertex_x, boundary_vertex_y, and boundary_vertex_z shall be in the range of −32768*2^16−1 (i.e., −2147483647) to 32768*2^16 (i.e., 2147483648), inclusive. In some applications, the vertexes could be a subset of the viewing positions belongs to a viewpoint.

Figure 35:
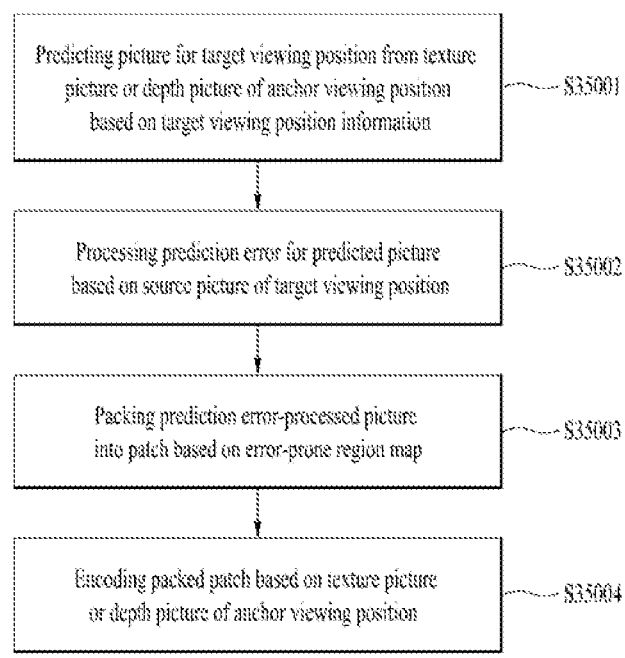
FIG. 35 shows a video transmission method according to embodiments of the present disclosure.

FIG. 35 shows a video transmission method according to embodiments of the present disclosure.

The video transmission method according to the embodiments includes S35001 predicting a picture for a target viewing position from a texture picture or a depth picture of an anchor viewing position based on target viewing position information; S35002 processing a prediction error for the predicted picture based on a source picture of the target viewing position; S35003 packing the prediction error-processed picture into a patch based on an error-prone region map; and/or S35004 encoding the packed patch based on the texture picture or the depth picture of the anchor viewing position.

Regarding operation S35001, the video transmission apparatus according to the embodiments, for example, a target view prediction processor or a target view prediction controller, predicts a picture for the target viewing position from the texture picture or the depth picture of the anchor viewing position based on the target viewing position information. The specific procedure is described above with reference to FIG. 22. Target view prediction may be additionally performed as described above with reference to FIG. 23.

Regarding operation S35002, the video transmission apparatus, for example, a prediction error processor or a prediction error controller, processes the prediction error for the predicted picture based on the source picture of the target viewing position. The specific procedure is described above with reference to FIG. 22. Prediction error processing may be additionally performed as described above with reference to FIGS. 24 and 25.

Regarding operation S35003, the video transmission apparatus, for example, a patch packing processor or a patch packing controller, patch-packs the prediction error-processed picture based on the error-prone region map. The specific procedure is described above with reference to FIG. 22. Patch packing processing may be additionally performed as described above with reference to FIG. 26.

Regarding operation S35004, the video transmission apparatus, for example, an encoder, encodes the packed patch based on the texture picture or the depth picture of the anchor viewing position. The specific procedure is described above with reference to FIG. 22.

A video reception method according to embodiments may follow the reverse process of the video transmission method according to the embodiments.

Each part, module, or unit described above may be software, a processor, or a hardware part that executes successive procedures stored in a memory (or storage unit). The respective operations described in the embodiments above may be performed by software, processors or hardware parts. Each module/block/unit described in the examples above may operate as a processor, software, or hardware. In addition, the above-mentioned methods of the present disclosure may be realized by code. The code may be written in a recoding medium readable by a processor so that the code may be read by the processor provided by the apparatus.

Although the description of the present disclosure is explained with reference to each of the accompanying drawings for clarity, it is possible to design new examples by merging the examples shown in the accompanying drawings with each other. If a recording medium readable by a computer, in which programs for executing the examples mentioned in the foregoing description are recorded, is designed by those skilled in the art, it may fall within the scope of the appended claims and their equivalents.

The apparatuses and methods according to the present disclosure may be non-limited by the configurations and methods of the examples mentioned in the foregoing description. The examples mentioned in the foregoing description may be configured in a manner of being selectively combined with one another entirely or in part to enable various modifications.

In addition, a method according to the present disclosure may be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like and also include carrier-wave type implementation such as a transmission via Internet. Furthermore, as the processor-readable recording medium is distributed to a computer system connected via a network, processor-readable code may be saved and executed in a distributed manner.

Although the disclosure has been described with reference to the exemplary examples, those skilled in the art will appreciate that various modifications and variations may be made in the present disclosure without departing from the spirit or scope of the disclosure described in the appended claims. Such modifications are not to be understood individually from the technical idea or viewpoint of the present disclosure It will be appreciated by those skilled in the art that various modifications and variations may be made in the present disclosure without departing from the spirit or scope of the disclosures. Thus, it is intended that the present disclosure covers the modifications and variations of this disclosure provided they come within the scope of the appended claims and their equivalents.

In the present disclosure, both an apparatus disclosure and a method disclosure are mentioned, and the descriptions of both the apparatus and method disclosures may be applied to complement each other.

In this document, the term "I" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Various examples have been described in the best mode for carrying out the disclosure.

The present disclosure is used in a series of VR related fields.

It will be apparent to those skilled in the art that various modifications and variations may be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A video transmission apparatus comprising:
a packer configured to pack a picture for views;
an encoder configured to encode the picture; and
a transmitter configured to transmit a bitstream including the picture,
wherein the views are represented based on view parameters of the bitstream,
wherein the bitstream further includes packing information,
wherein the picture includes one or more regions and the packing information includes width information related to the one or more regions and height information related to the one or more regions,
wherein the picture is encoded based on a prediction mode, and
wherein the encoder is further configured to:
distinguish the picture based on at least one of target viewing position information, a depth of an anchor viewing position, or a depth of a target viewing position,
predict the picture, and
integrate the picture for the target viewing position.

2. The apparatus of claim 1,
wherein the encoder is further configured to:
predict a picture for the target viewing position from a texture picture or a depth picture of the anchor viewing position based on the target viewing position information;
process a prediction error for the predicted picture based on a source picture of the target viewing position and generate an error-front region map based on the predicted picture and the source picture;
pack the prediction error-processed picture into a patch based on an error-prone region map; and
encode the packed patch based on the texture picture or the depth picture of the anchor viewing position.

3. The apparatus of claim 2, wherein the encoder is further configured to:
detect the prediction error for the predicted picture based on the source picture, the prediction error being estimated by subtracting the prediction picture from the source picture;
acquire an estimation error on a threshold value from an error picture corresponding to the prediction error and generate an estimation error map including position information about the estimation error; and
acquire an occlusion error from the prediction error based on a hole and generate an occlusion error map including position information about the occlusion error.

4. The apparatus of claim 3, the apparatus being configured to:
detect an error-prone region related to the prediction for the target viewing position based on at least one of the estimation error map or the occlusion error map, and generate an error-prone region map including position information about the error-prone region;
perform post-processing of adding a guard band to the error-prone region map or dilating the error-prone region map; and
generate a picture related to the error-prone region based on the error-prone region map and the source picture.

5. The apparatus of claim 2, wherein the encoder is further configured to:
detect an estimation error for the predicted picture of the target viewing position based on the source picture of the target viewing position, and generate a subtracted picture of the target viewing position;

detect an occlusion error from the predicted picture and generate an occlusion region map indicating the occlusion error;

classify a type of an error including the prediction error and the occlusion error based on the subtracted picture and the occlusion region map;

detect a region of the prediction error for the predicted picture based on a picture for the prediction error and generate an error-prone region map indicating the region of the prediction error;

substitute the source picture for the prediction error when a value of the prediction error is greater than a predetermined value;

generate an error-prone region map indicating an error-prone region based on the occlusion region map and the error-prone region map; and generate an error-prone region picture based on the substituted source picture and a source picture of the occlusion region.

6. The apparatus of claim 2, wherein the encoder is further configured to:

cluster a region for distinguishing an error-prone region picture of the prediction error-processed picture based on the error-prone region map and generate a clustering map indicating the region;

generate a patch from the error-prone region picture based on the source picture and the clustering map; and generate one or more pictures using the patch.

7. The apparatus of claim 2, wherein the encoder is further configured to:

fill an empty space included in the patch with data about the source picture; or perform processing of adding a guard band to the patch.

8. The apparatus of claim 1, wherein the picture is distinguished based on the target viewing position information.

9. The apparatus of claim 1, wherein the picture is distinguished based on the depth of the anchor viewing position.

10. The apparatus of claim 1, wherein the picture is distinguished based on the depth of the target viewing position.

11. The apparatus of claim 2, wherein the picture for the target viewing position is from the texture picture.

12. The apparatus of claim 2, wherein the picture for the target viewing position is from the depth picture of the anchor viewing position.

13. A video transmission method comprising:

packing a picture for views;

encoding the picture; and transmitting a bitstream including the picture, wherein the views are represented based on view parameters of the bitstream, wherein the bitstream further includes packing information, wherein the picture includes one or more regions and the packing information includes width information related to the one or more regions and height information related to the one or more regions, wherein the picture is encoded based on a prediction mode, and wherein the encoding further includes:

distinguishing the picture based on at least one of target viewing position information, a depth of an anchor viewing position, or a depth of a target viewing position;

predicting the picture; and integrating the picture for the target viewing position.

14. The method of claim 13, wherein the encoding further comprises:

predicting a picture for the target viewing position from a texture picture or a depth picture of the anchor viewing position based on the target viewing position information;

processing a prediction error for the predicted picture based on a source picture of the target viewing position and generating an error-front region map based on the predicted picture and the source picture;

packing the prediction error-processed picture into a patch based on an error-prone region map; and encoding the packed patch based on the texture picture or the depth picture of the anchor viewing position.

15. The method of claim 14, wherein the encoding further comprises:

detecting the prediction error for the predicted picture based on the source picture, the prediction error being estimated by subtracting the prediction picture from the source picture;

acquiring an estimation error on a threshold value from an error picture corresponding to the prediction error and generating an estimation error map including position information about the estimation error; and acquiring an occlusion error from the prediction error based on a hole and generating an occlusion error map including position information about the occlusion error.

16. The method of claim 15, further comprising:

detecting an error-prone region related to the prediction for the target viewing position based on at least one of the estimation error map or the occlusion error map, and generating an error-prone region map including position information about the error-prone region;

performing post-processing of adding a guard band to the error-prone region map or dilating the error-prone region map; and generating a picture related to the error-prone region based on the error-prone region map and the source picture.

17. The method of claim 14, wherein the encoding further comprises:

detecting an estimation error for the predicted picture of the target viewing position based on the source picture of the target viewing position (Estimation error detection), and generating a subtracted picture of the target viewing position;

detecting an occlusion error from the predicted picture and generate an occlusion region map indicating the occlusion error;

classifying a type of an error including the prediction error and the occlusion error based on the subtracted picture and the occlusion region map;

detecting a region of the prediction error for the predicted picture based on a picture for the prediction error and generating an error-prone region map indicating the region of the prediction error;

substituting the source picture for the prediction error when a value of the prediction error is greater than a predetermined value;

generating an error-prone region map indicating an error-prone region based on the occlusion region map and the error-prone region map; and generating an error-prone region picture based on the substituted source picture and a source picture of the occlusion region.

\* \* \* \* \*